United States Patent [19]

Maurel

[11] Patent Number: 5,548,774
[45] Date of Patent: Aug. 20, 1996

[54] MICROCOMPUTER SYSTEM PROVIDING TIME MANAGEMENT ENABLING CONTROL AND ACQUISITION OF DATA INDICATIVE OF CONDITION CHANGES OCCURRING AT HIGH SPEED

[75] Inventor: Georges Maurel, Villeneuve-Loubet, France

[73] Assignee: Texas Instruments Incorporated, Dallas, Tex.

[21] Appl. No.: 326,754

[22] Filed: Mar. 21, 1989

[30] Foreign Application Priority Data

Mar. 22, 1988 [FR] France ................................. 88 03730

[51] Int. Cl.$^6$ .................................................... G06F 3/00
[52] U.S. Cl. ............................................ 395/800; 364/569
[58] Field of Search ................................ 364/569; 395/800

[56] References Cited

U.S. PATENT DOCUMENTS

| | | | |
|---|---|---|---|
| 3,582,901 | 6/1971 | Cochrane et al. | 395/775 |
| 3,626,379 | 12/1971 | Wrigley | 395/325 |
| 3,867,627 | 2/1975 | Nelson et al. | 359/276 |
| 3,905,025 | 9/1975 | Davis et al. | 395/725 |
| 4,348,726 | 9/1982 | Igarashi et al. | 364/569 |
| 4,408,291 | 10/1983 | Gunzberg et al. | 364/470 |
| 4,538,235 | 8/1985 | Henning | 364/569 |
| 4,677,541 | 6/1987 | Singhi | 364/569 |
| 4,698,750 | 10/1987 | Wilkie et al. | 395/425 |
| 4,718,004 | 1/1988 | Dalal | 395/550 |
| 4,800,482 | 1/1989 | Hosaka et al. | 364/140 |

FOREIGN PATENT DOCUMENTS 0021723  1/1981  European Pat. Off. .

OTHER PUBLICATIONS

Motorola, "Single–Chip Microcomputer Data," 1984, pp. 3–599 to 3–622.

Simmers et al., "Specialized I/O and High–Speed CPU Yields Efficient Microcontroller for Automobile Applications", IEEE Transactions on Industrial Electronics, vol. IE–32, No. 4, Nov. 1985, pp. 278–282.

Primary Examiner—Richard L. Ellis
Attorney, Agent, or Firm—William E. Hiller; Richard L. Donaldson

[57] ABSTRACT

Microcomputer system providing time management enabling control and acquisition of data indicative of condition changes occurring at high speed. The system comprises a memory plane with associated address decoders and interface circuits which define a switched register zone operably coupled to a memory control logic and a processor via the interface circuits and temporally shiftable therebetween. An address generator is connected to the switched register zone and provides respective addresses thereto in response to an access by the memory control logic. A time base circuit is connected to the switched register zone and to a sequencer which is likewise connected to the switched register zone. An action unit controlled by the time base circuit decodes control commands from the switched register zone. An input unit upon detecting a change of condition (e.g. in an operating engine) generates a capture request signal to the address generator. An output unit controlled by the time base circuit and connected to the action unit produces outputs with time delays, thereby desequencing the outputs. The switched register zone and the time base circuit interact with the input unit to provide an acquisition function and with the output unit to provide a control function. A serial interface driven by the time base circuit provides data reception and transmission functions, and an interrupt unit accepts interrupt requests originating from the programmable control function, the programmable acquisition function or from the serial interface and places the interrupt requests in a dynamic priority hierarchy.

16 Claims, 33 Drawing Sheets

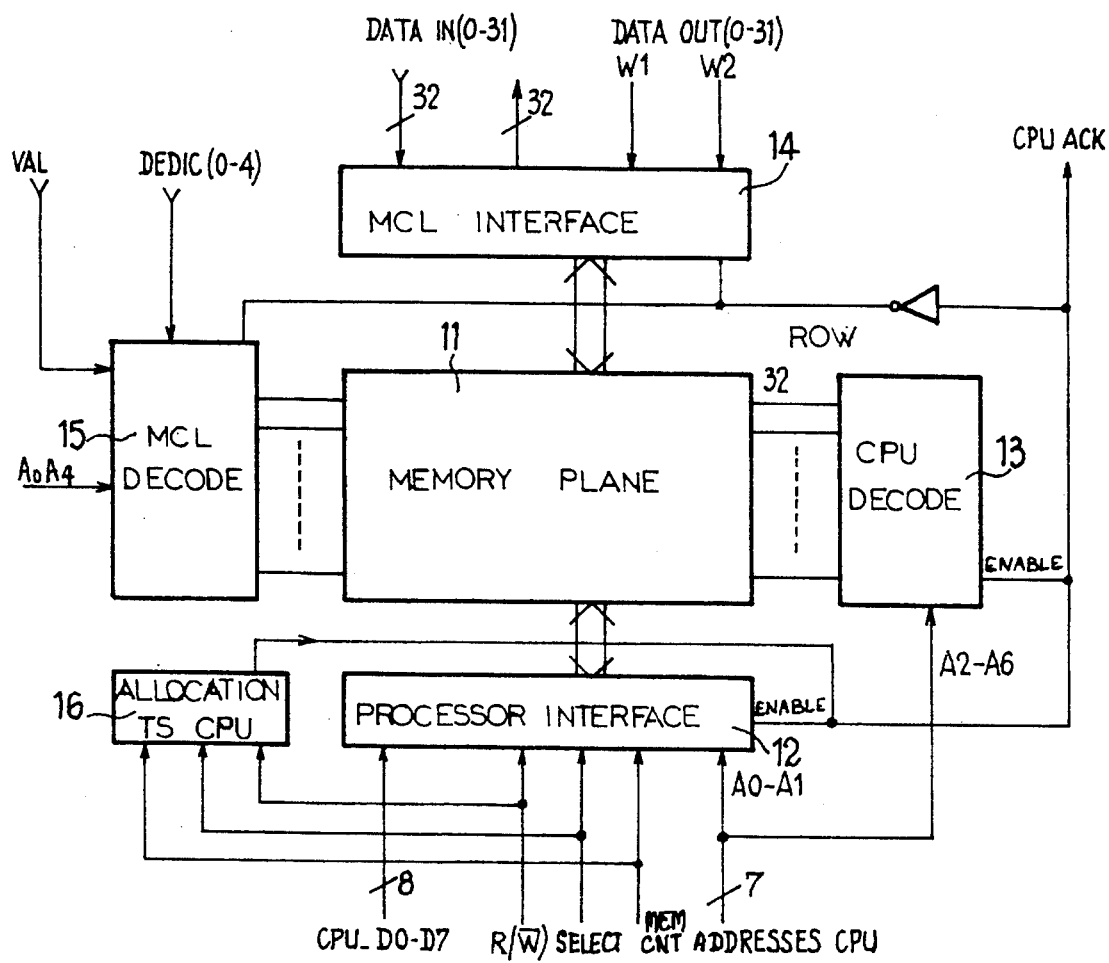
FIG_2

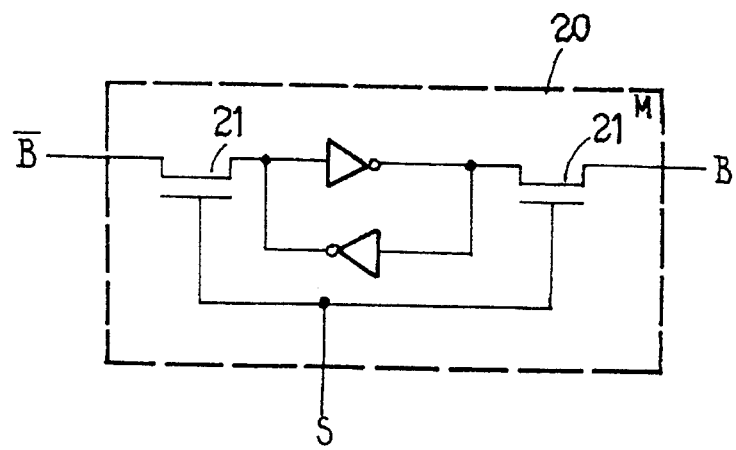
FIG_3
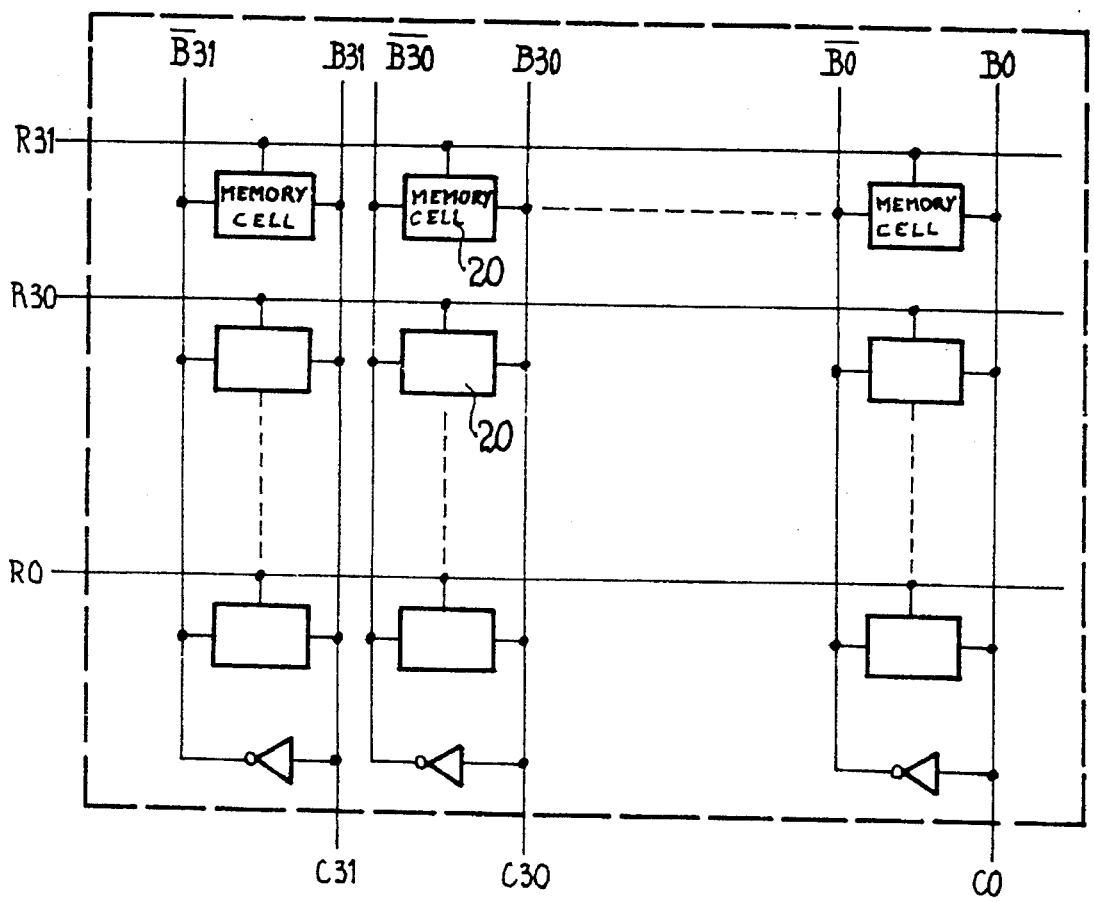
FIG_4

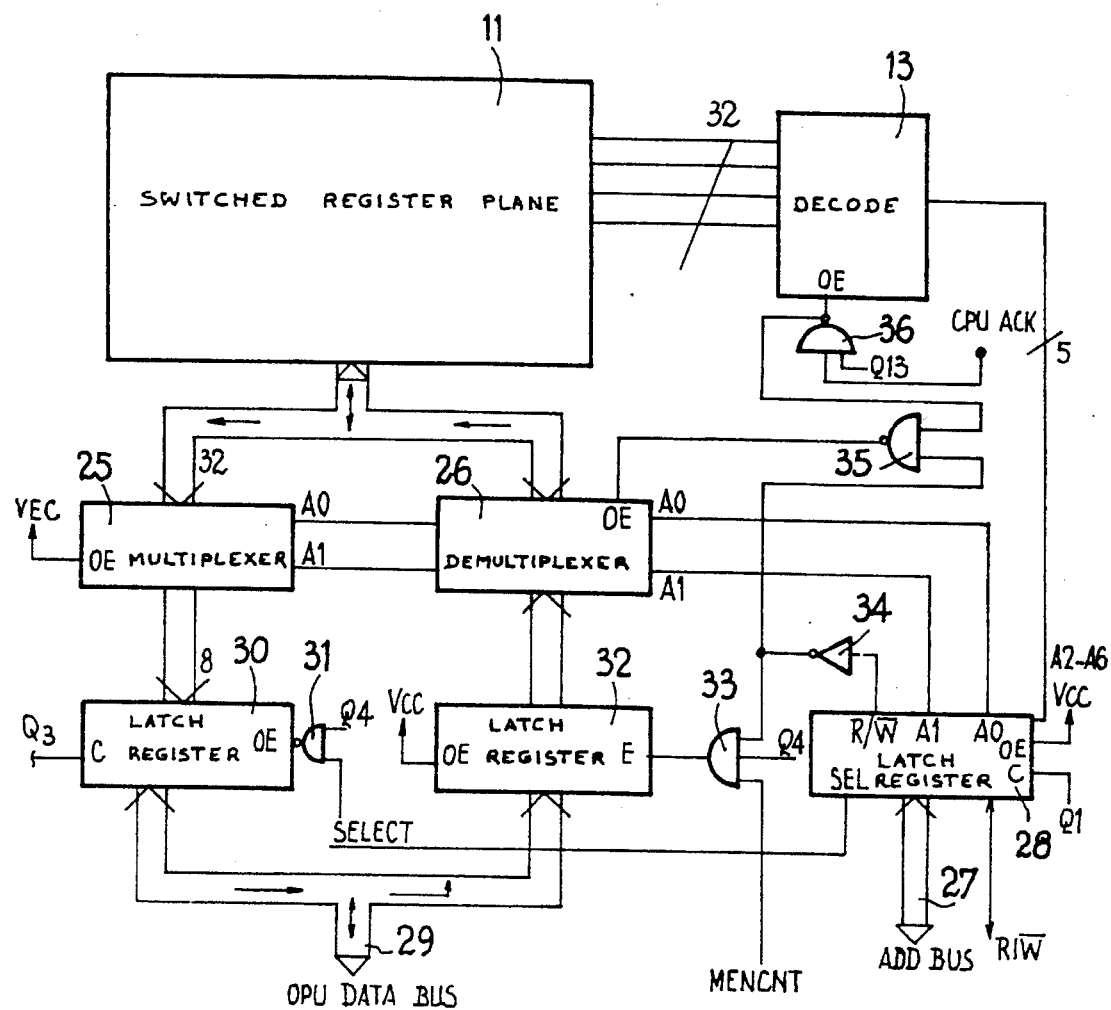
FIG_6

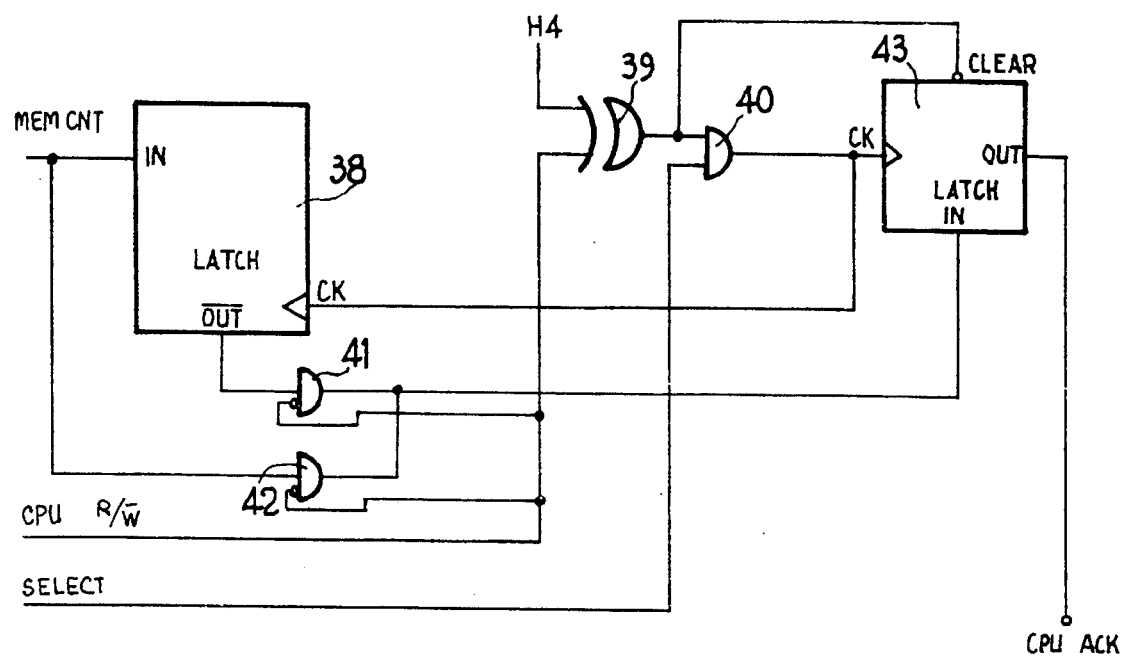
FIG_7

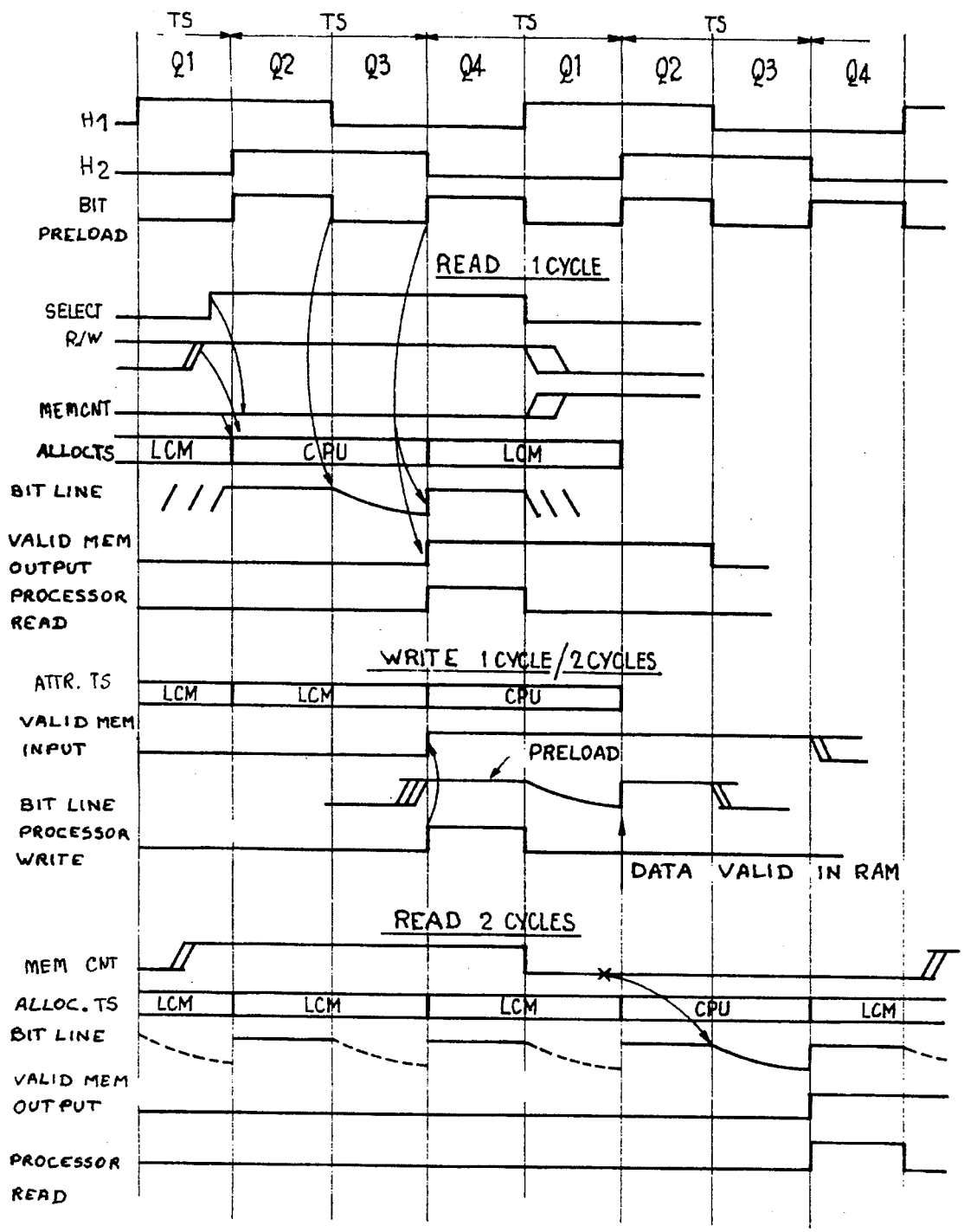
FIG_8

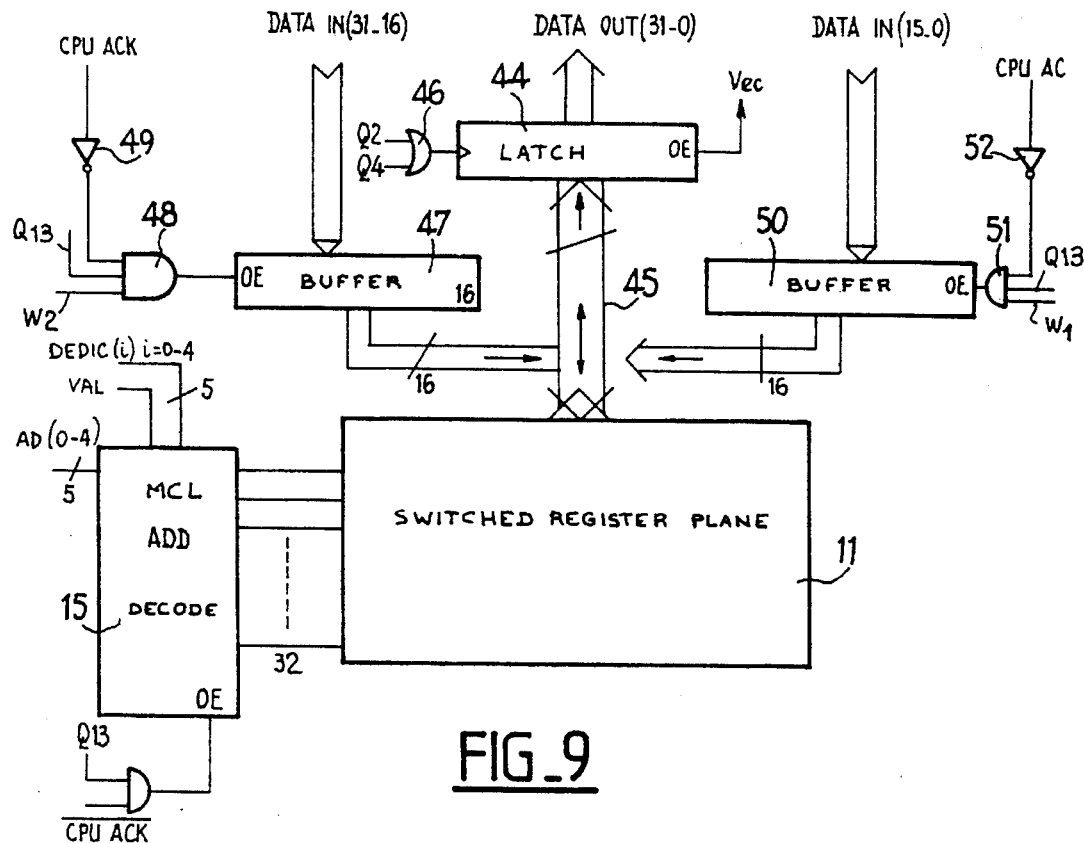
FIG_9
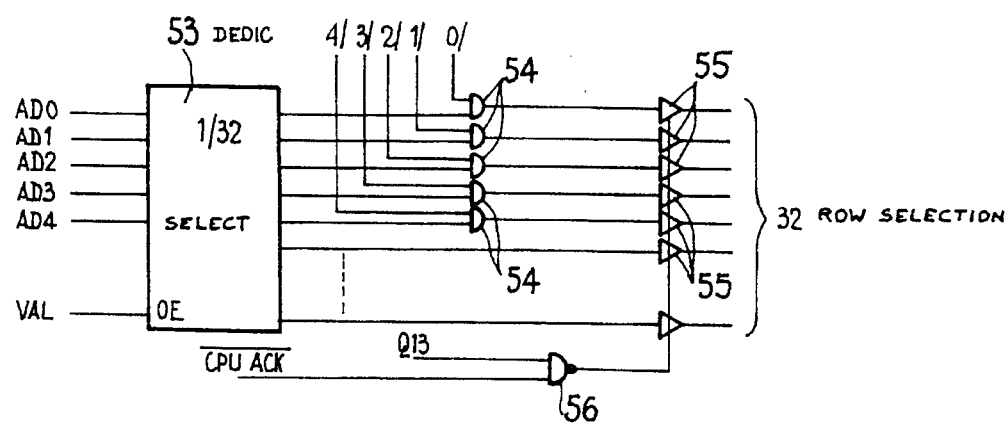
FIG_10

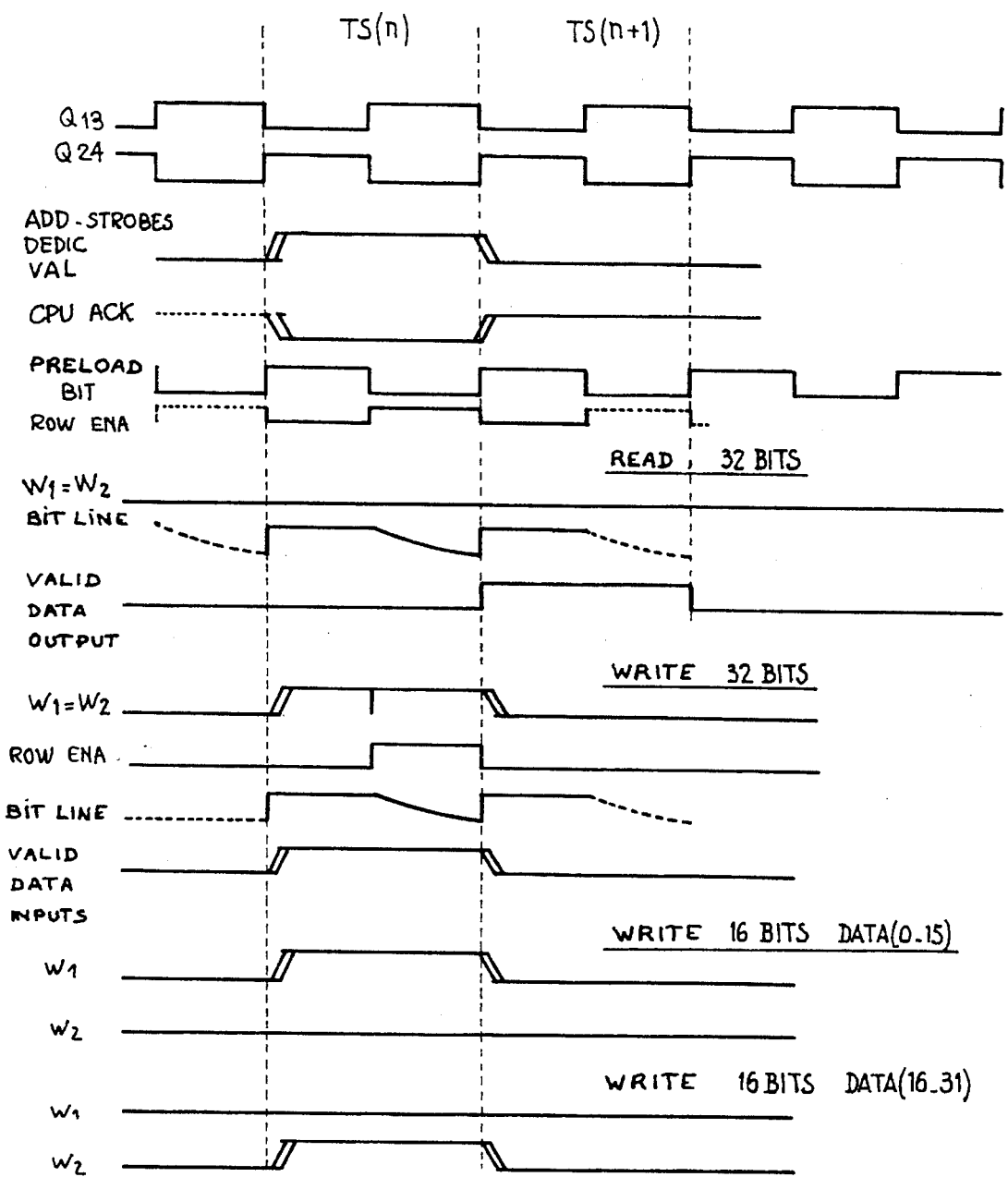
FIG_11

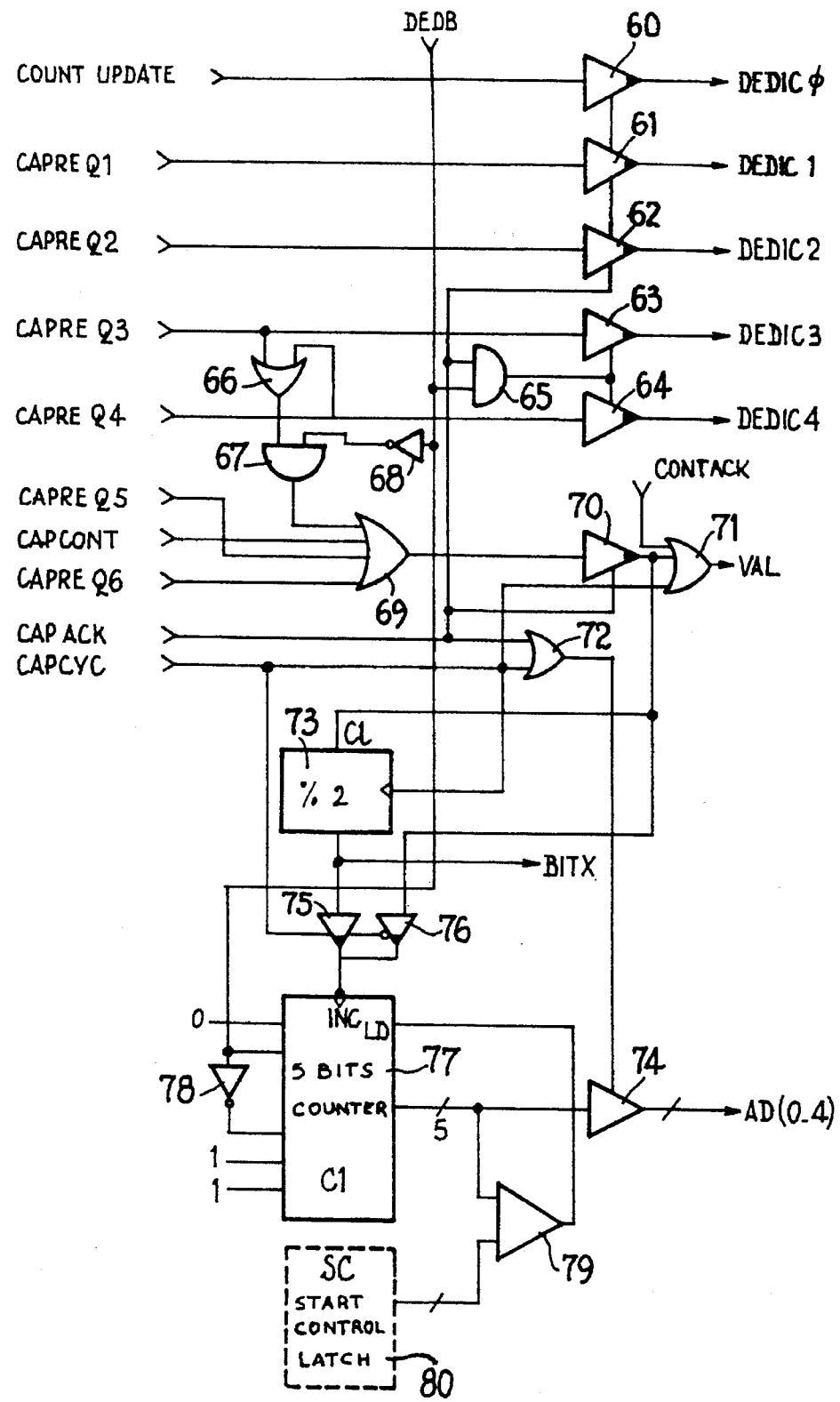
FIG_12

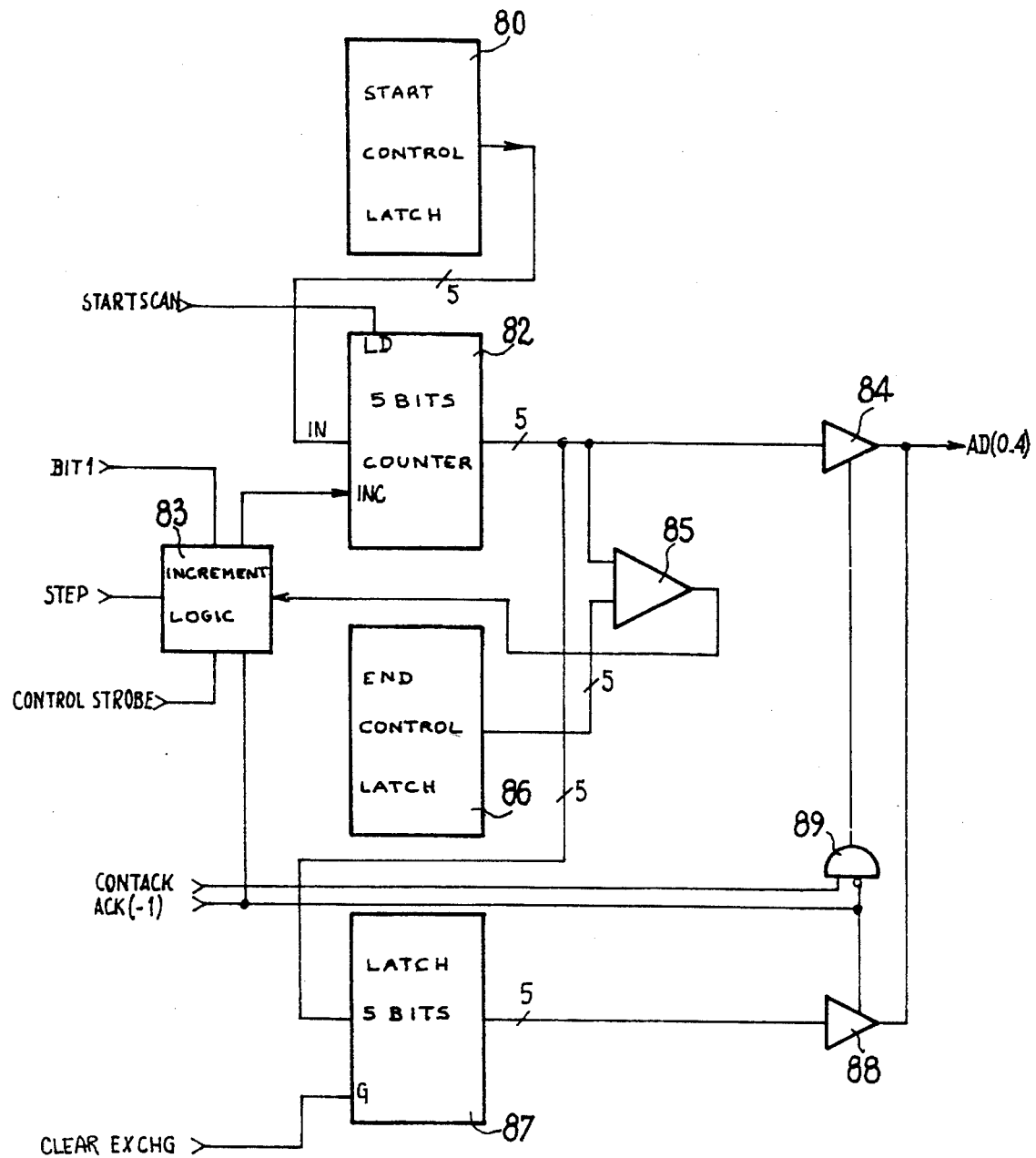
FIG_13

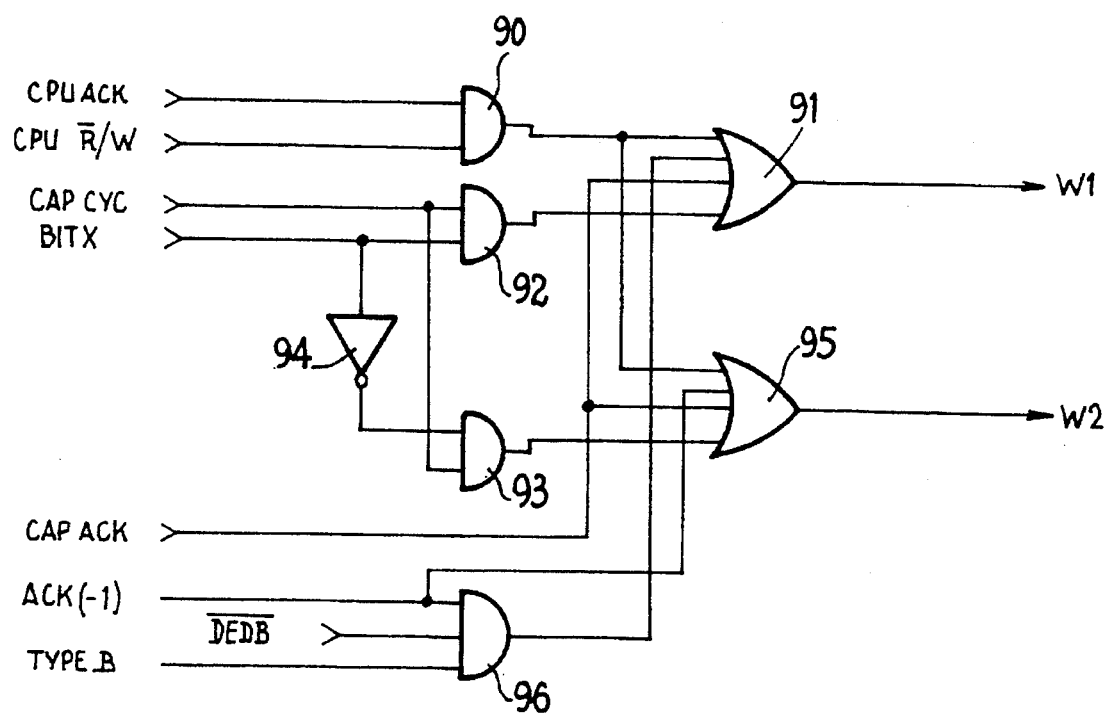
FIG_14

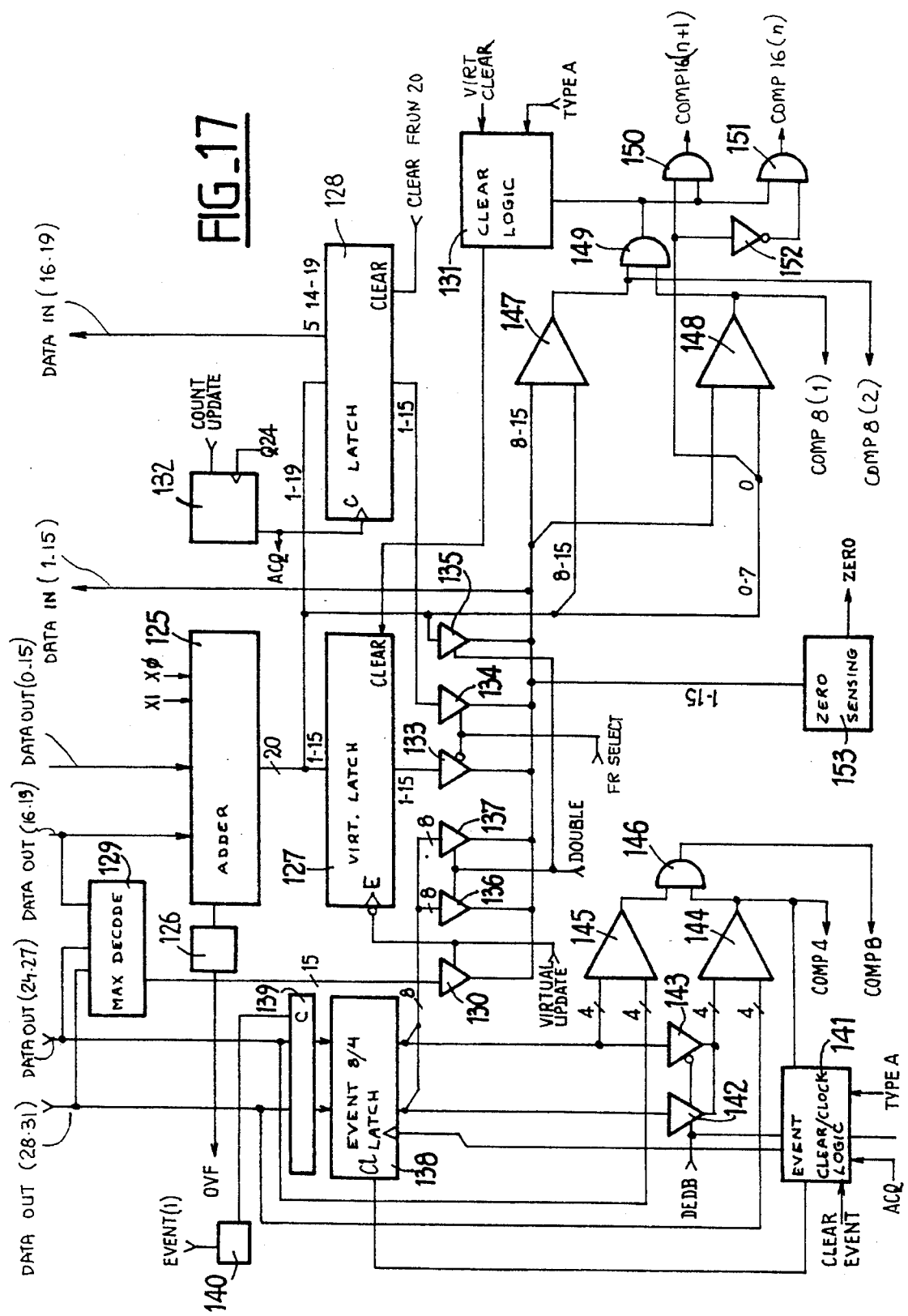
FIG_17

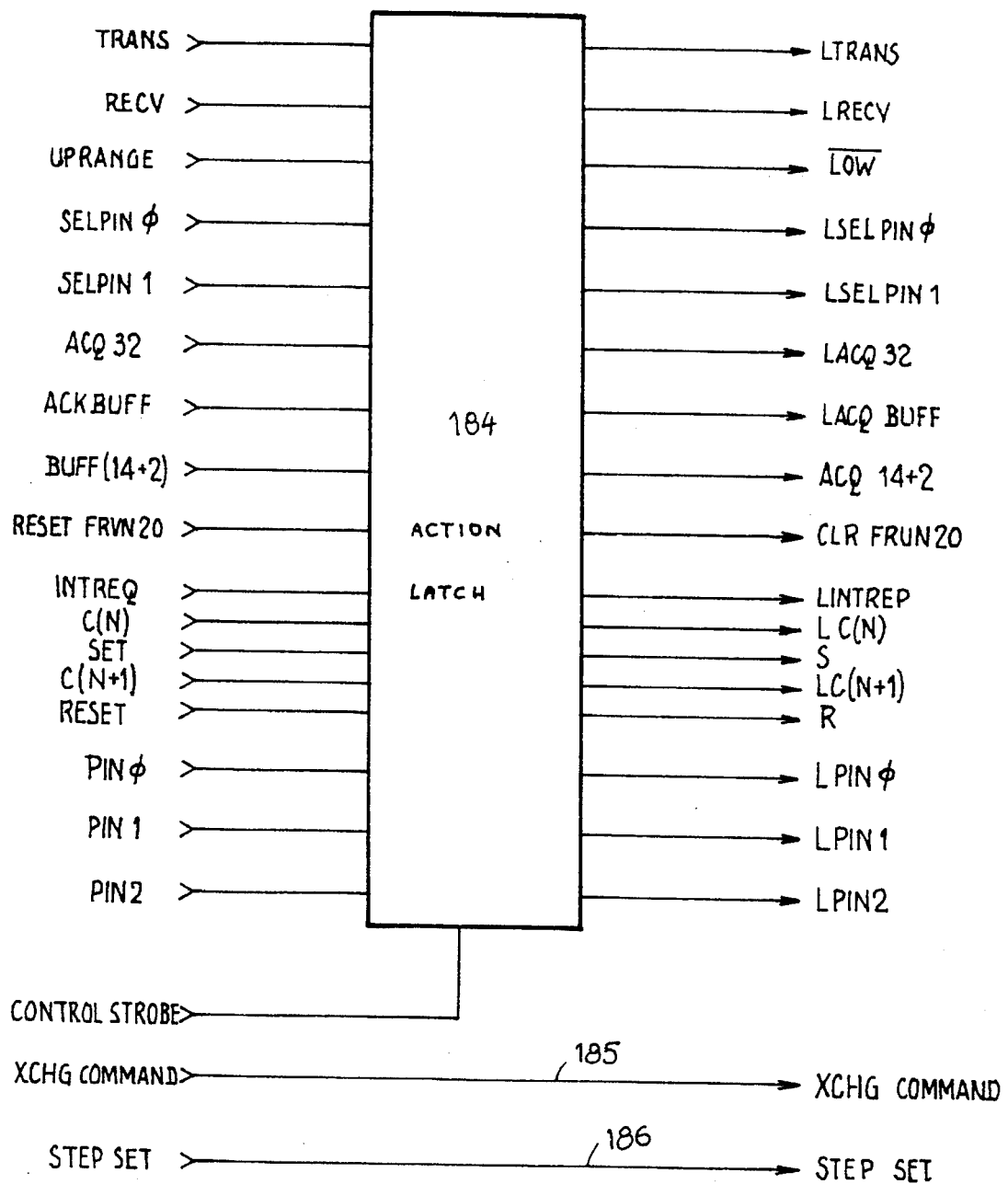
FIG_21

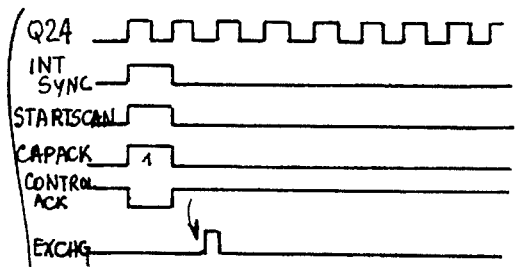
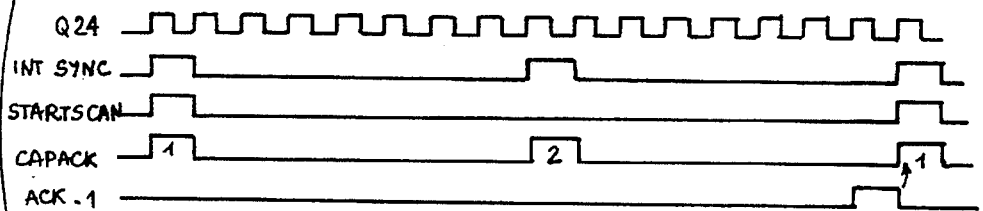
FIG.32
FIG.33
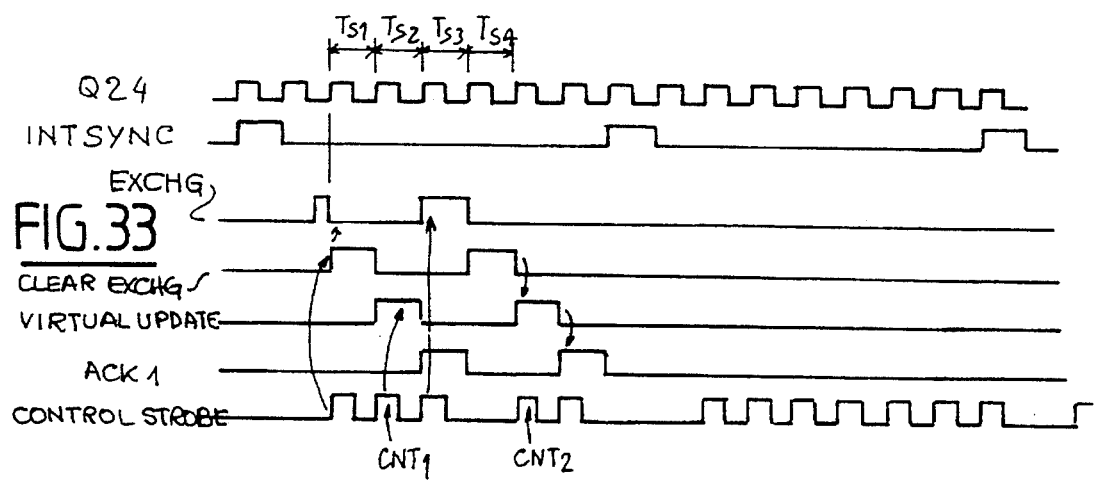

MICROCOMPUTER SYSTEM PROVIDING TIME MANAGEMENT ENABLING CONTROL AND ACQUISITION OF DATA INDICATIVE OF CONDITION CHANGES OCCURRING AT HIGH SPEED

BACKGROUND OF THE INVENTION

1. Field of the Invention

The present invention relates to microcomputers such as those generally used, in particular, for the control of the operation of internal combustion engines or of antilock braking systems of motor vehicles.

It relates, more particularly, to the time management modules associated with the aforementioned microcontrollers.

The majority of the microcontrollers used in the motor vehicle industry require a time management module.

In certain applications, such as the control of the operation of the engine and the control of the antilock braking system of a vehicle, the time management module constitutes the core of the system.

The conventional advanced microcontrollers permit this type of function, but in return for an extensive involvement of the processor which is associated with them.

This is reflected in a lack of precision of the time management and in a prohibitive level of occupancy of the processor.

The functions performed by the high speed control and acquisition module comprise the acquisition function and the control function.

The acquisition function consists in measuring with precision the instant at which a change of condition takes place on an external input E.

The existing conventional solutions utilize:

- a time base generally consisting of a sixteen-bit counter which is self-incremented at all resolutions;
- a storage zone consisting of one or of a plurality of independent registers, the number of bits of which is equal to that of the time base;
- a detection logic permitting the detection of a change of condition;
- an interrupt generation logic.

The acquisition operation consists in capturing the value of the time base in the storage zone at the moment of the change of condition on the input E.

The detection logic is of the programmable type and permits the detection of a change of condition from 0 to 1 or from 1 to 0 and the generation of an activation signal.

In the time base, the usual sixteen-bit counter is incremented by an internal or external clock.

In the accumulation mode, it is likewise possible that the counter ensures the counting of an internal clock validated by an external signal.

The modification of the value of the counter is ensured by a set to zero by a software command or by a set to zero by a change of condition on an input.

There are two types of storage:

- a storage by means of 16-bit dedicated registers of the blocking type;
- a storage by means of registers organized in FIFO (first in, first out), the storage taking place in a predefined order.

These two types of storage are mutually exclusive.

The generation of interrupts is ensured to the microprocessor in the course of the detection of a change of condition.

The disadvantages of the known devices ensuring the acquisition function are the following.

The detection logic does not permit, without a new programming of the process, the activation of the capture function both on a rising front and on a descending front of the input signal E.

It does not permit information of the EVENT type to be given to the processor.

In fact, within the context of cyclic information items and after synchronization by the processor, no information is available to indicate, without intervention of the processor, what is the event in progress.

Accordingly, the concept of event is only localized in the conventional approach.

As regards the time base, to avoid an excessively large number of logic gates, the length of the available information item (16 bits) is too limited.

This limitation requires on the part of the processor a demanding management of the counter overflows.

On the other hand, there is no direct possibility of synchronization of the time counter onto the event counter; this leads to the necessity to undertake shift corrections.

If consideration is given, for example, to a cyclic information item on six events, and if the overflow of the time counter is designated ovf, the result is the following scheme.

```
Event counter +−0−+−1−+−2−+−3−+−4−+−5−+−0−+−1−+−2−+
Time counter  + ............. 0 ................. 0 ................. 0 . +
                               ovf               ovf               ovf
```

While the desired case would be:

```
                          4
Event counter +−0−+−1−+−2−+−3−+−4−+−5−+−0−+−1−+−2−+
Time counter  0 .................................... 0 ...................
                          shift = 0
```

The storage zone is constructed of non-general-purpose registers, and it is consequently very costly, on account of its large size.

Outside the computation zone, numerous instructions concerning the displacement of data are therefore necessary in order to process the information items acquired.

Thus, the efficiency of the software is reduced.

The quantity of information items is reduced solely to the value of the counter.

The format of the data is fixed: generally 16 bits or 16 bits+source in the case of a FIFO.

The buffer and the dedicated storage zones are not available simultaneously.

With a dedicated storage zone, an event on an input E1 involves the updating of a storage zone CAPTURE 1 allocated to the input E1.

Likewise, an event on an input E2 involves the updating of a storage zone CAPTURE 2 allocated to the input E2.

E1→CAPTURE 1 (16 bits)

E2→CAPTURE 2 (16 bits)

With a capture buffer, an event on an input Ei involves the storage of the value of the time base in the buffer, while the source which has given rise to the capture is indicated in an auxiliary field.

The corresponding pointer is then incremented for the next capture.

```
                16              n ──> defines the
                                      source
       +-----------+----+
E1 ──> !-----------+----!
       !-----------!----!
E2 ──> !-----------!----!
       !           !    !
En ──> +-----------!----+
           Buffer 16 bits + n
```

The solution of the buffer permits a rapid acquisition which is not limited by the processing speed of the processor.

The dedicated solution permits a direct access to the information item sought and thus the optimization of the access.

However, in order to ensure a maximum-efficiency, it would be essential to have these two solutions available simultaneously.

In the opposite case, in order to avoid any loss of information items, it is necessary to process the slow events at the same rate as the rapid events.

The control function consists in generating a set of outputs with time delays, in which each change of condition may be programmed to within one resolution.

A device for carrying out this control function comprises:

a time base consisting of a 16-bit counter which is self-incremented at all resolutions;

a storage zone consisting of independent registers, in which zone an associated central processing unit programs the instant at which the action must take place;

a 16-bit comparison logic permitting the detection of a coincidence between the value of the time base and the instant of the action;

a very elementary action logic permitting the modification of the condition of the output S to which the entire control function is referred.

In the conventional systems, the control function is in all cases very simple.

It consists in a change of condition of an output with or without setting to zero of the time base. The most widespread type of output consists of PWM signals formed of width-modulated pulses, which are signals having programmable frequency and cycle ratios.

Such an output requires:

a) 1 time counter b) 1 companion register COMP1 fixing the cycle ratio c) 1 comparison register COMP2 fixing the frequency while resetting to zero the time counter.

It will be noted that, for two PWM signals of differing frequencies, it is not possible to use the same counter as time base.

Consequently, in order to permit the wide implementation of this type of signals, it is necessary to be able to have available a large number of counters for the control functions.

The major disadvantage of all the conventional solutions resides in the fact that any multiplication by N of the number of control functions involves a multiplication by N of the associated circuits.

The elementary action logic does not permit sophisticated commands.

It is programmable, but only in non-general-purpose registers.

It is, by construction, associated in a unique and definitive manner with an output.

The time base comprises a single counter or a limited number of counters.

The counters are real, and therefore very costly in silicon.

They are accessible at dedicated addresses, outside the computation zone, and consequently the processing of their content cannot be optimized.

There is no interaction between the references of the control time base and the events of the acquisition part.

This prohibits the event/time comparisons, the interpolations between events and the direct measurements of speed.

The storage zone is associated, by construction, in a unique and definitive manner with an output.

It is constructed of non-general-purpose registers and it is therefore very costly, by reason of its large size.

Outside the computation zone, numerous instructions concerning the displacement of data are therefore necessary.

The quantity of information is reduced solely to the value of the counter.

The comparison logic permits only 16-bit time comparisons and it is, in particular, incapable of detecting conditional instants (event/time).

The object of the invention is to remedy the aforementioned disadvantages of the known devices by creating a time management device integrated with a microcontroller which carries out the said time management by virtue of a set of programmable acquisition, control and correlation functions, articulated about a flexible and inexpensive memory organization.

SUMMARY OF THE INVENTION

The subject of the invention is thus a device for control and for acquisition at high speed, characterized in that it comprises a switched register zone intended to be associated with a memory control logic and with a processor, the said switched register zone being usable as computation register zone of the processor, an address generator of the type for selection of p addresses from among n, connected to the said switched register zone and intended to deliver to the latter the necessary addresses in the course of an access by the memory control logic, a time base utilizing virtual counters synchronizable by events which are external and defined in switched register zone as conventional commands, the said time base being connected to the said switched register zone and to a sequencer which is likewise connected to the switched register zone and making each interval of time capable of exploitation, an action unit controlled by the time base and intended to carry out the decoding of the control commands originating from the switched register zone and ensuring the interface function with peripheral units, an input unit intended to detect a change of condition on at least one input of the device and to generate capture request signals to the said address generator, and event signals to the time base, an output unit intended to ensure the desequencing of the outputs of the device, the said output unit being controlled by the time base and connected to the action unit, a "guard dog" unit intended to ensure the security of the device, the said "guard dog" unit being controlled by the time base, a serial interface driven by the time base, and an interrupt unit intended to ensure a placing in dynamic hierarchy of the interrupt requests originating from the control means, from the acquisition means or from the serial interface of the device as a function of the priorities of the said requests.

The subject of the invention is also a device of the type defined hereinabove, comprising means for the acquisition of data relating to changes of condition taking place on input signals and control means intended to act on output signals as a function of the data originating from the acquisition means, characterized in that the said acquisition means comprise the switched register zone, the time base and the input unit, in that the control means comprise the switched register zone, the time base and the output unit, and in that the acquisition means and the control means comprise respectively their information-storage zone, these storage zones belonging totally to the general-purpose memory computation zone of an associated processor.

According to further features of the invention:

the said switched register zone comprises a memory plane, an interface for connection with the processor, an interface for connection with the memory control logic, a decoder of addresses of the processor, a decoder of addresses of the memory control logic, and a unit for allocation of processor time intervals.

The interface for connection with the processor of the switched register zone comprises a multiplexer and a demultiplexer which are connected to the switched register plane and controlled by address signals present on an address bus and transmitted to the said multiplexer and demultiplexer by a first blocking register, the multiplexer being connected to a data bus by a second blocking register and the demultiplexer being connected to the data bus by a blocking register, the said first blocking register being also connected to the decoder of addresses of the processor.

The interface for connection with the memory control logic comprises a blocking register connected to a bus for connection with the memory plane, the output of the said blocking register forming the data output of the interface, a three-state interface circuit receiving the DATA IN input data, a three-state interface circuit which receives the DATA IN input data, the interface circuits being controlled by the signals CPUACK, Q13, W2 and being connected to the bus for connection with the memory plane.

The unit for allocation of processor time intervals comprises a first flip-flop, the input of which receives the signal for validation of access, two MEMCNT access cycles, a set of gates for the formulation of an action signal CK from the read/write and selection signals CPU R/W and SELECT, a second flip-flop which receives the same signal CK which is connected to the output of the first flip-flop, the said second flip-flop delivering the signal of validation CPUACK of access to the central processing unit.

The action unit comprises a device for the interpretation of the commands to set up virtual counters EXCHG, a device for the interpretation of the normal commands, a device for synchronization of the actions and a device for establishing the interlaced mode of scanning of the control zone.

The input unit comprises a device for the detection of a change of condition on one of its inputs, for the generation of capture request signals to the address generator unit, signals which permit having simultaneously captures in buffer zone and in dedicated register and a device for the generation of event signals EVENT, INCOFF to the time base, EVENT designating that an event is in progress and INCOFF permitting the assurance, to within one resolution, of the synchronization of the external events.

The serial interface unit comprises a reception device ensuring the functions of storage on reception, of storage during the synchronization phase, of time management and of word synchronization, and a transmission device ensuring functions of storage on reception, of time management and of word synchronization, and in that the unit participates as a peripheral unit, the time-management function of which is ensured by the time base unit.

The interrupt unit satisfies the requests of the control function, of the acquisition function and of the serial interface function, and comprises means for ensuring the relative priorities of the said functions, means for validating interrupt and control requests, the priorities of which are reallocatable in a dynamic manner, means for ensuring the acquisition interrupt functions, means for ensuring the serial interface interrupts, and means for determining the priorities of the capture interrupts.

The memory plane of the said switched register zone is a RAM memory having memory cells including MOS transistors having a number of columns at least equal to the number of bits defining the format of a control command and with time division, by utilization of the dead times of the switched register zone, the said memory plane being accessible to a source 1 consisting of the processor and to a source 2 consisting of a control logic (LCM) of the said memory.

In the switched register zone there is defined a structure of virtual counters, either time or event, which can be declared in a command, these being incremented directly in switched register zone, and being readable and modifiable by the processor in this zone.

The address generator intended to deliver to the switched register zone the necessary addresses in the course of an access of the memory control logic, comprises means for the generation of addresses with a view to acceding to the write zone of the said switched register zone, means for the generation of addresses with a view to acceding to the read or control zone of the said switched register zone, these accesses permitting acceding to the commands in the control zone and to instructions, and means ensuring a memory selection of the type P among N, as well as means for the generation of selective write signals in the said switched register zone.

The sequencer intended to manage the interlinkings and the conflicts between the accesses emanating from the central processing unit, from the control zone or from the acquisition zone to the switched register zone comprises programmable means for division by n, means for the generation of signals STARTSCAN, FRBIT0, FRBIT1, for synchronization of scanning, means for the generation of condition signals CAPACK+COUNT UPDATE, CPUACK, CONTROL ACK, CAPACK, CAPCYC, ACK-1, means for the generation of validation signals CONTROL STROBE, RESOL, and means for the generation of sequence management signals STEP 1, CLEAR EXCHG, VIRTUAL UPDATE, the assembly making the reference time unit programmable and ensuring the optimal utilization of the available time.

The time base circuit comprises a blocking circuit for the acquisition functions, N virtual counters for the control functions, an event counter, means for setting the virtual counters to zero, means for time comparison, means for comparison of events, the said counters being in their entirety accessible in switched register zone, the incrementation of these counters being ensured by a single adder, the number N being dependent only upon the value of the predivisor of the sequencer.

BRIEF DESCRIPTION OF THE DRAWINGS

The invention will be better understood by means of the description which will follow, which is given purely by way of example and made with reference to the accompanying drawings, in which:

FIG. 2 is a general diagram of the switched register zone which forms part of the device of FIG. 1;

FIG. 3 is a diagram of the basic cell of the memory plane of the switched register zone;

FIG. 4 is a partial general diagram of the memory plane;

FIG. 6 is a general diagram of the processor interface forming part of the switched register zone of FIG. 2;

FIG. 7 is a general diagram of the logic for the allocation of time intervals to the central processing unit, forming part of the switched register zone of FIG. 2;

FIG. 8 is a chronogram of the management of the accesses of the central processing unit;

FIG. 9 is a general diagram of the LCM interface of the switched register zone of FIG. 2;

FIG. 10 is a general diagram of the LCM decoding circuit of the switched register zone of FIG. 2;

FIG. 11 is a chronogram of the LCM accesses;

FIGS. 12, 13 and 14 are general diagrams of an address generator participating in the construction of the module of FIG. 1;

FIGS. 17 and 17a are detailed general diagrams of the time base participating in the construction of the module of FIG. 1;

FIGS. 18, 19, 20a, 20b and 21 are diagrams of the action unit of the module of FIG. 1;

FIG. 32 represents chronograms of limiting cases of the updating of a virtual counter at the end and at the start of scanning;

FIG. 33 is a chronogram of the interlinking of two updatings of virtual counters;

DETAILED DESCRIPTION OF THE PREFERRED EMBODIMENT

The device for control and for acquisition at high speed according to the invention will now be described with reference to FIG. 1.

This device comprises units permitting the storage function to be ensured, which units are a switched register zone 1 to which an address generator 2 is connected.

This device further comprises units performing the functions of time base, of comparison and of decoding of the commands which are a time base 3 connected to the switched register zone and an action unit 4 connected, on the one hand, to the time base and, on the other hand, to the switched register zone 1.

Figure 1:
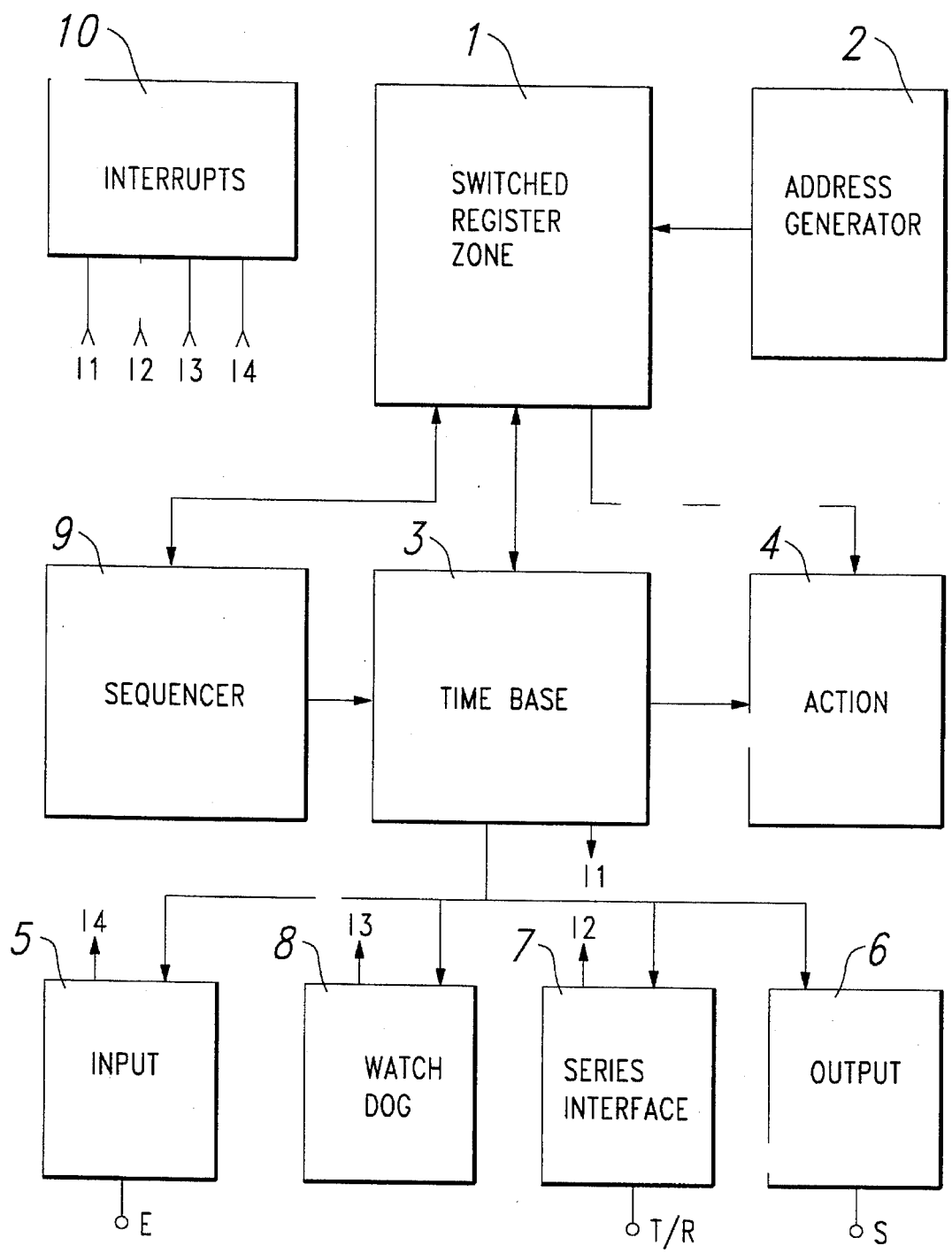
FIG. 1 is a general diagram of the high speed acquisition and control module according to the invention.

The device of FIG. 1 further comprises units concerning peripheral functions, namely an input unit 5, an output unit 6, a serial interface 7 and a sequence controller or "guard dog" circuit 8, all communicating with the time base 3, the output circuit 6 being further connected to the output of the action unit 4.

Finally, this device is completed by time management and interrupt generation units comprising a sequencer 9 connected to the switched register zone 1 and to the time base 3 and an interrupt generator 10.

The device for control and for acquisition at high speed according to the invention is based on the basic principle of the use of the computation register zone of the processor associated with the device as storage zone. This implies a division of this memory zone, this division being temporal in order to avoid any increase in size.

The switched register zone 1 which will be described in detail hereinbelow must therefore be accessible, on the one hand, by the associated processor and, on the other hand, by a memory control logic LCM of the control and acquisition device.

The LCM logic will be capable of specifying the address of its accesses via the address generator module 2 which will likewise be described hereinbelow.

The sequencing and the interlinking of all the accesses to the switched register zone 1 will be managed by the sequencer 3.

A second basic principle of the device for rapid control and acquisition according to the invention is the optimization of the density of access to the switched register zone.

Three types of access are possible.

1) Control access

Any control function in the device is due to the execution, by the action module 4, of a command programmed in the switched register zone 1.

To be executed, this action which is a function f(t) must be validated by a time or event coincidence.

In order to do this, the field of comparison of the command must be compared with the references of the time base module 3.

In order to be able to guarantee a precision of a resolution on the control signals, the logic must be capable of undertaking the comparison on the totality of the commands in a resolution.

The zone of storage of the commands being a general-purpose RAM with decoding of the type 1 among n, an access will permit the reading only of a single command. A possible chronogram on a resolution is then: with Ts=access time Resol=resolution
L=reading of the command
C=comparison of the command with the time base.

```
L1   C1   L2   C2           Ln   Cn
:___:___:___:___:......:___:___:
          Resolution k
<--------------------->
```

The number of possible commands is given by:

$$n=(RESOL/TS)/2$$

A first improvement is obtained by sequentializing the readings and the comparisons.

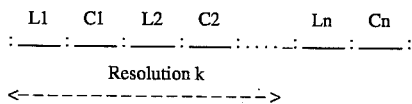

```
         Resolution k
<--------------------->
    n = (RESOL/TS)
```

$$n=(RESOL/TS)$$

A second improvement is obtained by sequentialization of the comparison results with respect to two resolutions:

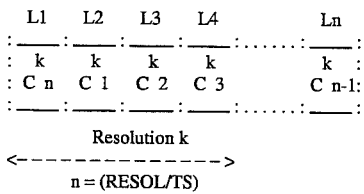

This type of temporal sequentialization must be associated, at the level of the time-delayed outputs, with a spatial desequentialization.

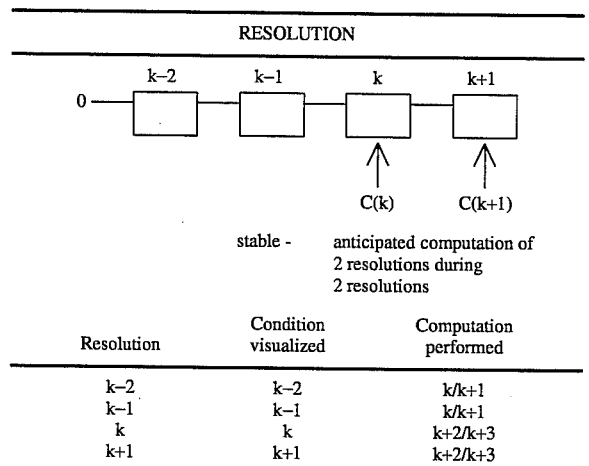

This last chronogram is used in the device for control and for acquisition at high speed according to the invention, and in this case:

$$n=RESOL/TS\times 2$$

2) Acquisition access

An acquisition is reflected in the write in storage zone which is the capture zone of the switched register zone 1 (FIG. 1) of a time or event information item.

In order to respect the precision of a resolution, this write must be capable of being performed at all resolutions.

In the case of a plurality of inputs being capable of causing a capture, two cases are presented:

Buffer storage: in this case, the reference of the source (or sources) being captured at the same time, a single information item is to be written to the storage zone.

Dedicated capture: in this case, if P sources request an acquisition during the same resolution, P memory locations of the capture zone must be updated.

The device for access and for control at high speed simultaneously authorizes a storage in capture buffer, the updating of the acquisition counters being situated in a dedicated memory logic and up to four storages in dedicated capture zones.

3) Processor access

These accesses are never penalized.

As will be seen hereinbelow, a study of the processor cycles permits the minimization of the access density caused by the processor.

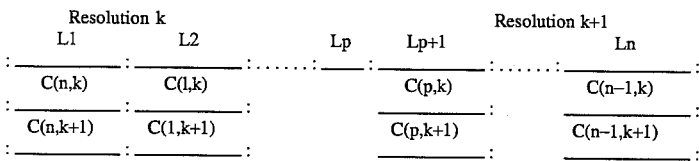

As a processor cycle is equal to two access times Ts, but actually occupies the memory plane only during 1 Ts, assuming permanent accesses on the part of the processor, the maximum percentage of occupancy of the switched memory zone would be 50%.

A more detailed study of the microcode of the processor permits the specification of an occupancy time of the order of 20%.

According to a third principle, the device for control and for access at high speed according to the invention implements a procedure of scanning of the control zone (SCAN), the repetition period of which is equal to two resolutions.

The capture access times Ts are located at the start of the resolution.

Any processor access is capable of being inserted into this sequencing.

The global management of the Ts is undertaken by the sequencer.

At the start oft the scanning procedure, the scanning pointer is situated at the start of the control zone.

The switched register zone 1 of the device represented in FIG. 1 will now be described with reference to FIG. 2.

It consists of six logic units, namely:

a conventional 1024-bit memory plane 11, a processor interface 12 connected to the memory plane, a circuit 13 for decoding addresses of the processor, an interface circuit 14 of the memory control logic LCM, a circuit 15 for decoding LCM addresses, a unit for the allocation of Ts to the processor.

The memory plane 11 of conventional type consists of a static RAM which does not rely upon the known techniques of double access.

It can be used as computation register zone.

It is accessible by two different sources which are not correlated, namely:

Source 1: processor

Source 2: memory control logic LCM.

The formats of the data differ for these two sources.

Source 1: 8 bits

Source 2: 16/32 bits.

It is possible to proceed as far as six simultaneous writes of the same information item on a plurality of 32-bit words.

The LCM accesses are independent of the buses and do not prohibit the use of a DMA function.

The LCM accesses are transparent for the processor, the accesses of which are never delayed. Thus, there is no need to fear any penalization of the performance levels of the processor.

The register zone guarantees to the LCM and to the processor at least one access per cycle and permits a frequency of access which is twice as great as the frequency of the system.

The time constraints with regard to the memory point are not made twice as critical.

As is seen in FIG. 3, the basic cell of the memory plane is a conventional cell 20 incorporating MOS transistors 21.

As represented in FIG. 4, the structure of the memory plane 11 has as its base a plane of 1024 bits, of 32 rows $R_0$ to $R_{31}$ and 32 columns $B_0$, $\overline{B_0}$ to $B_{31}$, $\overline{B_{31}}$.

However, other formats involving 16 and 32 bits might just as well be used.

The accesses of the processor to the switched register plane 11 are undertaken either in one cycle for the instructions concerning computation and of register type, or in two cycles for the other types of access.

There are four types of access to be described:

read in 1 cycle read in 2 cycles write in 1 cycle write in 2 cycles.

Figure 5:
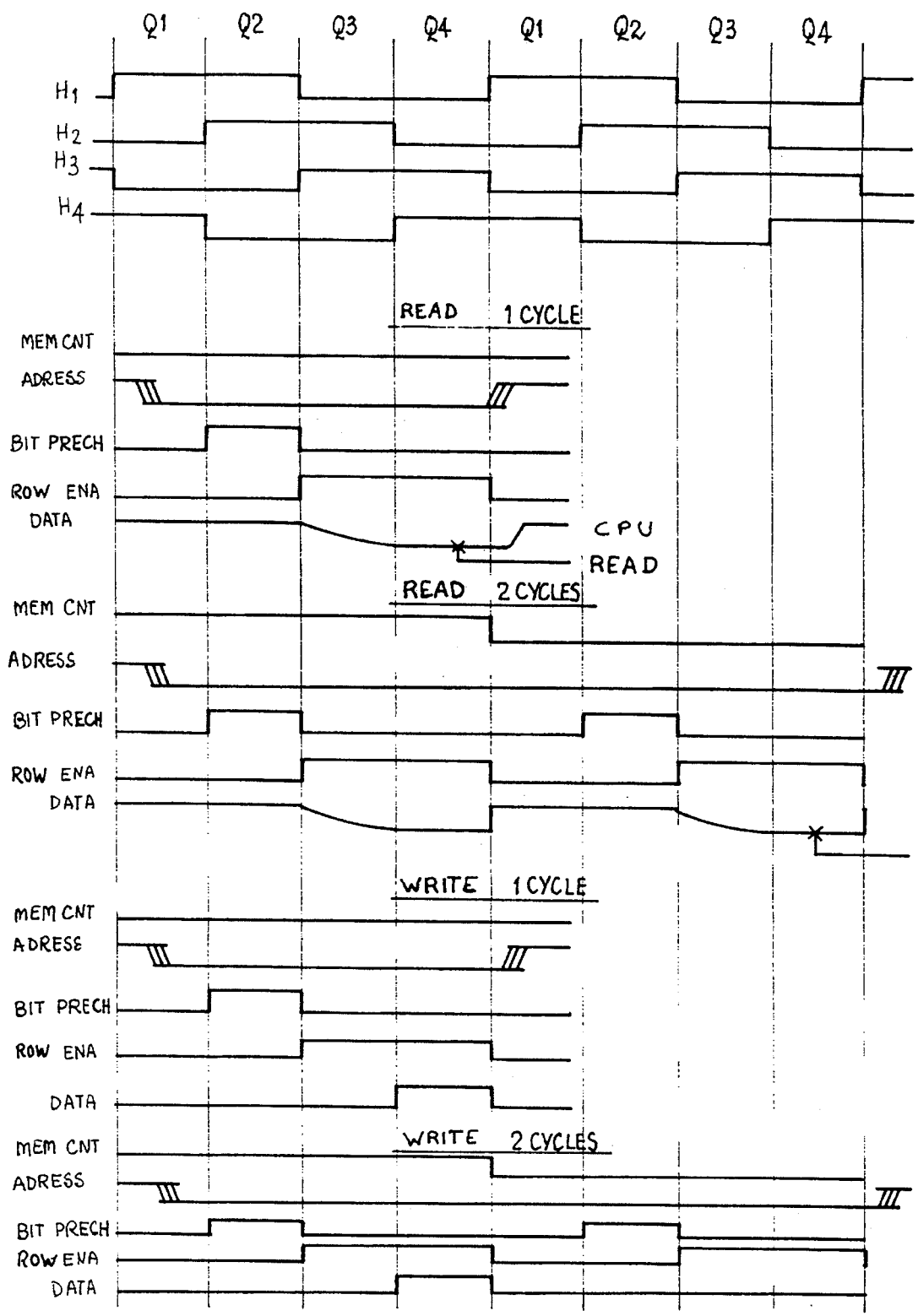
FIG. 5 is a chronogram representing the types of access to the switched register plane 11.

These four types of access are represented on the chronogram of FIG. 5.

Read in 1 cycle

As represented in FIG. 5, each cycle is subdivided into quarter cycles Q1 to Q4.

During the cycle quarter Q1, there is the establishment of the address at-the input of the memory plane 11 (FIG. 2).

During the quarter cycle Q2, the address is stable and there is preloading of the lines of bits.

During the quarter cycle Q3, there is validation of the row selected (given as valid at the end of Q3).

During the quarter cycle Q4: data item stable, available on the bus.

Read in two cycles

This is performed in the same manner as previously, but the data must be present and stable on the bus during the quarter cycle Q4 of the second cycle.

A signal MEMCNT equal to 1 during the first cycle permits the differentiation of the two cycles.

Write in one cycle

This is performed in the same manner as a read operation, with data supplied by the processor, which are stable at the input of the memory plane during $Q_4$.

Write in two cycles

The description is the same as for the write in one cycle, but the second cycle may be considered as an adaptation of the access time.

The signal MEMCNT permits the differentiation of the two cycles.

The analysis given hereinabove permits a finding that the memory plane 11 is actually active only during the quarter cycles Q2 and Q3, while Q1 and Q4 appear as the time delays:

a) of the addresses b) of the data

The optimization of the register plane consists in reducing by 50% the occupancy time of the register memory by releasing these two time-delay phase quarters.

The control and allocation logic (FIG. 7) generates the signals for access to the switched register zone 1 (FIG. 1) and inserts, with the appropriate synchronizations, the CPU access half-cycles when this unit in fact requests this.

These time intervals Ts used for the accesses to the switched register zone are therefore synchronized with respect to the clock H2 (FIG. 5).

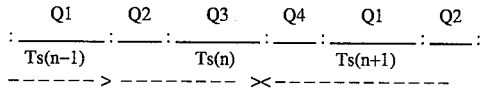

The processor interface 12 of the diagram of FIG. 2 operates within the context of the present description with an 8-bit data format.

The processor interface which forms part of the switched register zone of FIG. 2 will now be described with reference to FIG. 6.

This interface essentially comprises a multiplexer 25 and demultiplexer 26 which are connected to the switched register plane 11 and controlled by address signals $A_0 A_1$ which are present on the address bus 27 and transmitted by a blocking register 28.

The multiplexer 25 is connected to the data bus 29 via a blocking register 30, the validation input of which is connected to a NAND gate 31 having two inputs receiving on one of its inputs a selection signal SELECT and on its other input a signal Q4 corresponding to the fourth quarter cycle. On its control input, the circuit 31 receives a signal Q3.

The demultiplexer 26 is connected to the data bus 29 by a blocking register 32, the control input of which is connected to the output of an AND gate 33 having three inputs, which receives on one of its inputs the signal Q4, on another input the signal MEMCNT and on its third input a read/write signal R/$\overline{W}$ delivered at the output of the circuit 28 and inverted by an inverter 34.

The circuit 28 is moreover connected to the CPU decoder 13 for the decoding of the rows from the address signal $A_2$–$A_6$.

It is furthermore connected, via the inverter 34, to an input of a NAND gate 35, the other input of which is connected to the output of a NAND gate 36 and the output of which is connected to the demultiplexer 26.

An input of the NAND gate 36 receives a signal Q13, while its other input receives the signal CPUACK generated by the allocation unit of FIG. 7.

The output of the NAND gate 36 is moreover connected to the validation input of the CPU row decoding circuit 13.

Furthermore, the circuit 28 receives a selection signal SELECT originating from the processor, a read/write signal R/$\overline{W}$ and the signal Q1.

The addresses are updated and stored during the quarter cycle Q1.

They therefore remain stable during:

| | |
|---|---|
| Q2, Q3, Q4 | for an acces in one cycle |
| Q2, Q3, Q4, Q1, Q2, Q3, Q4 | for an access in two cycles |

This is likewise valid for the read/write signal R/$\overline{W}$.

The 32-bit internal data bus is multiplexed on the 8-bit input/output CPU data bus as a function of the addresses $A_0$–$A_1$.

The data bus entering the register zone is stored during the quarter cycle Q4 only during the first cycle of a processor write.

The outgoing data bus is stored systematically internally in the course of Q3.

FIG. 7 represents the logic for the allocation of the time intervals Ts to the central processing unit CPU. This logic comprises a flip-flop 38, one input of which is connected to the signal MEMCNT and one other input of which receives a signal CK generated by a set of gates 39, 40, 41, 42 from the clock signal H4, the signal MEMCNT and the signals CPU, R/$\overline{W}$ and SELECT.

The same signal CK is applied to another flip-flop 43 which moreover receives the output signal of the flip-flop 38 via the gate 41 and a signal CLEAR originating from the output of the gate 39.

The signal CPUACK appears at the output of the circuit 43.

The allocation of a time interval Ts by the LCM is a function only of the signals:

SELECT valid at the end of Q1
R/$\overline{W}$ valid at the end of Q1

MEMCNT valid at the end of Q1.

On the rising front of $H_2$ before the allocation of the following time interval Ts(n), the LCM validates a combinatory function of these three signals for the purpose of allocating a Ts to the processor if necessary.

| SELECT | R/W | MEMCNT | TS ALLOCATED |
|---|---|---|---|
| 0 | X | X | No Ts |
| 1 | 1 | 1 | No Ts |
| 1 | 1 | 0 | Ts(n) |
| 1 | 0 | 1 | Ts(n+1) following select inhibited |
| 1 | 0 | 0 | Ts(n+1) |

Thus, any request for access to the processor induces the allocation of a single Ts.

The chronograms relating to the four types of access are illustrated by FIG. 8.

The analysis of the chronograms shows that:

the access density has been multiplied by two, 1 access per cycle is guaranteed to the processor, 1 access per cycle is guaranteed to the LCM, the LCM accesses are transparent for the CPU, the LCM accesses are transparent for a DMA, access in one cycle permitted, so that:
 the zone can be used as calculation zone,
 the time constraints have not been made more critical.

The LCM interface of the switched register zone will be described with reference to FIG. 9.

It comprises a blocking register 44 connected to the 32-bit bus 45 for connection with the memory plane 11 and controlled by the signals Q2 or Q4 via an OR gate 46.

The output of this circuit is the interface data output which is always validated.

The LCM interface further comprises an interface circuit having three conditions 47, which receives the data from inputs 31–16 and which transmits them to the bus 45.

This interface is controlled by the signals CPUACK, Q13 and W2, which are applied to it by an AND gate 48 having three inputs, an inverter 49 being connected to the corresponding input of the gate 48 to invert the signal CPUACK.

Another interface circuit having three conditions 50 is intended to transmit to the bus 45 the inputs 15-0 of the LCM. It is likewise controlled by the output signals of an AND gate 51 having three inputs, which receives the signals CPUACK inverted by the inverter 52, Q13 and W1.

The LCM decoding logic represented in FIG. 10 comprises a selection circuit 53 consisting of a demultiplexer which receives on its inputs address signals $AD_0$, $AD_1$, $AD_2$, $AD_3$, $AD_4$ and the validation signal VAL.

The outputs of the selection circuit 53 are connected to inputs of AND gates 54 having two inputs, the other inputs of which receive selection signals from the dedicated registers DEDIC 0, DEDIC 1, DEDIC 2, DEDIC 3, DEDIC 4. The outputs of the gates 54 are connected by corresponding control circuits 55 to the inputs of rows of the memory plane 11.

The circuits 55 are controlled by the output signal of an AND gate 56 which receives the signal Q13 on a first input and the signal $\overline{\text{CPUACK}}$ on a second input.

The internal bus 45 is temporarily made accessible for the LCM interface on $\overline{\text{CPUACK}}$.

This interface permits to the LCM:

a 32-bit read format a 32-bit write format a 16-bit write format made possible by the availability of two independent write signals.

The LCM logic supplies to the address decoder 15 the following signals:

AD0 to AD4: 5 address bits, since 32-bit words are involved,

VAL: request for an access to the address AD4–AD0

DEDIC 0: request for an access to the address 11111

DEDIC 1: request for an access to the address 11110

DEDIC 2: request for an access to the address 11101

DEDIC 3: request for an access to the address 11100

DEDIC 4: request for an access to the address 11011

In this manner, six rows of thirty-two bits may be activated simultaneously.

The transistors at the location of the memory cells of the addresses which can be activated by DEDIC (i) as well as the control elements are dimensioned in order to satisfy these current constraints.

The chronograms of the accesses of the LCM logic are represented in FIG. 11.

Four types of access are to be differentiated, each using a time interval Ts.

1 - 32-bit read

2 - 32-bit write

3 - 16-bit write of the data from 0 to 15

4 - 16-bit write of the data from 16 to 31.

The write cases 2, 3, 4 give chronograms which are identical except for the write request signals W1 and W2.

2 - W1=1, W2=1

3 - W1=1, W2=0

4 - W1=0 W2=1

The data and the addresses are supplied by the LCM over the same time interval Ts.

As far as the read is concerned, the data are available on DATA OUT (0–31) during the totality of an interval Ts, a phase shift by one Ts existing between the addresses and the data.

This phase shift does not give rise to any loss of Ts in the case of a cyclic scanning.

The address generator 2 which forms part of the device for control and for acquisition at high speed represented in FIG. 1 will now be described with reference to FIGS. 12 and 13.

The function of this unit is to supply to the switched register zone 1 the addresses which are necessary in the course of an LCM access.

It must:

1) in the write zone corresponding to the acquisition operations, a) activate DEDIC 0 for the updating of EVENT 8 and FRUN 20 (event and time counters by default), b) activate DEDIC 1–4 for the capture in dedicated register, c) activate VAL and manage the address appropriate for the captures in buffer zone;

2) in the read zone corresponding to the control operations, a) activate VAL and manage the address of the command, b) in the course of a command EXCHG (declaration of a virtual counter), manage the safeguarding of the address of the command and its restitution in the course of the rewrite cycle, c) ensure the synchronization of the scanning and the stopping of the latter;

3) general,

Make the totality of the programmable elements of this generator accessible by the processor.

The part of the address generator which is intended for the acquisition is represented in FIG. 12.

It essentially comprises return-to-zero control circuits 60 to 64 which receive respectively at their inputs the signals COUNT UPDATE for updating the counters by default, $CAPREQ_1$, $CAPREQ_2$, $CAPREQ_3$, $CAPREQ_4$, for requesting capture in dedicated register, and which deliver at their output DEDIC 0 to DEDIC 4 respectively.

The circuits 60, 61 and 62 are connected to one another by their control inputs.

The circuit 62 is moreover connected by its control input to the signal CAP ACK applied moreover to an input of an AND gate 65, the other input of which receives the mode selection signal DEDB.

The output of the gate 65 is connected to the control inputs of the circuits 63 and 64.

The inputs CAPREQ 3 and CAPREQ 4 are connected respectively to the two inputs of an OR gate 66, the output of which is connected to an input of an AND gate 67. The other input of the gate 67 is connected to the signal DEDB via an inverter 68.

The output of the AND gate 67 is connected to an input of an OR gate having four inputs 69, which receives on its three other inputs respectively the signals CAPREQ 5, CAPCONT and CAPREQ 6.

The output of the OR gate 69 is connected to the input of a return-to-zero control circuit 70 which receives on its control input the signal CAPACK.

The output of the circuit 70 is connected to an input of an OR gate 71 having three inputs. Another input of the gate 71 receives a signal CONTACK for validation of a control action, while its third input is connected, on the one hand, to an input of an OR gate 72 having two inputs receiving the signal CAPCYC and, on the other hand, to a divide-by-two counter 73.

The output of the OR gate 71 delivers the signal VAL.

The two inputs of the gate 72 receive respectively the signals CAPACK and CAPCYC.

The signal CAPCYC is a buffer 16-bit write request signal.

The output of the gate 72 is connected to a control terminal of an interface circuit having three conditions 74, the output of which delivers the address signals AD(0–4).

The divider by two 73 further comprises an input C1 connected to the output of the circuit 70. Its output on which a signal BITX appears is connected to the input of a return-to-zero control circuit 75 which likewise controls the signal CAPCYC and which is coupled with another circuit 76, the input of which is connected to the output of the circuit 70.

The outputs of the circuits 75 and 76 are connected together to the incrementation input INC of a 5bit counter 77, another input of which receives the signal DEDB and a third input of which receives this same signal via an inverter 78. The latter, combined with the inputs connected to 0 and to 1 constitute the base address loaded in the counter. The output of the counter 77 is connected to an input of a comparator 79, as well as to the input of the circuit 74.

The other input of the comparator 79 is connected to the output of a blocking programming register 80 defining the buffer end address and its output is connected to the input LD of the counter 77.

The part of the address generator which is intended for the control represented in FIG. 13 comprises the control zone start register 80, the output of which defines the loading address of a 5-bit counter 82 which receives on its input LD the signal START SCAN for starting scanning and which is connected by another input to the output of an incrementation logic 83.

The output of the counter 82 is connected to the input of a control circuit having three conditions 84, at the output of which address signals AD(0–4) appear.

It is moreover connected to an input of a comparator 85, the other input of which is connected to the output of a control zone end programming register 86.

The output of the comparator 85 is connected to an input of the incrementation logic 83, in order to inhibit the latter.

The output of the counter 82 is moreover connected to an input of a blocking register 87 which permits the safeguarding of the current address when the signal CLEAR EXCNG is activated. The output of the circuit 87 is connected to the input of a control circuit having three conditions 88 which is validated by the signal ACK(-1) which is likewise applied after inversion to an AND gate 89.

The outputs of the circuit 88 are connected to the outputs of the circuit 84.

Another input of the AND gate 89 receives a signal CONTACK and its output is connected to the control input of the circuit 84.

The incrementation logic receives, furthermore, respectively, on three inputs signals FRBIT 1, STEP for stepping, and CONTROL STROBE for time management of the decrementation of the counter 82.

The part of the address generator which is intended to generate the signals W1 and W2 represented in FIG. 14 comprises a first AND gate 90 receiving on its two inputs the signals CPUACK and CPU $\overline{R/W}$ respectively. The output of the gate 90 is connected to an input of an OR gate having four inputs 91, another input of which is connected to the output of a second AND gate 92 which receives respectively on its two inputs the signals CAPCYC and BITX.

The signal CAPCYC is moreover applied to an input of a third AND gate 93 which receives on its other input the signal BITX via an inverter 94.

The output of the AND gate 93 is connected to the input of another OR gate having four inputs 95.

A third input of the gate 91 is connected to the output of an AND gate 96 having three inputs on which there are respectively applied the signals ACT(-1), $\overline{DEDB}$ and TYPE B (which defines the mode of operation).

A fourth input of the gate 91 receives the signal CAPACK which is likewise applied to an input of the gate 95.

A third input of the latter is connected to the output of the AND gate 90 and a fourth input receives the signal ACK(-1).

The outputs of the gates 91 and 95 deliver respectively the write signals W1 and W2.

The sequencer 9 of the device for control and for acquisition represented in FIG. 1 will now be described with reference to FIGS. 15 and 16.

This sequencer is intended to manage the interlinkings and the conflicts.

Figure 15:
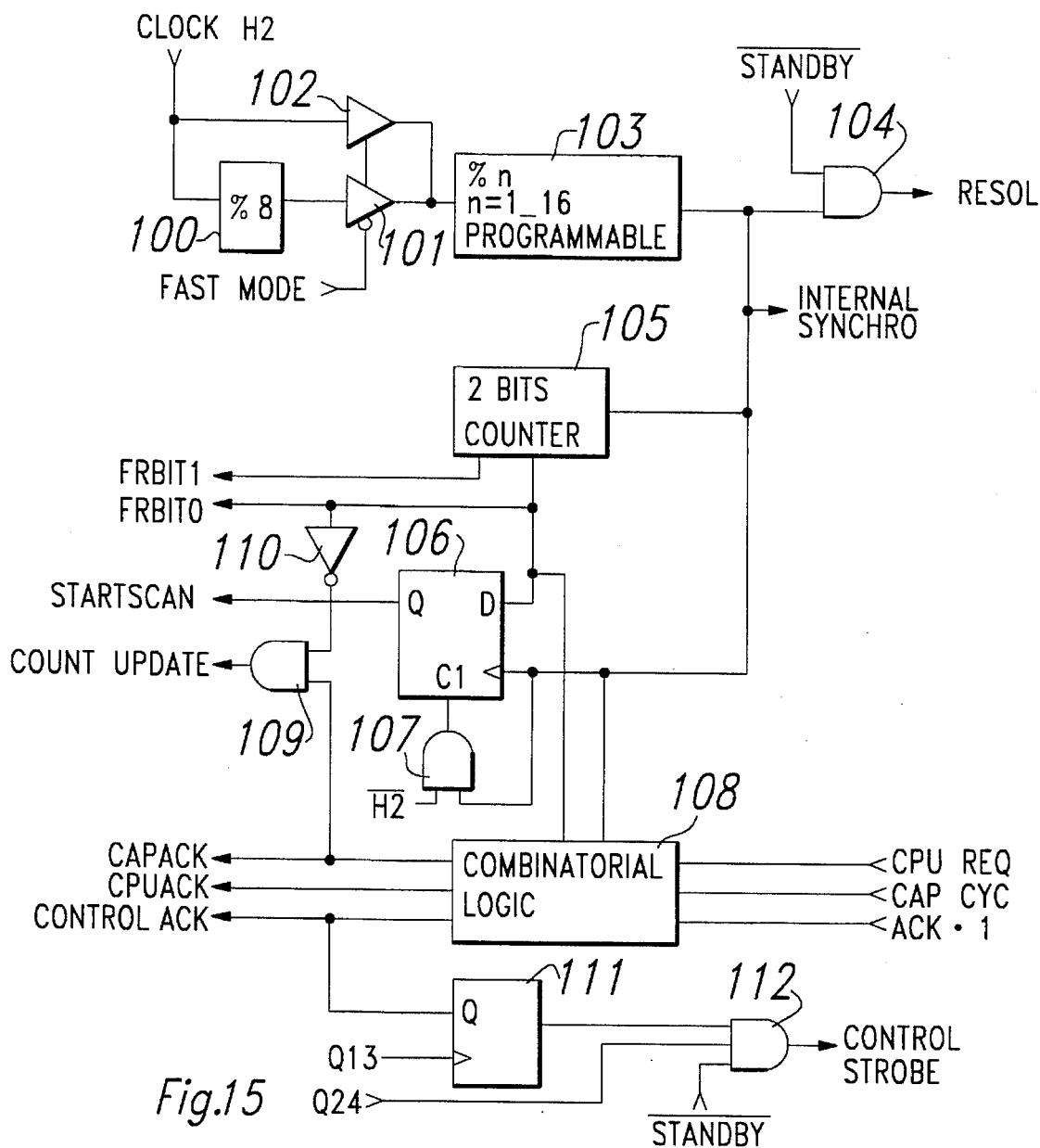
FIGS. 15 and 16 are detailed general diagrams of the sequencer participating in the construction of the module of FIG. 1.

The part of the sequencer 9 which is represented in FIG. 15 is intended to deliver the signals RESOL, INTERNAL SYNCHRO, CONTROL STROBE, CAPACK, CPUACK, CONTROL ACK, COUNT UPDATE for updating the counters by default, STARTSCAN, FRBIT 0, FRBIT 1.

It comprises a divide-by-eight counter 100 which receives on its input a clock signal $H_2$ of the system and which is connected at its output to the input of a control circuit having three conditions 101 which is controlled by a fast mode signal FAST MODE.

The circuit 101 is coupled to another similar circuit 102, the input of which receives the clock signal $H_2$ and the output of which is connected to the output of the circuit 101.

This output is connected to the input of a programmable divide-by-n counter 103 with n=1 to 16.

The output of the counter 103 is connected to an input of an AND gate 104, the other input of which receives the signal $\overline{STANDBY}$, and the output of which delivers the signal RESOL.

The output of the counter 103 is further connected to the input of a 2-bit counter 105 having two outputs.

The output of the counter 103 delivers the signal INTERNAL SYNCHRO.

A first output of the 2-bit counter 105 delivers the signal FRBIT 0 and a second output delivers the signal FRBIT 1.

This second output is further connected to the input D of a flip-flop 106, the clock input of which is connected to the output of the counter 103 and the Cl input of which is connected to the output of an AND gate 107 which receives on an input the signal $\overline{H_2}$ and on its other input the signal INTERNAL SYNCHRO.

The output Q of the flip-flop 106 delivers the signal STARTSCAN.

The output of the 2-bit counter 105 delivering the signal FRBIT 0 is further connected to a combinatory logic circuit 108 which likewise receives the signal INTERNAL SYNCHRO and which further comprises three inputs to which there are applied the signals CPU REQ, CAP CYC and ACK-1.

The signals CAPACK, CPUACK and CONTROL ACK appear on the outputs of the circuit 108.

The circuit 108 carries out the following operations:

CAPACK=SYNC.H2.$\overline{CPUREQ}$

SHIFT IF CPUREQ $\overline{CONTROL\ ACK}$=CPUACK+CAPACK+CAPCYC+ACK−1

CPUACK=CPUREQ

The signal CAPACK is applied to an input of an AND gate 109 which receives on its other input the signal FRBIT 0 inverted by an inverter 110 and which delivers at its output the signal COUNT UPDATE.

The signal CONTROLACK is applied to an input D of a flip-flop 111 which moreover receives the signal Q13 on its clock input and the output of which is connected to an input of an AND gate having three inputs 112, the other two inputs of which receive respectively the signals Q24 and STANDBY.

The signal CONTROL STROBE appears at the output of the gate 112.

Figure 16:
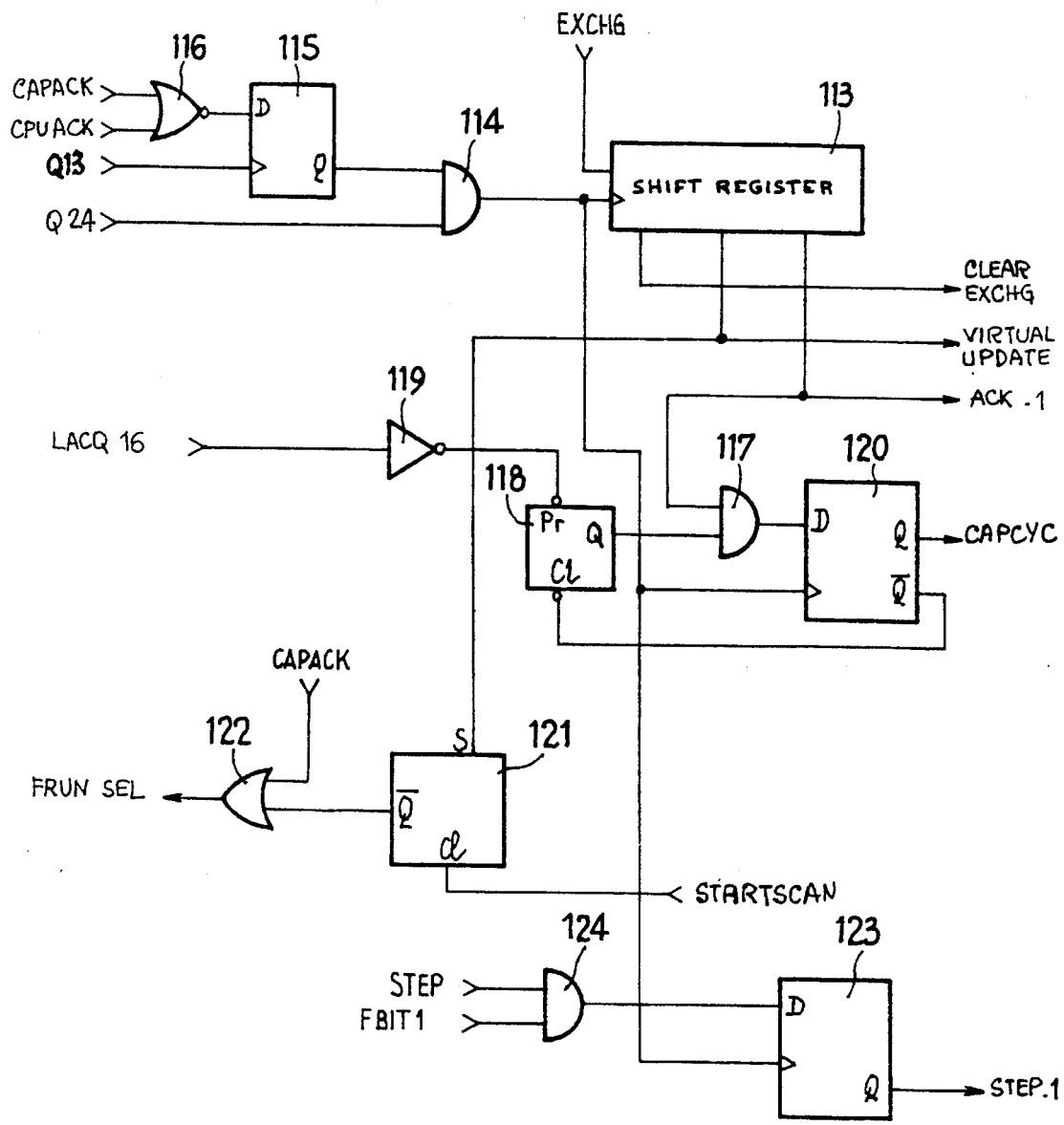

The part of the sequencer 9 which is represented in FIG. 16 is intended to deliver the signals CLEAR EXCHG, VIRTUAL UPDATE for updating the virtual counters, ACK-1, CAPCYC, STEP 1 and FRUN SEL.

It comprises a shift register 113 which receives on a serial input the signal EXCHG and the clock input of which is connected to the output of an AND gate 114. The signal Q24 is applied to an input of this gate, while its other input is connected to the output of a flip-flop 115.

The input D of the flip-flop 115 is connected to the output of a NOR gate 116 which receives on its inputs the signals CAPACK and CPUACK respectively originating from the circuit 108 of FIG. 15. The other input of the flip-flop 115 receives the signal Q13.

The shift register 113 comprises three parallel outputs on which appear respectively the signal CLEAREXCHG, VIRTUAL UPDATE and ACK-1.

The output ACK-1 of the register 113 is further connected to an input of an AND gate 117, the other input of which is connected to the output Q of a flip-flop 118.

The set-to-1 input of the flip-flop 118 receives the signal LACQ16 via an invert 119, while its input cl is connected to the output $\overline{Q}$ of a flip-flop 120, the input D of which is connected to the output of the gate 117 and the output Q of which delivers the signal CAPCYC.

The output VIRTUAL UPDATE of the register 113 is connected to the input S of a flip-flop 121, the input cl of which receives the signal STARTSCAN and the output $\overline{Q}$ of which is connected to an input of an OR gate 122 which receives on its other input the signal CAPACK and which delivers at its output the signal FRUN SEL for selection of the counter by default or for selection of the virtual counter.

The output of the AND gate 114 is finally connected to a clock input of a flip-flop 123, the input D of which is connected to the output of an AND gate 124 which receives respectively on its two inputs the signals STEP and FRBIT 1.

The time base circuit 3 of the device of FIG. 1 is represented in FIG. 17.

It comprises a 16-bit+2-bit adder 125 which receives on twenty of its inputs the signals DATA OUT (16–19) and DATA OUT (0–15) and on two other inputs the signals X0 and X1.

The adder 125 comprises an overflow output connected to an overflow flip-flop 126 which delivers at its output an overflow signal ovf.

The principal output of the adder 125 is connected to the input of a flip-flop circuit 127 of 15 bits, VIRT 16 which constitutes the virtual time reference and to the input of a flip-flop circuit 128 of 19 bits FRUN 20.

The signals DATA OUT (16–19) are further connected to an input of a maximum value decoder 129, other inputs of which receive the signals DATA OUT (24–27) DATA OUT (28–31). The multiple output of the decoder 129 is connected to the input of a control circuit having three states 130 which is controlled by the signal VIRTUAL UPDATE which is likewise applied on the control input E of the circuit 127. The clearing input of this circuit is connected to the output of a clearing logic 131 of the said circuit which receives on two inputs respectively the signals VIRT CLEAR and TYPE A.

The clock input of the circuit 128 is connected to the output Q of a flip-flop 132 which receives respectively on its input D the signal COUNT UPDATE and on its clock input the signal Q24. It comprises a set-to-zero input receiving the clearing signal CLEAR FRUN 20 and a first output on which appear the data signals DATA IN (16–19).

The output of the circuit 127 is connected to the input of a control circuit having three conditions 133 which is coupled to a circuit 134, the input of which is connected to the output of the circuit 128. The signal FRSELECT is applied to the control inputs of the circuits 133 and 134.

The output of the adder 125 is further connected to the input of a control circuit having three conditions 135, which is controlled by a signal DOUBLE validating a comparison of the double event type which likewise controls two circuits having three conditions 136, 137, the inputs of which are connected together to the outputs of an 8-bit flip-flop circuit 138.

The circuit 138 comprises eight inputs, each connected to an 8-bit+1-bit adder 139 which receives at its inputs the signals DATA OUT (28–31) and DATA OUT (24–27) and which comprises furthermore an addition input connected to the output of a multiplexer 140 which receives on its input the signal EVENT (i) ($1 \leq i \leq 4$), a clearing input connected to an output of a clearing and event clock logic 141, and a clock input connected to a corresponding output of the logic 141.

The latter comprises an input receiving the signal CLEAR EVENT, an input receiving the signal ACQ and an input receiving the signal TYPE A.

The circuit 138 is moreover connected by its said outputs to two circuits having three conditions 142,143, one controlled by the signal DEDB and the other by this signal inverted. Furthermore, the signal DEDB is applied to an input of the logic 141.

The outputs of the circuits 142, 143 are connected together to an input of a four-bit comparator 144, the other input of which receives the signals DATA OUT (28–31).

The signals DATA OUT (24–27) are applied to an input of a four-bit comparator 145 which receives on its other inputs the signal originating from the output of the circuit 138 which is connected to the circuit 143.

The outputs of the comparators 144 and 145 are applied to the respective inputs of an AND gate 146, the output of which delivers the signal COMP 8, while the output of the comparator 144 delivers the signal COMP 4.

The outputs of the circuits having three conditions 130, 136, 137, 133, 134 and 135 are connected together in order to constitute the time reference bus and deliver the signals DATA IN (1–15).

The most significant signals 8–15 are connected to an input of an 8-bit comparator 147, another input of which is connected to an output of the adder 125 and the least significant signals 0–7 are connected to an input of another comparator 148, the other input of which is likewise connected to another output of the adder 125.

The outputs of the comparators 147, 148 on which appear the signals COMP 8 (2) and COMP 8 (1) respectively, are connected to the inputs of an AND gate 149, the output of which is connected to first inputs of two AND gates 150 and 151.

The other input of the gate 150 is connected to the bit 0 of the adder 125, while the other input of the gate 151 is connected to this same output via an inverter 152.

The outputs of the gates 150 and 151 deliver respectively the signals COMP 16(n+1) and COMP 16(n).

The output of the gate 149 is furthermore connected to an input of the clearing or set-to-two logic 131 of the virtual counter materially represented by the circuit 127.

Finally, the time reference bus to which are connected the outputs of the circuits 130, 136, 137, 133, 134 and 135 is connected to the input of a zero detection circuit 153 which delivers at its output a signal ZERO.

The action unit 4 which will now be described with reference to FIGS. 18 to 21 is a combinatory unit, a function of which is to effect the decoding of the control commands.

The command bits emanate from the switched register memory 1 (FIG. 1).

The validation of these commands is effected on the basis of the signals emanating from the time base 3.

Figure 18:
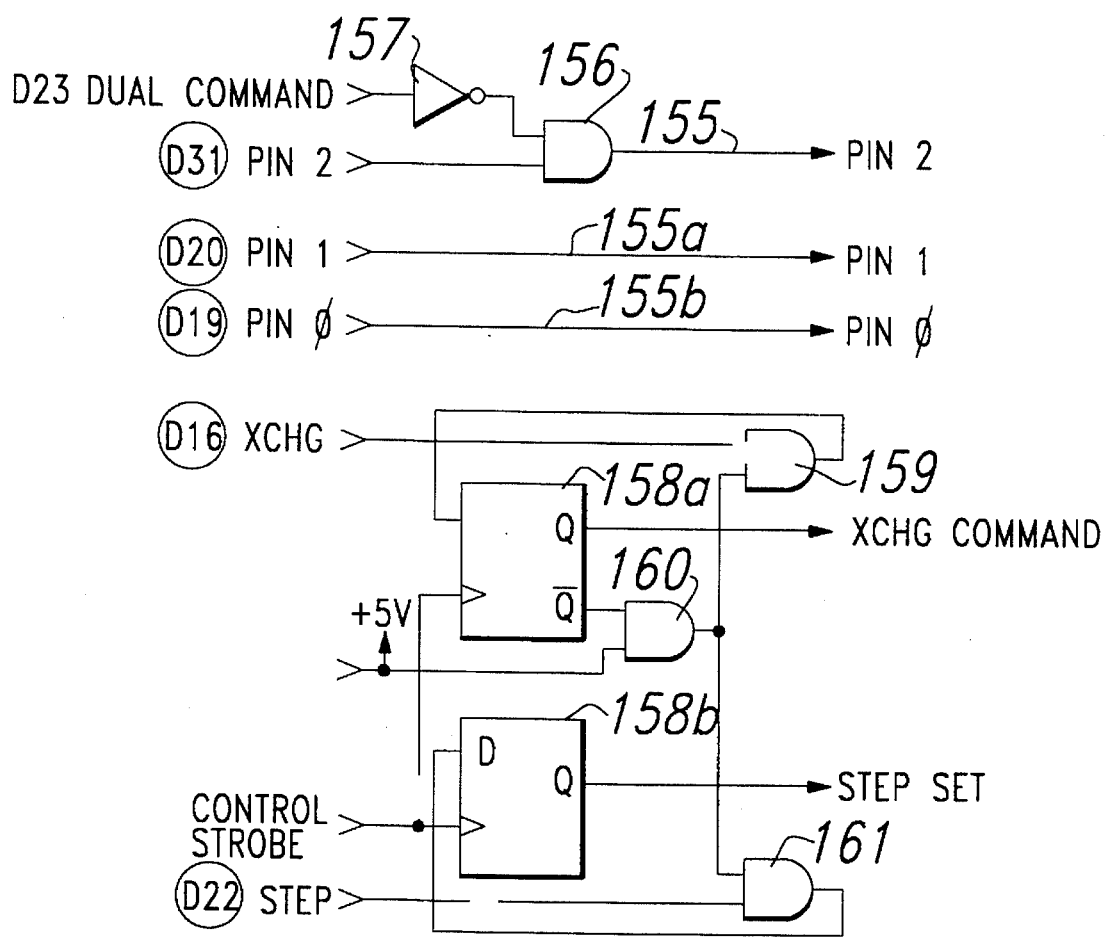
Figure 19:
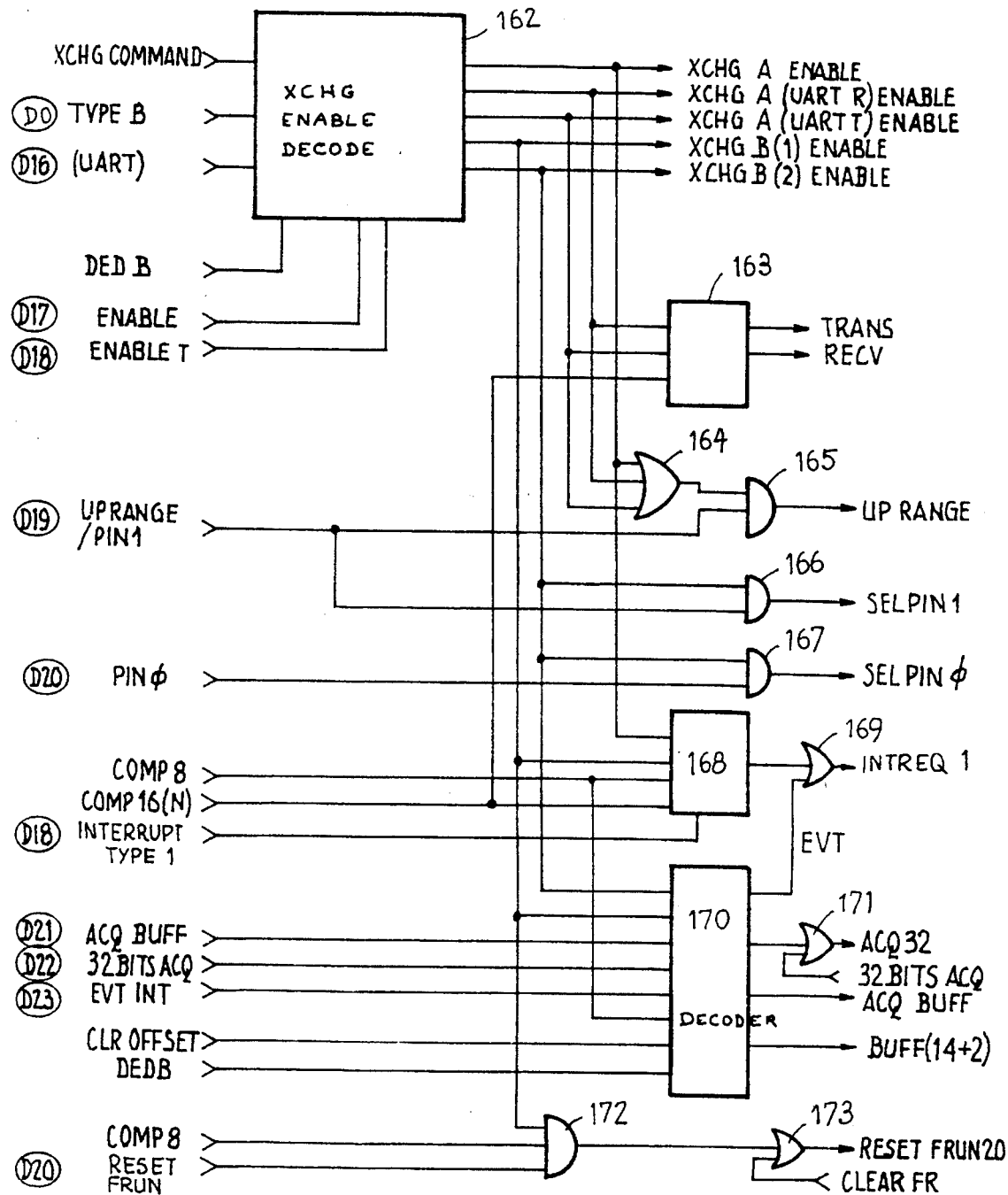
Figure 20A:
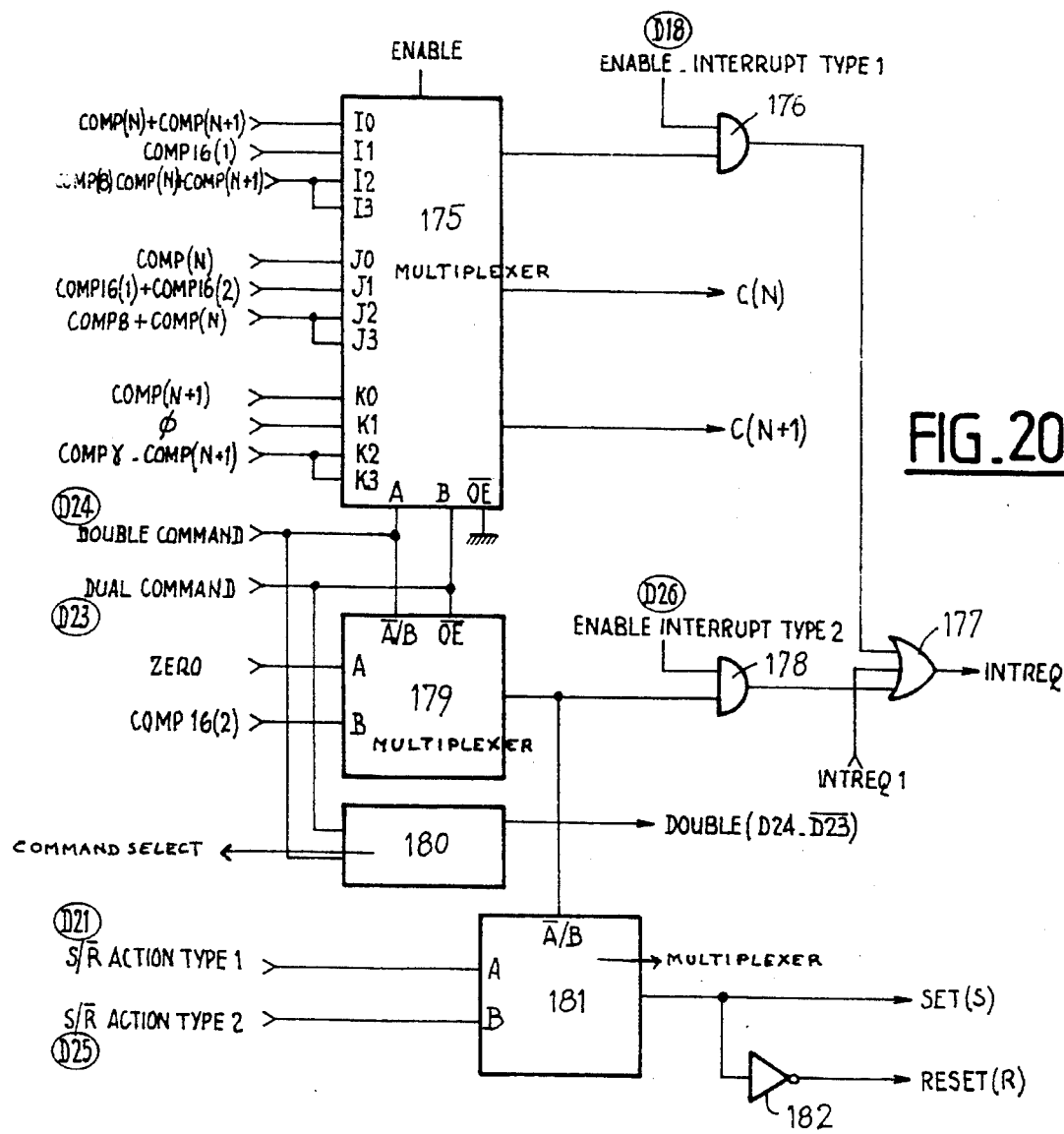
Figure 20B:
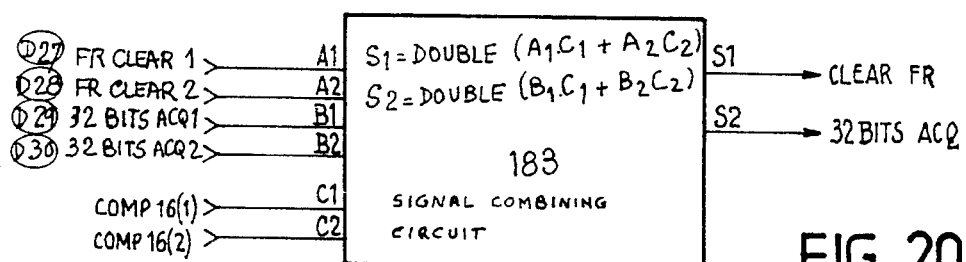

This action unit comprises a mode detection device represented in FIG. 18, a device for the interpretation of the commands EXCHG which is represented in FIG. 19, a device for the interpretation of the normal commands which is represented in FIGS. 20a and 20b and a device for the synchronization of the actions which is represented in FIG. 21.

The mode detection device of FIG. 18 comprises a first channel 155 in which there is connected an AND gate 156, an input of which receives the signal PIN2 and the other input of which receives the signal DUAL COMMAND via an inverter 157.

The channel 155 delivers the signal PIN2.

The device comprises a second and a third channel 155a, 155b, which transmit respectively, the signals PIN1 and PIN0. These three signals permit the selection of the output to which the action must relate.

The mode detection device further comprises two flip-flops 158a and 158b which are intended to produce respectively the signals XCHG Command and STEP SET appearing at their output Q, this signal STEP SET controlling the setting up of an interlaced scanning mode.

The flip-flop 158a receives on its input-D the output signal of an AND gate 159. An input of this gate receives the signal XCHG, while its other input is connected to the output of an AND gate 160, an input 0f which is connected to the output $\overline{Q}$ of the flip-flop 158a and the other input of which is connected to a source of voltage +5 V.

The output of the gate 160 is further connected to an input of an AND gate 161, the other input of which receives the signal STEP. Its output is connected to the input D of the flip-flop 158b which, on its clock input, receives the signal CONTROL STROBE which is likewise applied to the clock input of the flip-flop 158a. The two signals XCHG COMMAND and STEP SET are able to effect the sequencing of the control zone.

The device for the interpretation of the commands XCHG which is represented in FIG. 19 comprises principally a decoding circuit 162 which receives at its inputs the signals XCHG COMMAND, TYPE B, UART, DEDB, ENABLE, and ENABLE T and which delivers on its outputs the authorization signals XCHG A ENABLE, XCHG A (UART R) ENABLE, XCHG A (UART T) ENABLE, XCHG B (I) ENABLE and XCHG B (2) ENABLE.

The outputs XCHG A (UART R) and XCHG A (UART T) are connected to a control circuit 163 which delivers at its output the signals TRANS and RECV after validation by the signal COMP 16 (N).

These same outputs as well as the output XCHG A are connected to three inputs of an OR gate 164, the output of which is connected to an input of an AND gate 165, the other input of which receives the signal UP RANGE/PIN1 D19 and which delivers at its output the signal UP RANGE.

The input UP RANGE/PIN1 is further connected to an input of an AND gate 166, the other input of which is connected to the output XCHG B(2) of the circuit 162.

This gate delivers at its output the signal SELPIN1.

An AND gate 167 is connected by one of its inputs to the output XCHG B(2) and receives on its other input the signal PIN 0.

It delivers at its output the signal SELPIN 0.

A decoder 168 comprises an input connected to the output XCHG A of the circuit 162, another input connected to the output XCHG B (1) of this circuit and three inputs receiving respectively the validation signals COMP 8, COMP 16(N) and INTERRUPT 1.

Its output is connected to an input of an OR gate 169, the other input of which is connected to an output of a decoder circuit 170 and the output of which delivers the signal INTREQ$_1$.

The circuit 170 comprises a first input connected to the output XCHG B(2) and a second input connected to the output XCHG B(1) of the circuit 162 and other inputs receiving respectively the signals COMP 8, ACQBUF, 32 bits ACQ, EVT INT., CLR OFFSET and DEDB, which are control bits.

One of the outputs of the circuit 170 is connected to an input of an OR gate 171, the other input of which receives the signal 32 BITS ACQ and the output of which delivers the signal ACQ 32 (32-bit capture request).

A second output of the circuit 170 delivers the signal ACQ BUFF and a third output delivers the signal BUFF (14+2) which are 16-bit capture requests.

An AND gate 172 having three inputs receives on respective inputs the signals XCHG B (1) ENABLE of the circuit 162 and the signals COMP 8 and RESET FR and is connected at its output to an input of an OR gate 173, the other input of which receives the signal CLEAR FR and the output of which delivers the signal RESET FRUN 20.

The part of the device for the interpretation of the normal commands of the action unit which is represented in FIG. 20a comprises a multiplexer 175 on the inputs $I_0$ to $I_3$ of which, $I_2$ and $I_3$ being connected together, are respectively received the signals:

COMP(N)+COMP(N+1)

COMP16 (1)

COMP(8) COMP(N)+COMP(N+1).

The multiplexer further comprises inputs $J_0$ to $J_3$, $J_2$ and $J_3$ being connected together, on which there are respectively received the signals:

COMP(N)

COMP 16(1)+COMP 16(2)

COMP(8). COMP(N)

and inputs $K_0$ to $K_3$, $K_2$ to $K_3$ being connected together, on which there are respectively received the signals:

COMP(N+1)

0

COMP 8. COMP(N+1).

On the selection inputs A and B of the multiplexer 175 there are received the signals DOUBLE COMMAND and DUAL COMMAND and on a last input there is received the validation signal ENABLE.

One of the outputs of the multiplexer 175 is connected to an input of an AND gate 176, the other input of which receives the signal ENABLE. INTERRUPT TYPE 1 and the output of which is connected to an input of an OR gate having three inputs 177. A second input of the OR gate 177 receives the signal INT REQ 1 and a third input is connected to the output of an AND gate 178, one input of which receives the signal ENABLE INTERRUPT TYPE 2 and the other input of which is connected to the output of a multiplexer 179, which receives on its inputs A and B respectively the signals ZERO and COMP 16 (2) and which receives on its selection and validation inputs $\overline{A/B}$ and $\overline{OE}$ the signals DOUBLE COMMAND and DUAL COMMAND respectively.

The output of the OR gate 177 delivers the signal INTREQ.

The signals DOUBLE COMMAND and DUAL COMMAND are likewise applied to a double command detection circuit 180 which delivers at its output a signal DOUBLE.

Finally, a multiplexer 181 receives on its inputs A and B the signals S/$\overline{R}$ ACTION TYPE 1 and S/$\overline{R}$ ACTION TYPE and receives on its selection terminal $\overline{A/B}$ the output of the multiplexer 179.

Its output delivers the signal SET (S) and the signal RESET(R) obtained by inversion of the signal SET by means of an inverter 182.

The part of the action unit which is represented in FIG. 20b essentially comprises a signal combination circuit 183 which receives respectively on its inputs $A_1$ $A_2$ $B_1$ $B_2$ and $C_1$ $C_2$ the signals FR CLEAR 1, FR CLEAR 2, 32 BITS ACQ1, 32 BITS ACQ2 and COMP 16 (1), COMP 16 (2) and which delivers on its outputs $S_1$ and $S_2$ the signals CLEAR FR and 32 BITS ACQ.

The circuit 183 establishes between its input and output signals the following relations:

$S_1 = DOUBLE.(A_1.C_1 + A_2.C_2)$ $S_2 = DOUBLE.(B_1.C_1 + B_2.C_2)$

This circuit is advantageously of the programmable logic type.

The device for the synchronization of the actions which is represented in FIG. 21 comprises an action circuit 184 consisting of a set of flip-flops which receives on its inputs the signals:

TRANS
RECV
UPRANGE
SELPIN 0
SELPIN 1
ACQ 32
ACQ BUFF
BUFF (14+2)
RESET FRUN20
INTREQ
C(N)
SET
C(N+1)
RESET
PIN 0
PIN 1
PIN 2 and which delivers at its output the signals:

LTRANS
L RECV
LOW
L SELPIN 0
L SEL PIN 1
LACQ 32
LACQ BUFF
ACQ 14+2
CLR FRUN 20
LINT REQ
LC(N)
S
LC(N+1)
R
LPIN 0
LPIN 1
LPIN2.

The clock terminal of this circuit is connected to the signal CONTROL STROBE.

The synchronization device comprises, in addition, a channel 185 for transmission of the signal XCHG COMMAND and a channel 186 for transmission of the signal STEPSET.

The input unit 5 of the device of FIG. 1 will be described with reference to FIGS. 22a to 22c.

Figure 22A:
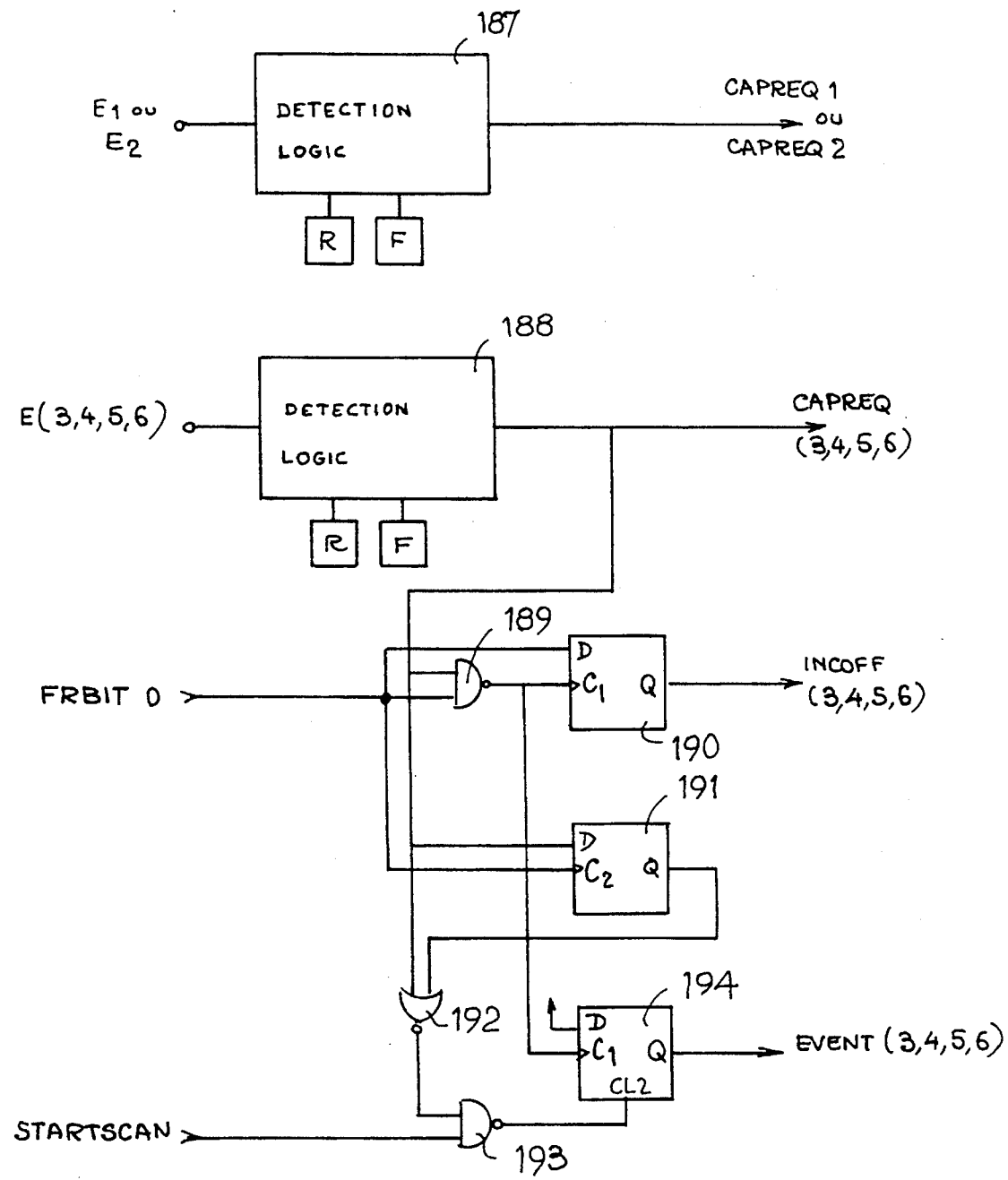
FIGS. 22a and 22b are general diagrams of the input unit of the module of FIG. 1.
Figure 22:
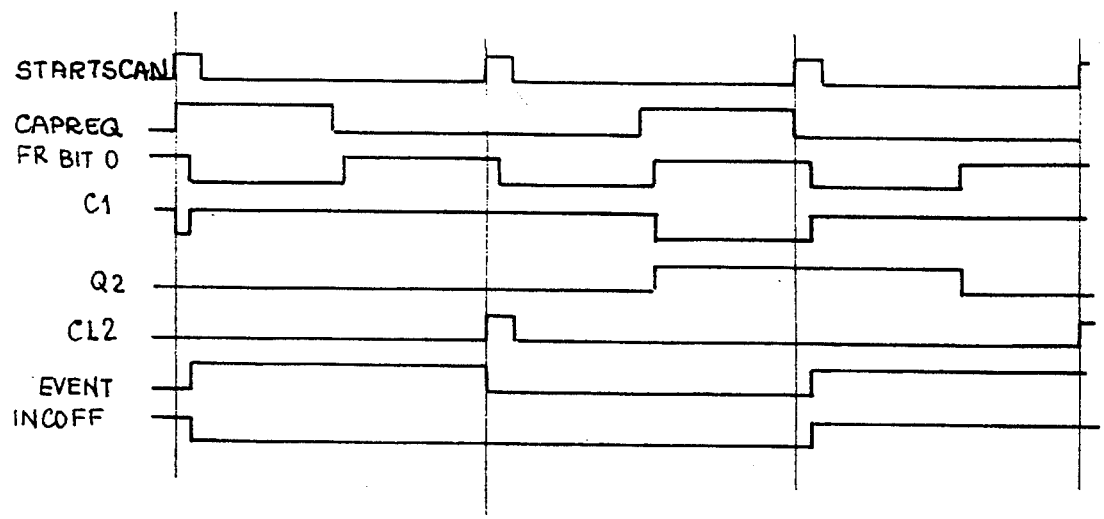
FIG. 22c is a chronogram of the generation of events at the level of the input unit of FIGS. 22a, 22b.
Figure 22:
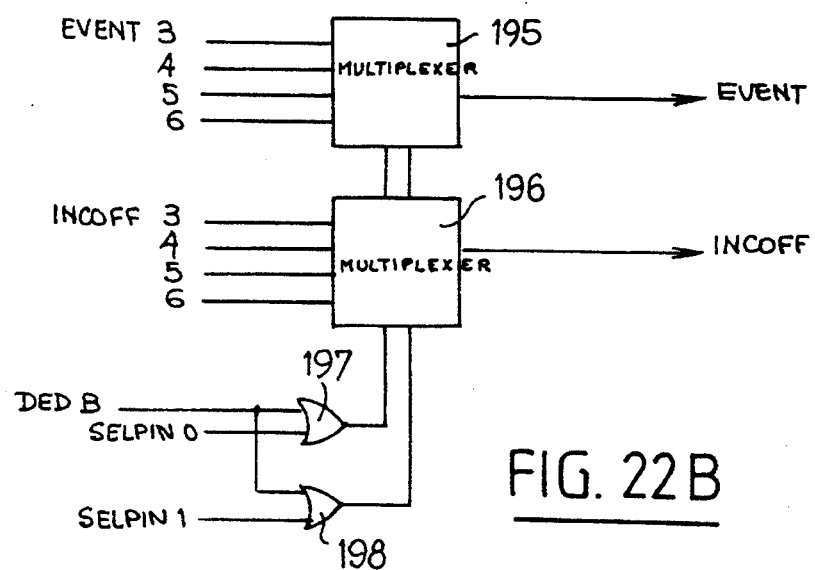

It comprises a device for the detection of changes of condition on one of its inputs which is represented in FIG. 22a, a device for the generation of capture request signals to the address generator unit, and a device for the generation of signals EVENT and INCOFF to the time base, which is represented in FIG. 22b.

The device of FIG. 22a comprises two detection logics such as 187 which receive on their input an input signal $E_1$ and $E_2$ and which deliver at their respective outputs the signals CAPREQ$_1$ or CAPREQ$_2$.

This device further comprises four detection logics such as 188 which are identical to the logic 187 which receive on their inputs the signals $E_3$, $E_4$, $E_5$, $E_6$ respectively and which deliver at their outputs the signals CAPREQ 3, 4, 5, 6.

The output of the logic 188 is connected to an input of a NAND gate 189 which receives on its other input the signal FR BIT0 and the output of which is connected to the clock input of a flip-flop 190.

The input D of the flip-flop 190 receives the signal FRBIT 0 and its output delivers the signal INC OFF (3, 4, 5, 6).

The output of the detection logic 188 is furthermore connected to the input D of a flip-flop 191, the clock input of which receives the signal FRBIT 0 and the output of which is connected to an input of a NOR gate 192. The other input of the gate 192 is connected to the output of the logic 188 and its output is connected to an input of a NAND gate 193 which receives on its other input the signal STARTSCAN.

The output of the gate 193 is connected to an input CL2 of the flip-flop 194, the clock input of which is connected to the output of the gate 189 and the output of which delivers the signal EVENT (3, 4, 5, 6).

The device represented in FIG. 22b comprises a multiplexer 195, the inputs of which are connected to the flip-flops such as 194 of the device of FIG. 22a and a multiplexer 196, the inputs of which are conf which are conlip-flops such as 190.

Moreover, the selection inputs of the multiplexers 195 and 196 are connected to one another and connected to the outputs of two OR gates 197 and 198 which receive on one of their inputs the signal DEDB and on their other input respectively the signal SELPIN 0 and the signal SELPIN1.

The multiplexers 195 and 196 deliver respectively the signals EVENT and INCOFF.

Figure 23:
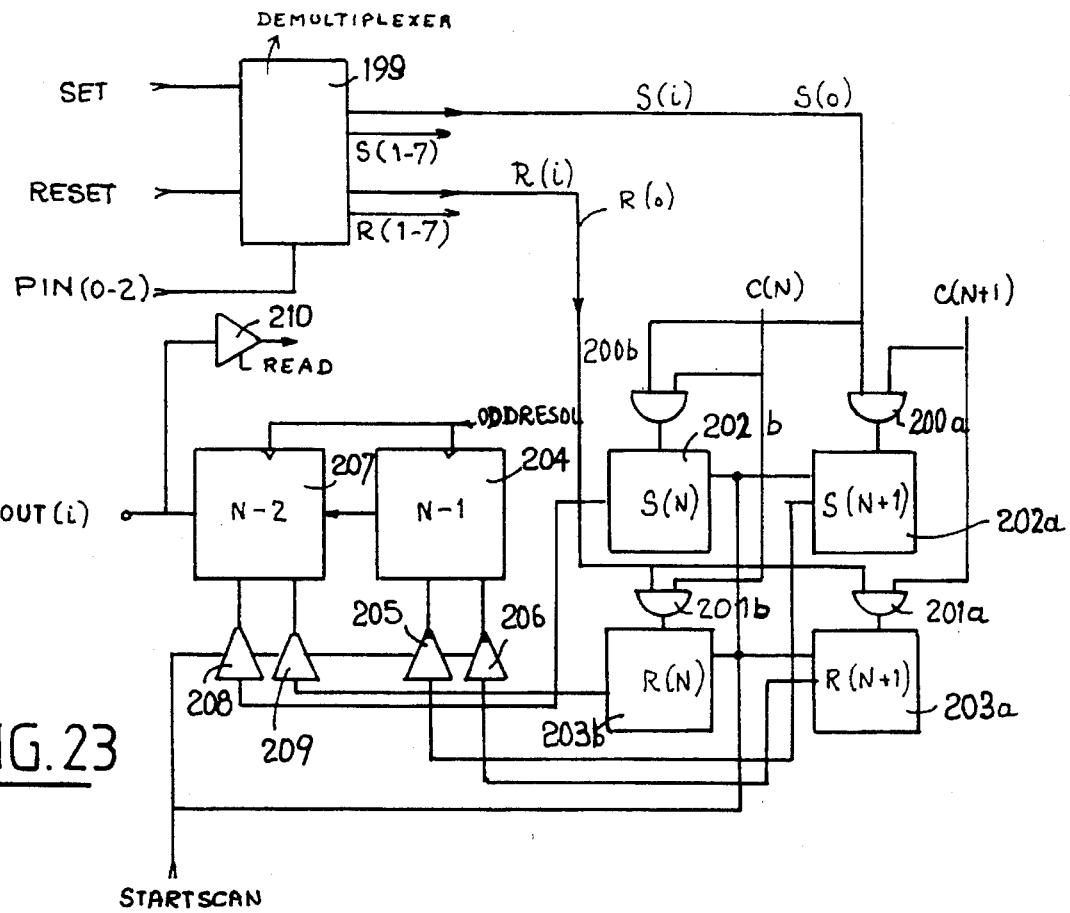
FIG. 23 is a general diagram of the output unit of the module of FIG. 1.

The output unit 6 of the device of FIG. 1 is represented in FIG. 23.

The function of this unit is the desequentialization of the outputs.

It is likewise intended for the reading by the associated processor of the condition of the outputs.

This output unit comprises a demultiplexer 199 which receives on its inputs the signals SET and RESET originating from the action unit 4 (FIGS. 1 and 20a) as well as the signals PIN (0-2). It delivers on its outputs S(i) and R(i) (i varying from 0 to 7).

Each output S(i) of the multiplexer 199 is connected to an input of two AND gates 200a and 200b which receive respectively on their other input the signals C (N+1) and C (N). These same signals are applied to first inputs of AND gates 201a and 201b which receive respectively on their other input each signal R(i).

The output of the gate 200a is connected to an establishment input of a flip-flop 202a for the processing of the signal S(N+1), while the output of the gate 200b is connected to an establishment input of a flip-flop 202b for the processing of the signal S(N).

The outputs of the gates 201a and 201b are respectively connected to the establishment inputs of flip-flops 203a and 203b for the processing of the signals R(N+1) and R(N). The outputs of the flip-flops 202a and 203a are connected to the inputs S and R of a flip-flop 204 via control circuits with return to zero 205 and 206.

The outputs of the flip-flops 202b and 203b are connected to the inputs S and R of a flip-flop 207 via circuits 208 and 209. The shift inputs of the circuits 204 and 207 receive the signal ODDRESOL.

The circuits 205, 206, 208 and 209 are controlled by the signal START SCAN.

The circuit 207 comprises an output on which appears the signal OUT(i) (i varying from 0 to 7) and which is connected to an interface circuit having three conditions 210 with READ command.

Figure 24:
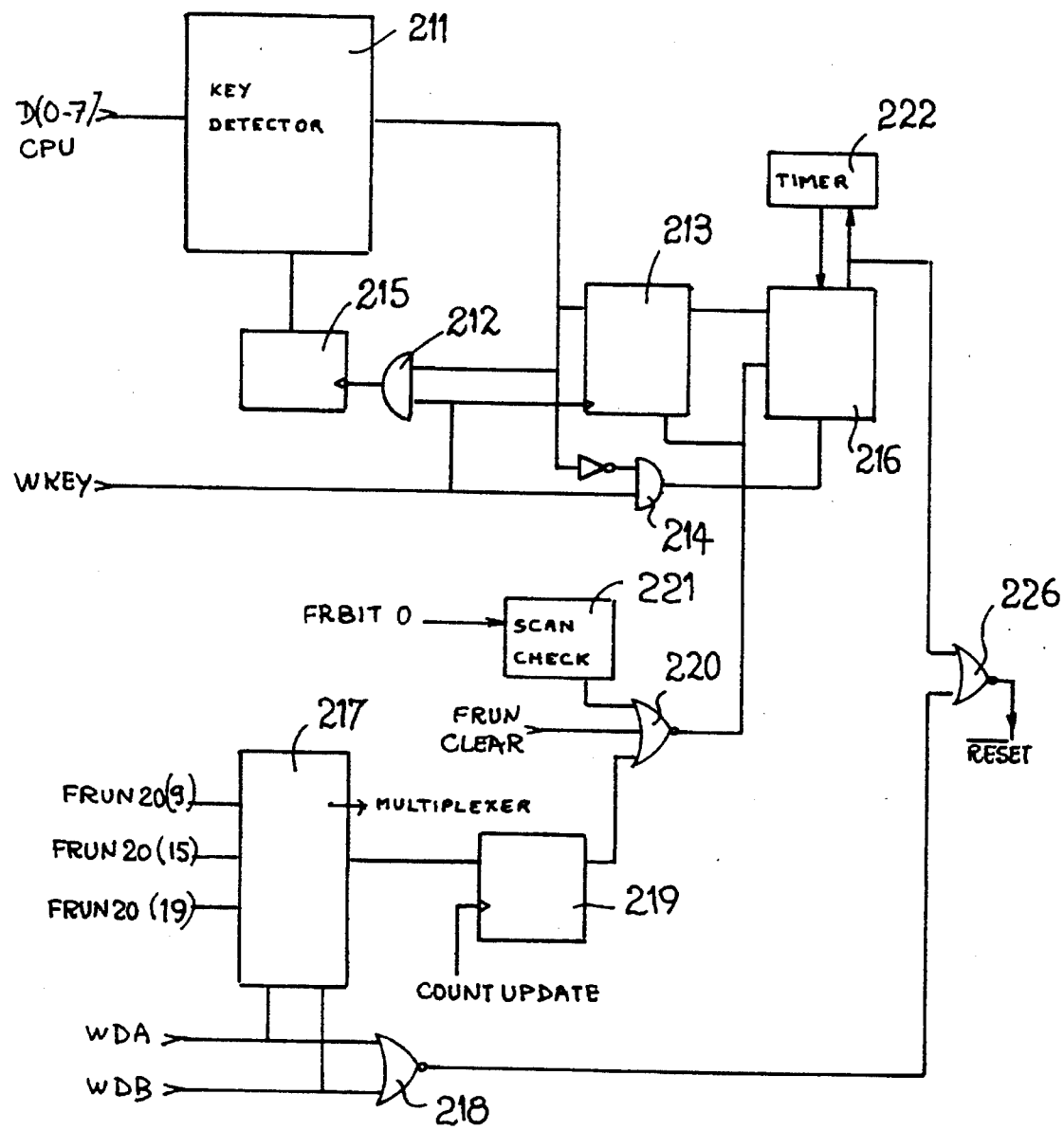
FIG. 24 is a general diagram of a "guard dog" unit of the module of FIG. 1.

The supervision unit 8 or "guard dog" of the device of FIG. 1 has as its purpose to ensure the security of the system. It is represented in FIG. 24.

It comprises a key detection circuit 211 (AAH, 55H) which receives on its input the signals CPU D (0–7) and which delivers at its output a signal KEY OK applied, on the one hand, to an input of an AND gate 212 and, on the other hand, to an input D of a flip-flop 213 and thirdly, after inversion, to an input of an AND gate 214.

The other input of the AND gate 212 receives the write signal WKEY which is likewise applied to the clock input of the flip-flop 213 and to the other input of the AND gate 214.

The output of the AND gate 212 is applied to the input of a divider by two 215, the output of which is connected to the detection circuit 211.

This detection circuit is a multiplexer.

The output of the gate 214, on which appears the signal WRONGK, is applied to the input Cl of a flip-flop 216, the input D of which is connected to the output of the flip-flop 213, on which appears the signal WDACK.

A multiplexer 217 receives on its inputs the signals FRUN20 (9), FRUN20 (15), FRUN20 (19) as well as the signals WDA and WDB for guard dog programming, which are likewise applied to the inputs of a NOR gate 218.

The output of the multiplexer 217 is connected to the input D of a flip-flop 219, the clock input of which receives the signal COUNT UPDATE and the output of which is connected to an input of a NOR gate having 3 inputs 220 which, on another of its inputs, receives the signal FRUN CLEAR and the third input of which is connected to the output of a scanning verification circuit 221. The input of this circuit receives the signal FRBIT 0.

The output of the gate 220, on which appears the signal WDSTART, is connected to the input Cl of the flip-flop 213 and to the clock input of the flip-flop 216.

The output of the latter is connected to a time delay circuit 222 (4-bit counter), the output of which is, in its turn, connected to the establishment input of the circuit 216.

Furthermore, the output of the circuit 216 is connected to an input of an OR gate 226, the other input of which receives the signal WD DISABLE from the output of the gate 218.

The gate 226 delivers at its output the signal RESET.

Figure 25B:
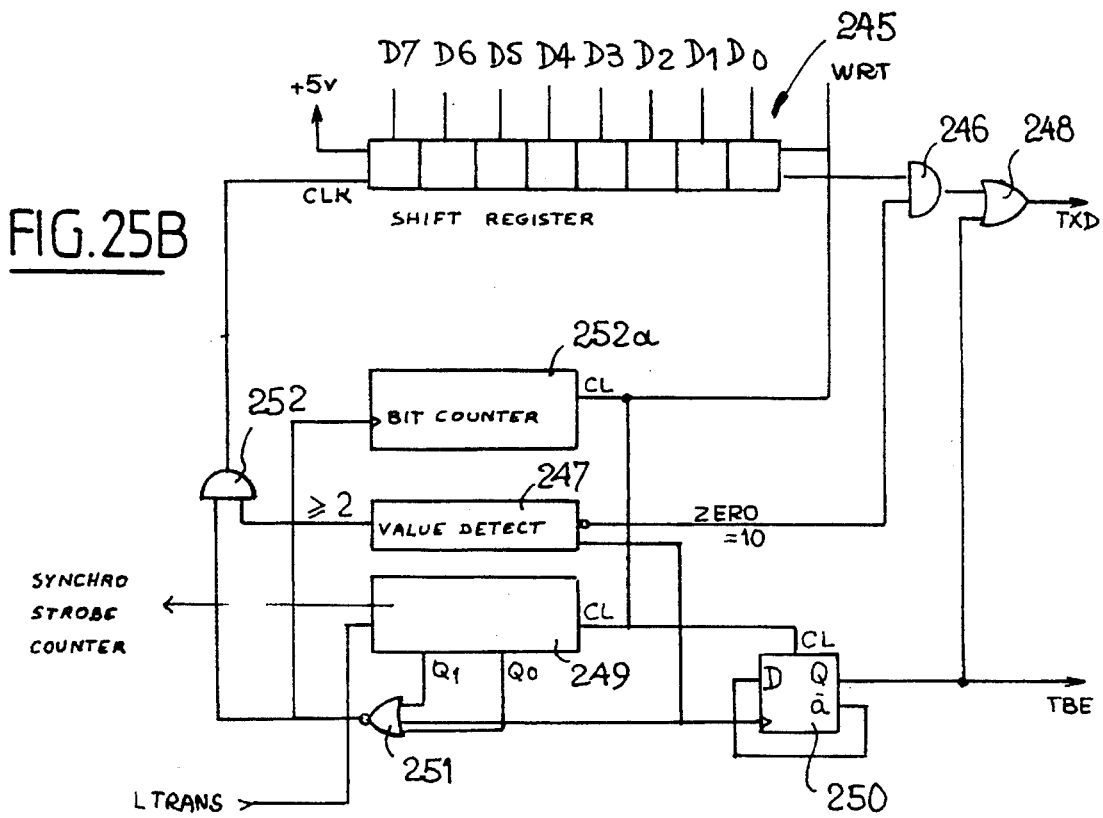
FIGS. 25a and 25b are diagrams of the serial interface unit of the module of FIG. 1.
Figure 25A:
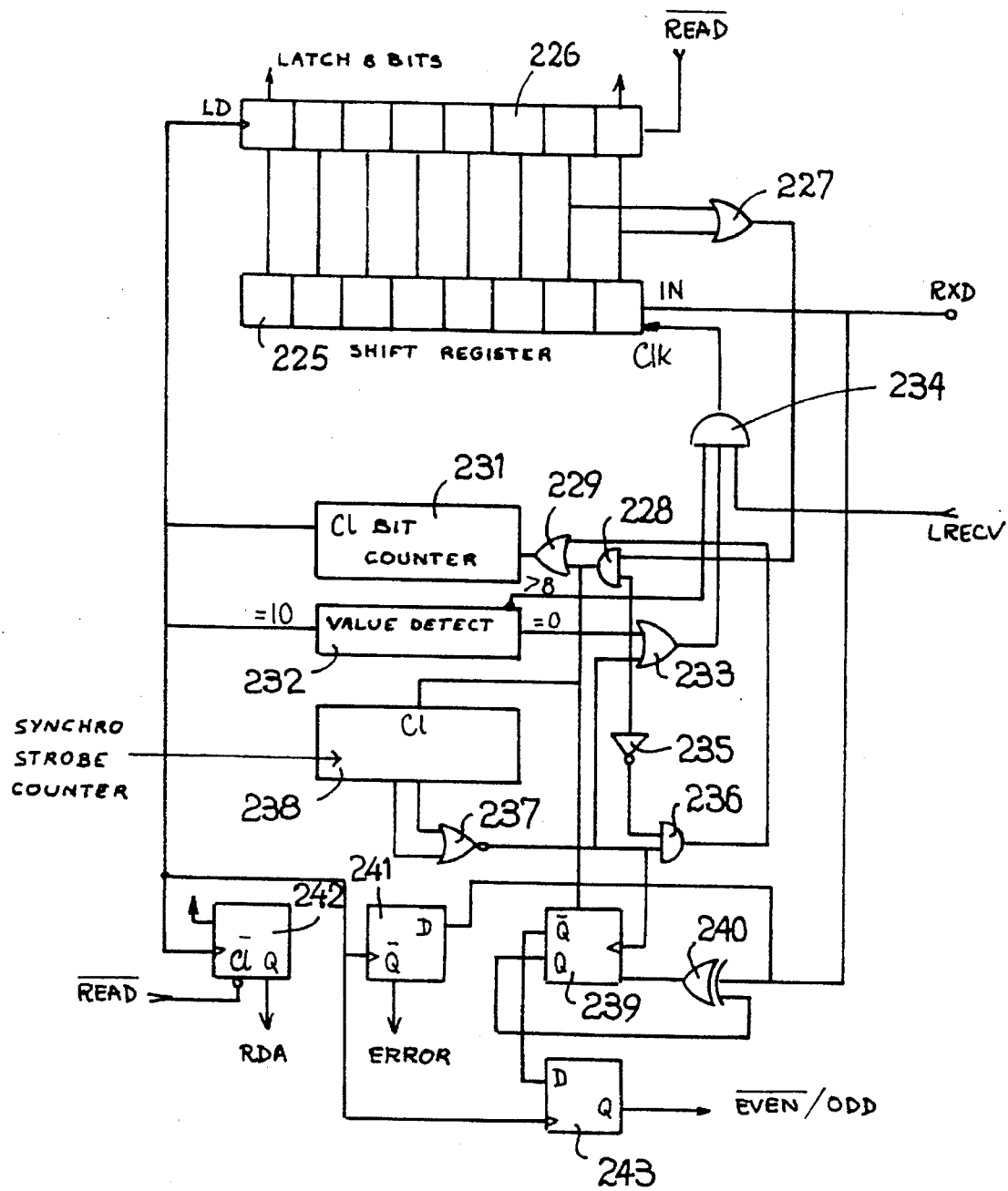

The serial interface unit 7 of the device of FIG. 1 is represented in FIGS. 25a and 25b.

It is intended to act as peripheral function of the time base 3.

It comprises a reception part represented in FIG. 25a and a transmission part represented in FIG. 25b.

The reception part comprises principally an 8-bit shift register 225, the eight stages of which are connected to a blocking register 226.

The register 225 receives on its serial input the signal RXD and the outputs of its stages B6 and B7 are connected to two inputs of an OR gate 227.

The clock of the circuit 226 receives on its input the signal READ.

The output of the gate 227 is connected to an input of an AND gate 228, the output of which is connected via an OR gate 229 to the clock input CLK of a 4-bit counter 231.

The other input of the AND gate 228 is connected to an output 0 of a value detection circuit 232, which is likewise connected to an input of an OR gate 233, the output of which is connected to an input of an AND gate 234 having three inputs.

The AND gate 234 receives on a second input the signal LRECV and is connected by its third input to the output >8 of the circuit 232.

The output of the gate 234 is connected to the clock input CLK of the register 225.

The output 0 of the value detection circuit 232 is further connected by an inverter 235 to an input of an AND gate 236, the output of which is connected to the other input of the OR gate 229 and the other input of which is connected to the output of a NOR gate 237. The latter is connected by its inputs to the outputs $Q_1$ and $Q_0$ of a median synchronization top bit counter 238.

The input cl of this counter is connected to the output of the circuit 228.

The clock input of the flip-flop 239 is connected to the output of the gate 237.

Its input D is connected to the output of an EXCLUSIVE OR gate 240, one input of which receives the signal RXD and the other input of which is looped back to the output Q of the flip-flop 239. This flip-flop serves for the computation of the parity.

The input of the gate 240 which receives the signal RXD is further connected to the terminal D of a flip-flop 241 associated with a flip-flop 242, the clock input of which is connected to the clock input of a flip-flop 242, which is itself connected to the output=10 of the circuit 232 as well as to the input Cl of the circuit 231

The flip-flop 242 further receives on its input Cl, the signal $\overline{READ}$.

The output $\overline{Q}$ of the flip-flop 241 delivers an error signal FRAINING ERROR and the output Q of the flip-flop 242 delivers the signal RDA (valid data item).

A flip-flop 243 connected on the one hand to the output $\overline{Q}$ of the flip-flop 239 and on the other hand to the clock inputs of the flip-flops 241, 242 delivers the signal $\overline{EVEN/ODD}$.

The transmission part of the serial interface block represented in FIG. 25b comprises an eight-bit shift register 245 receiving the signals D7 to D0.

The serial output of the shift register 245 is connected to an input of an AND gate 246, the other input of which is connected to the zero output of a value detection circuit 247 and the output of which is connected to an input of an OR gate 248 which delivers the signal TXD.

A synchronization two-top-bit counter 249 receives on its input the signal LTRANS and is connected by its terminal Cl, likewise connected to an output of the register 245, to the terminal Cl of a flip-flop 250 connected by its clock input to the output=10 of the value detection circuit 247.

The output Q of the flip-flop 250 is connected to the other input of the OR gate 248 and delivers the signal TBE.

The synchronization top counter 249 comprises two outputs $Q_1$ and $Q_0$ respectively connected to two inputs of a NOR gate 251 having three inputs, the third input of which receives likewise the clock signal of the flip-flop 250.

The output of the gate 251 is connected to an input of an AND gate 252, the other input of which is connected to the output $\geq 2$ of the circuit 247.

The output of the gate 251 is furthermore connected to the count input of the 4-bit counter 252a connected by its terminal Cl to the terminal Cl of the synchronization top counter 249.

The output of the gate 252 is connected to the clock input CLK of the shift register 245.

The interrupt unit 10 of the circuit of FIG. 1 will be described with reference to FIGS. 26a to 26c.

Figure 26A:
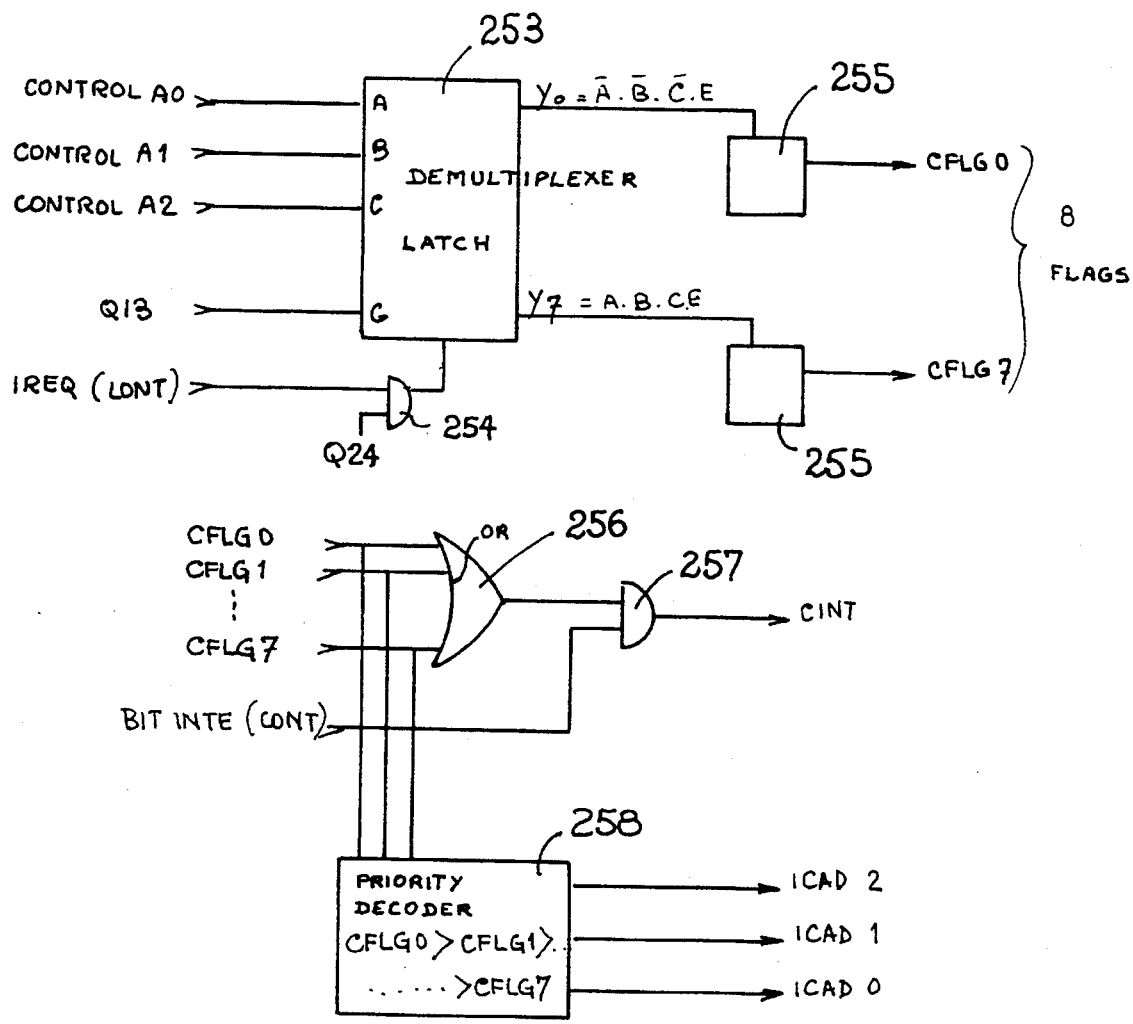
FIGS. 26a, 26b, 26c, 26d, and 26e are general diagrams of the interrupts unit of the module of FIG. 1.

FIG. 26a represents the device ensuring the control interrupt functions.

It comprises a blocked demultiplexer 253 which receives on its inputs the signals CONTROL A0, CONTROL A1, CONTROL A2, (the addresses emanating from the control pointer) Q13 and via an AND gate 254 an authorization signal resulting from the signals IREQ and Q24.

The outputs $Y_0$ and $Y_7$ are connected to flip-flops 255 which deliver flag signals CFLG0 to CFLG7 which are applied to an OR gate 256 having 7 inputs, the output of which is connected to an input of an AND gate 257. The other input of this gate receives the signal BIT INTE (CONT) and its output delivers the signal CINT which is the interrupt request of the control zone.

The inputs of the gate 256 are further connected to the outputs of a priority encoder circuit 258 which delivers on its outputs the signals ICAO2, ICAO1 and ICAO0.

Figure 26B:
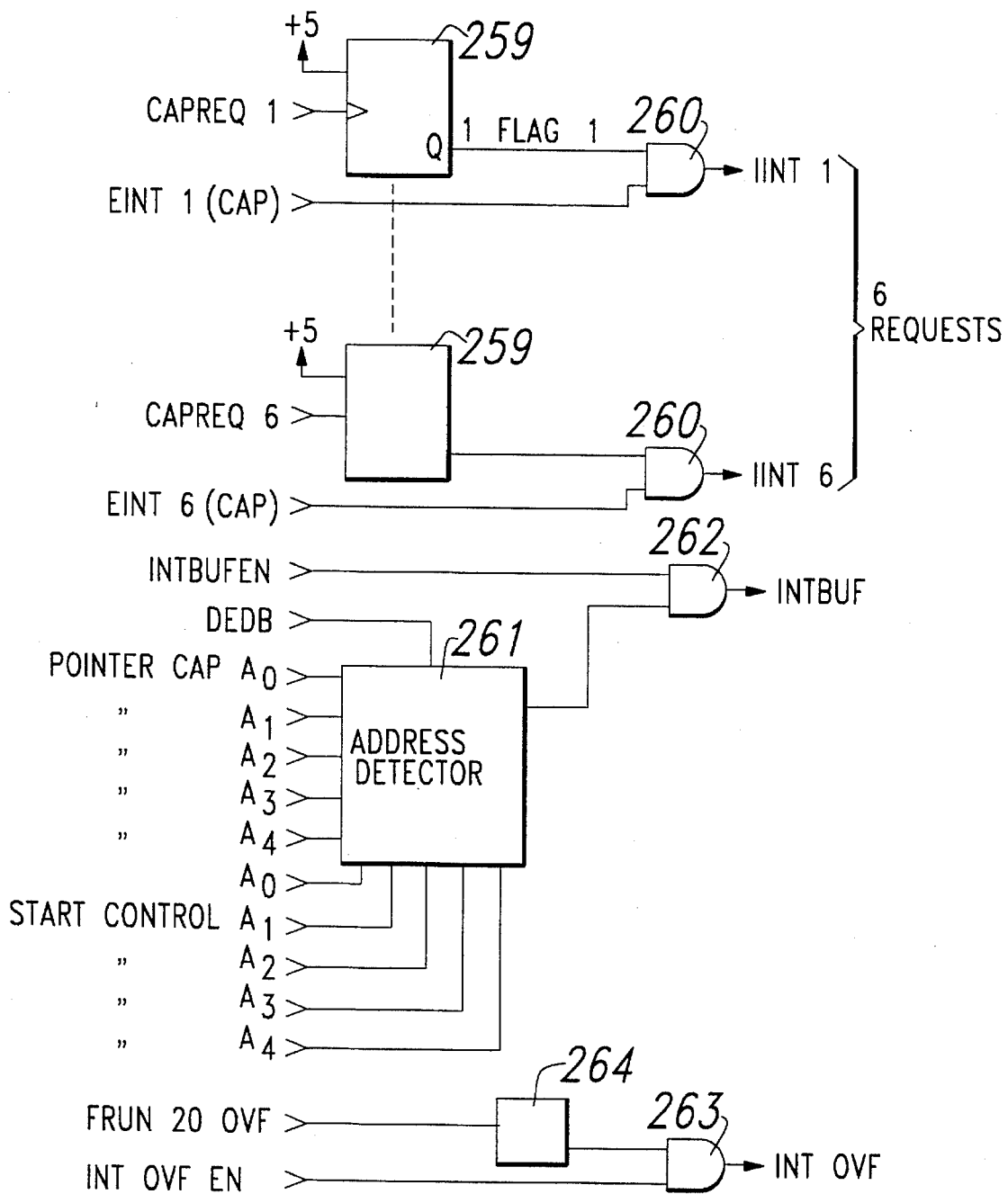

The device ensuring the acquisition interrupt functions which is represented in FIG. 26b comprises six circuits, each formed of a flip-flop 1259 and of an AND gate 260.

The flip-flops 259 receive respectively on their clock inputs the signals CAPREQ1 to CAPREQ6 and deliver at their outputs the signals IFLAG.

The gates 260 receive on their other inputs the signals EINT1(CAP) to EINT6(CAP). They deliver at their outputs the six requests IINT1 TO IINT6.

This device further comprises a circuit 261 for 10 the detection of an address which is the same as the half-buffer address.

This circuit receives at its inputs the signals:

POINTER CAPA0
POINTER CAPA1
POINTER CAPA2
POINTER CAPA3
POINTER CAPA4
START CONTROL A0
START CONTROL A1
START CONTROL A2
START CONTROL A3
START CONTROL A4 as well as the signal DEDB.

It delivers at its output the signal AD-2DEDB+1 +½ BUFFER which is applied to an input of an AND gate 262, the other input of which receives the signal INTBUTFEN and the output of which delivers the signal INTBUF.

Finally, an AND gate 263 receives on one of its inputs the signal INTOVFEN and its other input is connected to the output of a flip-flop 264 which receives on its set-to-1 input the signal FRUN20 OVF.

Figure 26C:
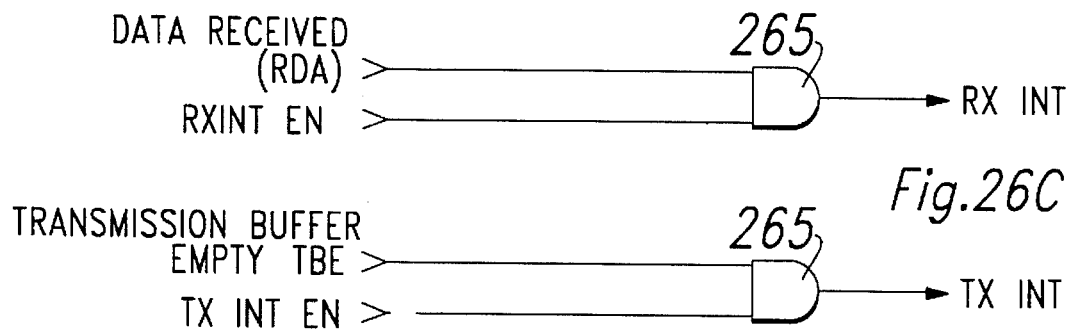

The serial interface interrupt function represented in FIG. 26c comprises AND gates 265 and 266, the inputs of which receive respectively the signals DATA received (RDA), RXINTEN and TRANSMISSION BUFFER EMPTY TBE, TXINTEN and the outputs of which deliver respectively the signals RXINT and TXINT.

Figure 26D:
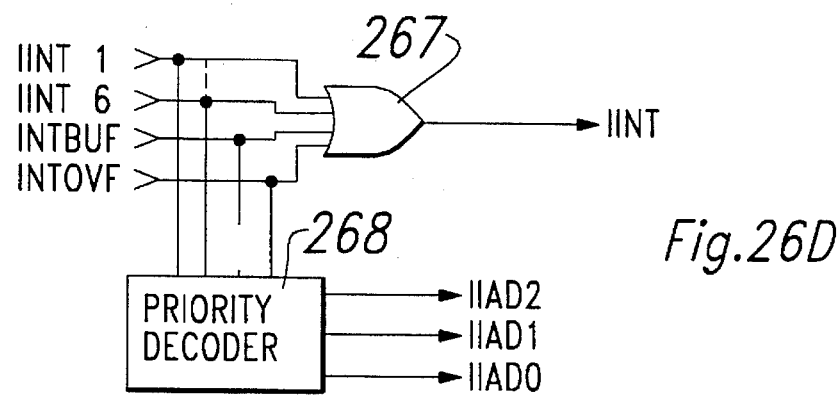

The capture interrupt priority function represented in FIG. 26d comprises an OR gate 267 having eight inputs receiving the signals IINT1 to IINT6 and the signals INTBUF and INTOVF.

The inputs of the OR gate 267 are further connected to a priority encoder circuit 268.

The OR gate 267 delivers the signal IINT and the circuit 268 delivers the signals IAD2, IAD1, IAD0.

Figure 26E:
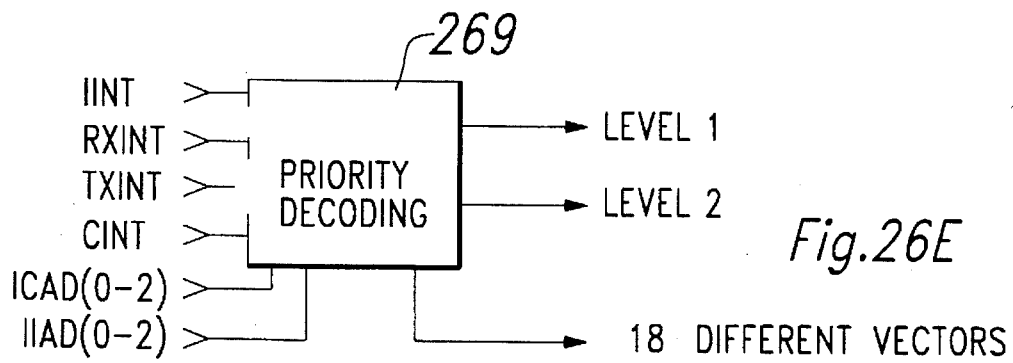

The control/acquisition/serial interface priority function is ensured by the device represented in FIG. 26e which comprises a priority encoding circuit 269. This circuit receives at its inputs the signals IINT, RXINT, TXINT, CINT, ICAD (0–2) and IAD (0–2) and delivers at its output the signals LEVEL 1 (of interrupt)

LEVEL 2 (of interrupt)

VECTOR with 18 different vectors.

A description will now be given of the operation of the device for control and for acquisition at high speed according to the invention.

An acquisition is reflected by the write in a storage zone which is the capture zone of the switched register zone 1 of FIG. 1, of a time or event information item.

In order to respect the precision of a resolution, this write is undertaken at all resolutions.

In the case of a plurality of inputs being capable of causing a capture, two cases present themselves.

Buffer storage: in this case, the reference of the source (or sources) being captured at the same time, one single information item is to be written to the storage zone.

Dedicated capture: in this case, if P sources request an acquisition during the same resolution, P memory locations of the capture zone must be updated.

The device simultaneously authorizes a storage in capture buffer, the updating of the acquisition counters situated in a dedicated memory location and up to four storages in dedicated capture zones.

It being understood that the stored values are identical (capture value=acquisition counter), this multiple write is permitted by a special structure of the switched register zone 1. One access per resolution is therefore sufficient.

The processor accesses are never penalized.

A study of the cycles of the processor permits the minimization of the access density caused by the processor which will be described hereinbelow.

A processor cycle being equal to 2 access times TS, assuming permanent accesses on the part of the processor, the maximum percentage of occupancy of the switched memory zone 1 would be 50%.

A more detailed study of the microcode of the processor permits the specification of an occupancy time of the order of 20%.

Balance of the accesses to the switched register zone 1

The special structure adopted for this zone permits a reduction to ½ cycle time of the duration of the accesses TS.

Thus, if P is the value of the Resolution/Cycle Time ratio, that is to say the value of the predivisor of the time base, then:

the total number of TS on 2 Resolutions is 4 P:

| Type | No. TS used | Comments |
|---|---|---|
| Processor | 20% of 4P # 0.8 P | The most unfavourable case, |
| Acquisition | 2 | no. of captures unlimited. Max. |
| Control | 4P-2-0.8P # E(3.2P)-2 | no. of control commands E(3.2P)-2 |

The device according to the invention utilizes a procedure for the scanning of the control zone (SCAN), the repetition period of which is equal to 2 resolutions.

The capture time intervals TS are located at the start of resolution.

Any processor access is capable of being inserted into this sequencing.

The global management of the TS values is carried out by the sequencer 9.

```
Capture TS              Capture TS
I----I--------------I----I--------I
< even resolution       >< odd resolution     >
     SCANNING PERIOD OF THE CONTROL ZONE
<------------------------------>
```

At the start of SCAN, the scanning is located at the start of the control zone (=command zone).

The organization of the memory 11 of the switched register zone is the following.

It comprises default or acquisition counters, two or four dedicated captures, the capture buffer, the command zone and possibly a general use zone.

The acquisition counters, the dedicated capture registers, and the capture buffer form part of the acquisition function.

The command zone is used by the control function.

The principle of implementation of virtual counters follows directly from the aforementioned scanning procedure SCAN.

The declaration of a virtual counter is undertaken in a command.

The zone of storage of the value of this virtual counter is situated in this same command.

Procedure for updating this virtual counter
| Read of the command containing the old counter value = Old |

V

| Incrementation of this value New = Old + 2 |

V

| Storage of New in the blocking time base function circuit |

V

| Write of New as new value of the counter in the command |

The scanning of this command taking place exactly every two resolutions; the counter is actually independent, updated every two resolutions, and permits all the functions of comparison to within a resolution by virtue of the sequentialization of the results.

It should be noted that a command of this type (exchg) requires 2 time intervals TS since a read/write is necessary.

The counter thus defined and blocked serves as time base reference for the following commands:

|  |  | Time reference |
|---|---|---|
| C0 |  | Acquisition counter |
| C1 |  | " |
| C2 | VCOUNT 1 | EXCHG VIRTUAL COUNTER 1 |
| C3 |  | VIRTUAL COUNTER 1 |
| C4 |  | VIRTUAL COUNTER 1 |
| C5 |  | VIRTUAL COUNTER 1 |
| C6 | VCOUNT 2 | EXCHG VIRTUAL COUNTER 2 |
| C7 |  | VIRTUAL COUNTER 2 |
| C8 |  | VIRTUAL COUNTER 2 |
| C9 |  | VIRTUAL COUNTER 2 |

If no virtual counter is defined, the time base acquisition counter is used by default.

Provision has been made in the HSCA device for the possibility of bringing about, following a command EXCHG, a 16-bit acquisition in the capture buffer.

This additional time interval TS comes to be inserted following the command and such a complex control +updating of the counter +16-bit capture has a duration of 3 TS.

With regard to the particular case of the event virtual counters, the difference is exclusively in the fact that the counters are not systematically incremented. They are incremented only when, during the execution of the command, an event is detected.

The procedure is the following:
Read of the command+EVENT counter value
if EVENT is detected
  then NEW=OLD+1
  else NEW=OLD
Storage of NEW in the event blocking circuit
Write in the command of the new NEW value The totality of these sequences will be described with reference to the sequencer and to the time base.

The part of the address generator which is intended for the acquisition represented in FIG. 12 ensures:

A) the updating of the signals FRUN 20 and EVENT 8.

This updating in write is carried out during the signal COUNT UPDATE, the logic function of which is:

$$\overline{FRBITO} . CAPACK$$

B) Capture in dedicated register: 2 cases present themselves:

$$DEDB=0$$

DEDIC1=CAPREQ1 . CAPACK
DEDIC2=CAPREQ2 . CAPACK

DEDIC3 Inactive because only 2 registers dedicated
DEDIC4 Inactive because only 2 registers dedicated

DEDB=1

DEDIC1=CAPREQ1 . CAPACK
DEDIC2=CAPREQ2 . CAPACK
DEDIC3=CAPREQ3 . CAPACK
DEDIC4=CAPREQ4 . CAPACK

These signals are active for one TS during a 32-bit capture cycle. CAPREQ (i) is valid during a resolution (first or second of the scanning). The capture precision is one resolution.

C) Captures in buffer zone:
These are of 2 types:
32-bit normal capture
capture arising from the 16-bit control function.
Both of these rely upon a simple count logic.
Count function:

The 5-bit counter 77 (FIG. 12) is active on the descending front to ensure a post-incrementation. The loading is asynchronous for this reason.

The starting address of the buffer depends upon DEDB, since the buffer zone is situated immediately after the dedicated register.

DEDB=0→Start of buffer=11100
DEDB=1→Start of buffer=11010

The buffer end address precedes by one unit the control zone's start address.

This programmable address is compared with the value of the counter 77 and an asynchronous set to zero is activated when a concordance is detected.

The incrementation algorithm is the following:

```
LOOP:
    if VAL SIGNAL INACTIVE
        then goto LOOP
    if VAL SIGNAL ACTIVE
        then STORAGE IN BUFFER
    POINTER INCREMENTATION
    if POINTER = START OF CONTROL
        then POINTER = BUFFER START ADDRESS
    goto LOOP
```

32-Bit captures in buffer:
These captures are initiated by:
a) CAPREQ (5, 6) IF DEDB=1 CAPREQ ( 3, 4, 5, 6 ) IF DEDB=0

CAPCONT 32-bit acquisition bit request emanating from the control zone managed in the same manner as CAPREQ (i).

The signal VAL is validated during the acquisition cycle and at the same time the addresses are located on the BUS (valid during CAPACK).

16-Bit-type capture

This is initiated by the control zone which causes via the sequencer (FIG. 16) the generation of the signal CAPCYC.

The signal CAPCYC is valid during 1 TS and cannot be valid at the same time as the signal CAPACK.

The storage on 16 bits is performed not by the generation of a supplementary address bit, since this would not be compatible with the 32-bit structure of the switched register zone 1, but as described previously by selection of a high or low write.

This selection is undertaken by the signal BITX (FIG. 14).
BITX=0→high write W2 active
BITX=1→low write W1 active In the case of the insertion of a 32-bit capture, a readjustment is undertaken at the start of a 32-bit word to ensure a coherence in the storage.

The part of the address generator which is intended for the control represented in FIG. 13 permits accessing sequentially all the commands situated in the control zone of the memory plane 11 (FIG. 2).

This control zone is defined by two programmable addresses.

SC: control zone start address
EC: control zone end address.

The scanning is ensured by the 5-bit counter 82 of the circuit of FIG. 13, loaded at the start of scanning START SCAN and incremented by the logic 83 under the action of the signal CONTROL STROBE.

The incrementation algorithm is the following:

```
C2 = START ADDRESS
LOOP:
    EXECUTION OF THE COMMAND C2
    if C2 = END ADDRESS
        then STOP
        else C2 = C2 + 1
    goto LOOP:
```

This logic implies a single scanning of the control zone during a scanning. This function is ensured in the incrementation logic unit 83 (FIG. 13) or the signal emanating from the comparator 85 inhibits the incrementation.

This part also ensures the address management in the case of the updating of a virtual counter.

The value of the address of the command EXCHG is saved in the blocking register 87 during CLEAR EXCHG.

The incrementation is inhibited during ACK (-1), TS when the address saved is placed on the address bus.

CONCEPT OF STEP

A command bit permits the selection of the mode STEP.

As soon as this command is executed, the scanning of the control zone is undertaken by increment of 2. The shift of the increment based on this command is dependent upon the condition of the bit FRBIT1.

FRBIT1=0 SHIFT=0
FRBIT1=1 SHIFT=1

FRBIT1 permits the formation of the difference between the even scannings and the odd scannings.

The scanning of the control zone situated after the step command STEP is therefore undertaken in one scanning in two.

This feature permits the diminution of the number of time intervals TS used in permitting a double resolution.

The part of the address generator intended to generate the signals W1, W2, which is represented in FIG. 14, operates with six conventional types of access.

|  | W 1 | W 2 |
| --- | --- | --- |
| CPU read | 0 | 0 |
| CPU write | 1 | 1 |
| 32-bit capture | 1 | 1 |
| 16-bit capture BITX = 0 | 0 | 1 |
| 16-bit capture BITX = 1 | 1 | 0 |
| Control | 0 | 0 |

These various cases have already been described previously.

Two types of access which are associated with the updating of the virtual counters during ACK (-1). Only the counter VIRT 16 127 SUR DO-D15 of the time base (FIG. 17) is to be updated.

A particular case is the type EXCHB (2) obtained with DEDB=0.

In this case, the event virtual counter 138 on 4 bits (D24–D27) is to be updated.

The control circuits having three write conditions LCM are managed as a function of these various types of access.

As regards the sequencer 9 represented in FIGS. 15 and 16, a representation is given hereinbelow of a summary table of the accesses, of their respective priorities and of the condition signal validating them.

| ACCESS | PRIORITY | CONDITION | INSTANT |
|---|---|---|---|
| CPU | 1 | CPUACK | ANY |
| 32-BIT CAPTURE | 2 | CAPACK | START OF RESOLUTION |
| 16-BIT CAPTURE | 3 | CAPCYC | FOLLOWS ANY 1 UPDATING OF THE VIRTUAL COUNTER |
| CONTROL UPDATING | 5 | CONTROLACK | |
| VIRTUAL COUNTER | 4 | ACK-1 | END OF UPDATING |

There is given, in addition, an interlinking of the updating of a virtual counter.

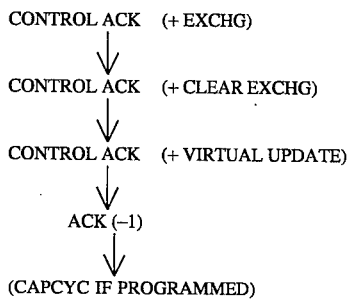

A set of chronograms which is represented in FIGS. 27 to 35 represents the various cases.

Figure 27:
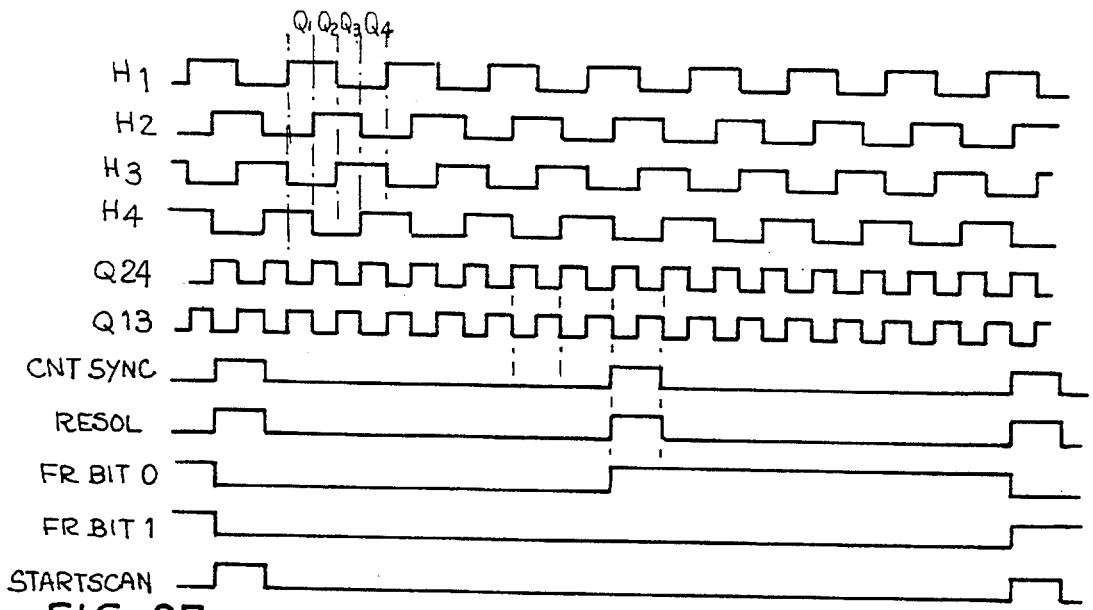
FIG. 27 represents invariable chronograms emanating from the predivisor.

FIG. 27 represents invariable chronograms emanating from the predivisor.

What is involved here is a representation for a predivisor value equal to 4 in normal operation mode for which the signal STANDBY=0.

The signal INT.SYNC is an internal sequencing synchronization signal.

STARTSCAN=INTSYNC.FRBIT ∅

Figure 28:
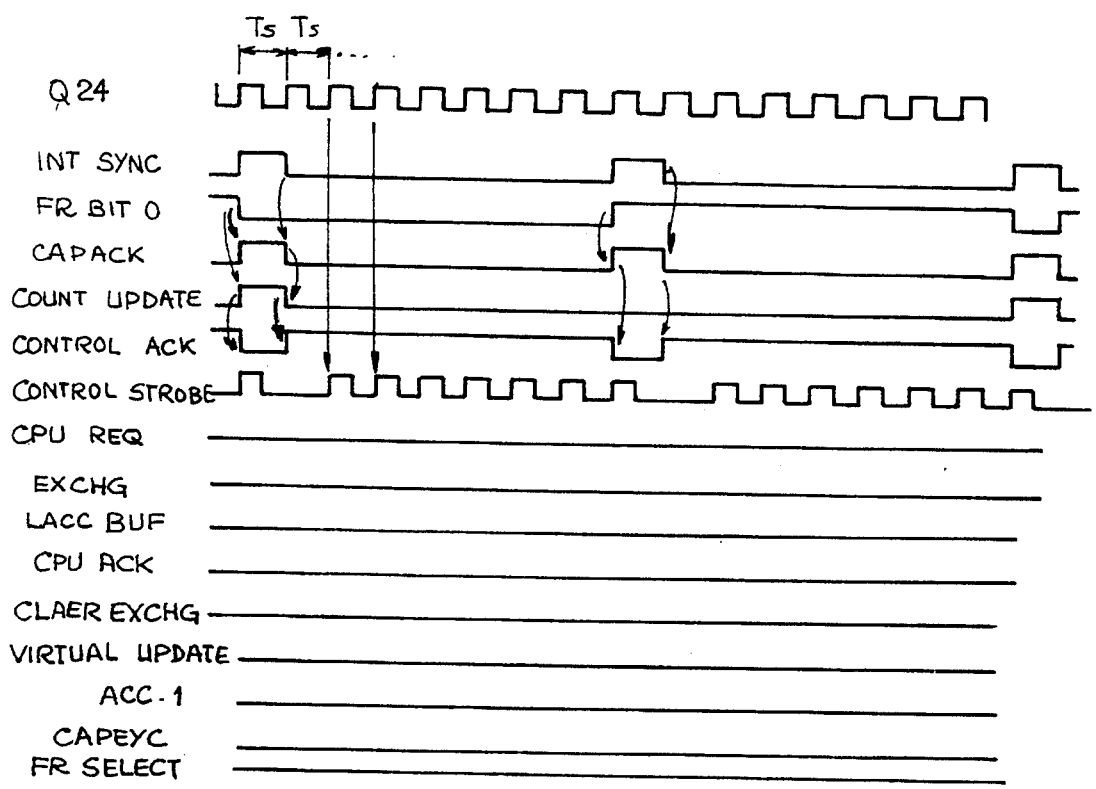
FIG. 28 represents a chronogram of 32-bit control access/capture access arbitration.

The chronogram of FIG. 28 is a control access/32-bit capture access arbitration chronogram.

This chronogram is implemented without a request from the processor, without a special acquisition cycle and without updating of a virtual counter.

Figure 29:
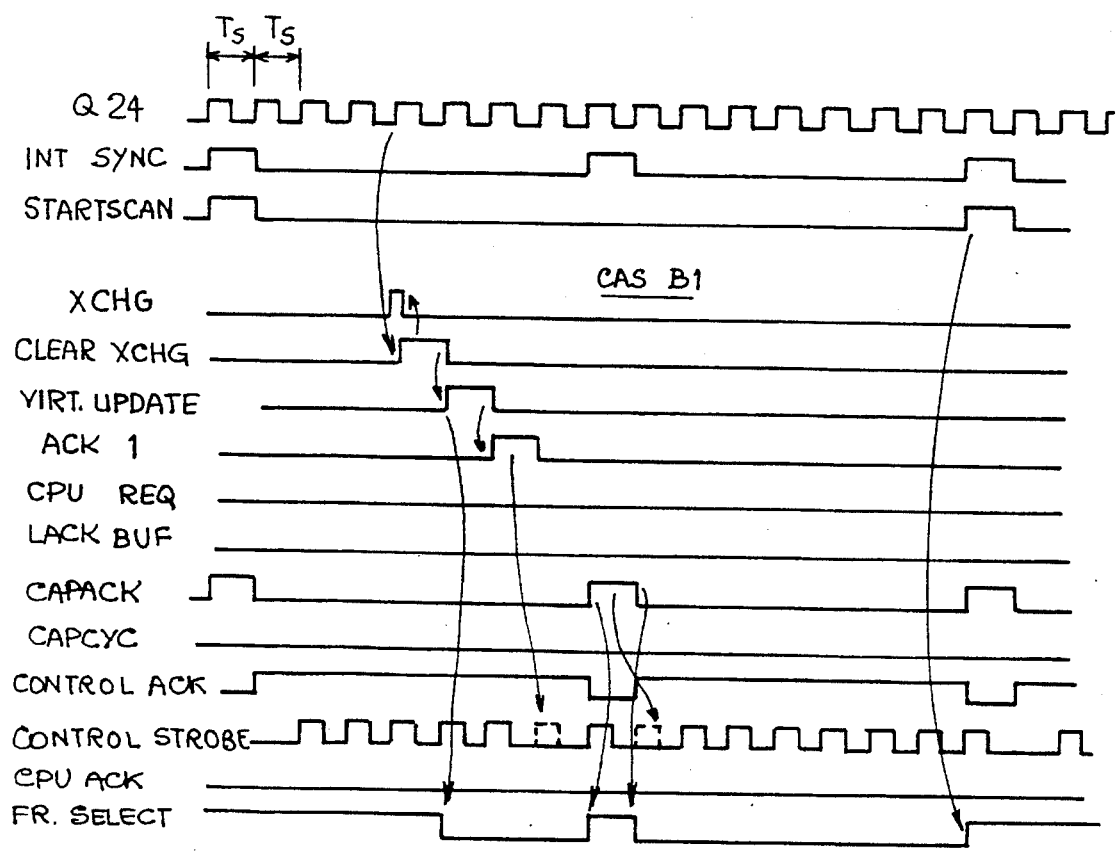
FIG. 29 is a chronogram of normal sequencing of the updating of a virtual counter.

FIG. 29 is a chronogram of normal sequencing of the updating of a virtual counter.

Figure 30:
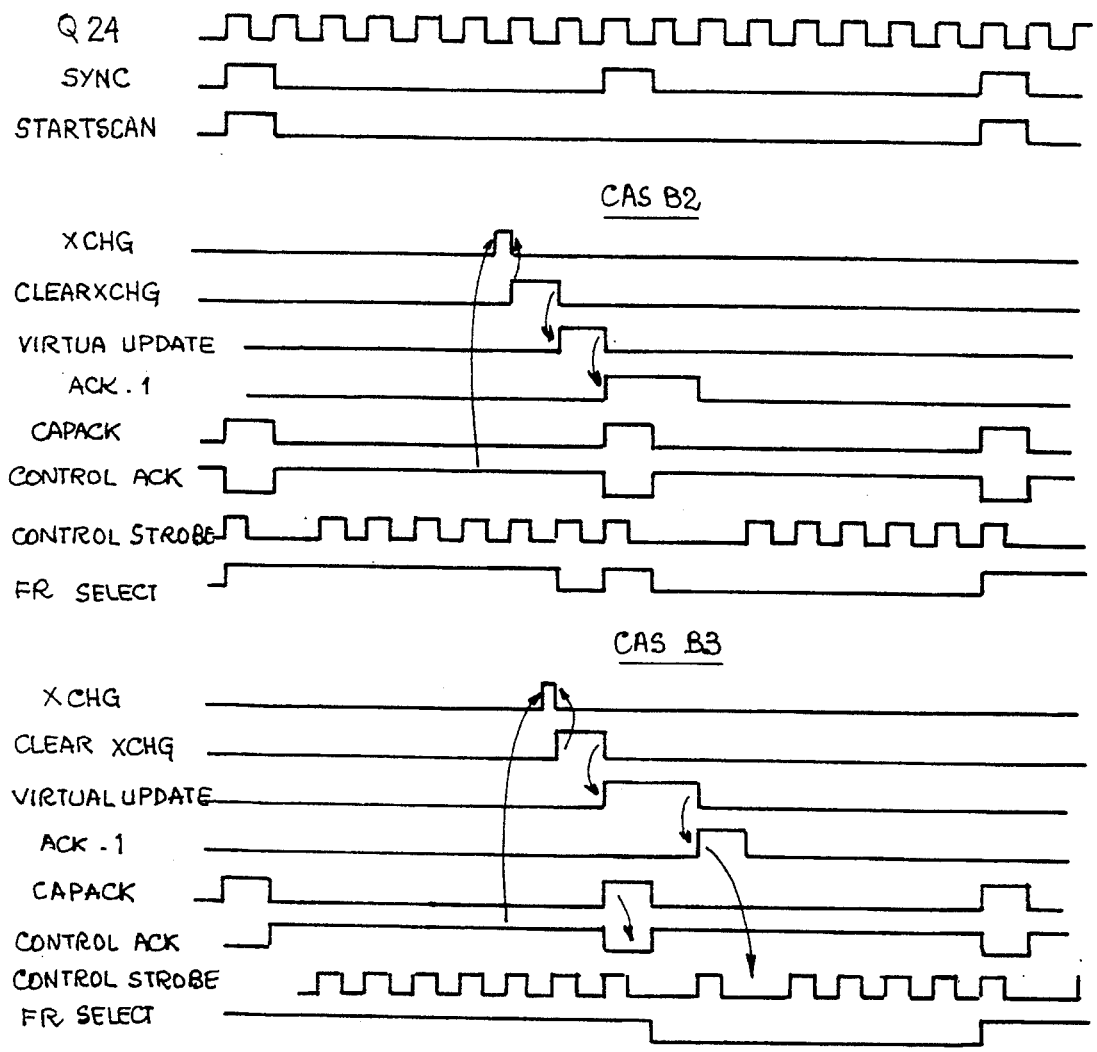
FIGS. 30 and 31 show chronograms of arbitration of updating of a virtual counter and of 32-bit capture access.
Figure 31:
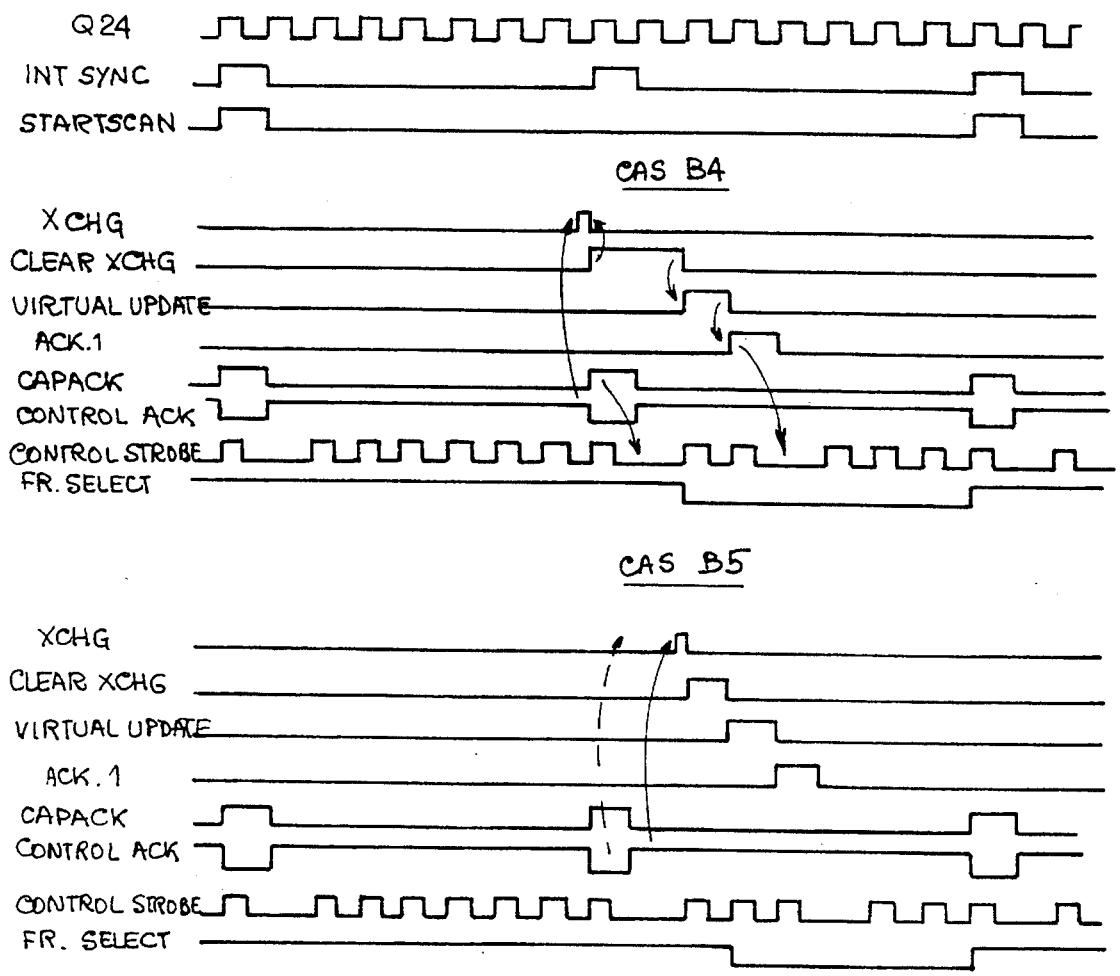

FIGS. 30 and 31 show chronograms for the arbitration of updating of a virtual counter and of 32-bit capture access.

FIG. 32 represents chronograms of limiting cases of updating of a virtual counter at the end and at the start of scanning.

In the case B6, the signal EXCHG can become active only at the end of the control cycle (CONTROL ACK=1), this taking place by definition.

No arbitration is to be undertaken in this case with the first acquisition access.

The case B7 is a limiting case at the end of scanning of the control zone, the maximum number of commands being respected at the level of the programming as a function of the resolution and of the frequency of the system.

In this case again, no arbitration has to be managed with the first acquisition cycle.

FIG. 33 is a chronogram of the interlinking of two updates of virtual counters.

This chronogram corresponds to the most critical case.

By definition, two commands for the updating of virtual counters cannot be consecutive.

It emerges from the chronogram of FIG. 33 that at the level of the address generator 2 (FIG. 1, 12, 13, 14), the sequencing is the following:

TS1: the general address is that of the virtual counter
TS2: address=address of the command indicating that the next command is a virtual counter
TS3: address=address of virtual counter 1.
TS4: address=address of virtual counter 2
TS5: address=address of the following command
TS6: address=address of the virtual counter 2

In six time intervals TS, two updates and two general purpose commands have been able to be executed.

Figure 34:
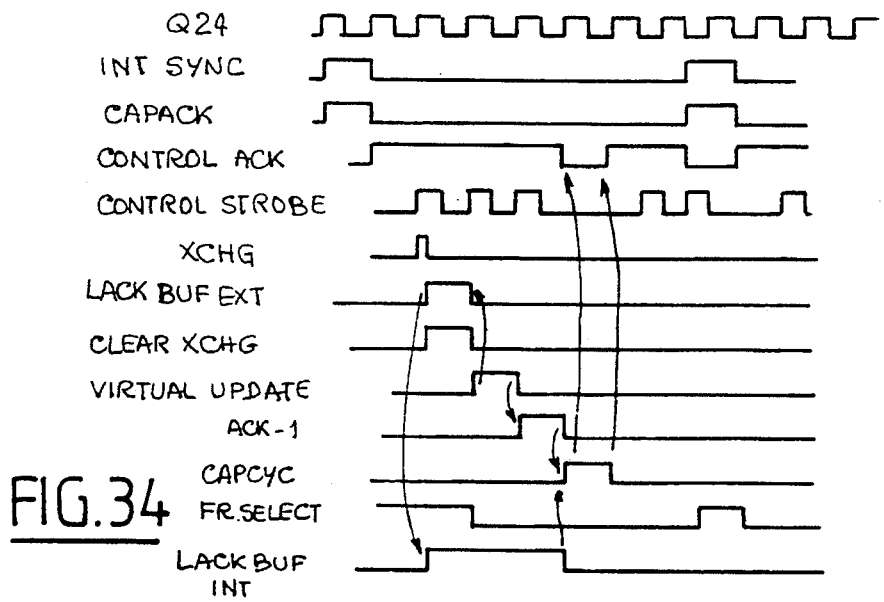
FIG. 34 represents a chronogram of the insertion of a 16-bit capture cycle.

FIG. 34 represents a chronogram of insertion of a 16-bit capture cycle.

This is a sequencing with special acquisition cycle.

This type of request is always associated with the updating of a virtual counter.

Three intervals TS are required for a command concerning the updating of a virtual counter with capture of this counter.

Figure 35:
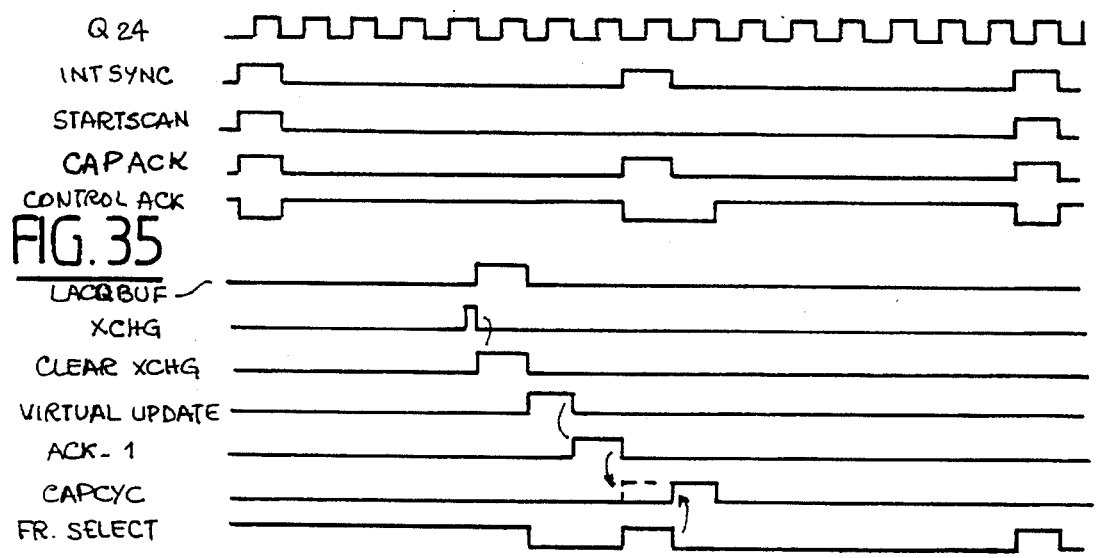
FIG. 35 represents a chronogram of the arbitration of the 16-bit capture accesses/32-bit capture accesses.

FIG. 35 represents a chronogram of the arbitration of the 16-bit capture accesses/32-bit capture accesses.

The normal acquisition cycles are, in this case, again of higher priority than the control accesses.

The access CAPCYC is shifted, because it is considered as a control access.

The case B8 of FIG. 33 is reflected in this case by the insertion of the access CAPCYC between the time intervals TS3 and TS4 without further modification of the chronograms.

No representation involves the participation of a processor cycle, since these cycles are inserted in the highest priority manner.

1) They can shift any 32-bit acquisition cycle
2) They act exactly as the CAPACK cycles in the descriptions given hereinabove.

The number of time intervals TS which is consumed as a function of the command is summarized hereinbelow:

| TYPE | NO. OF TS |
|---|---|
| CPU write | 1 |
| CPU read | 1 |

-continued

| TYPE | NO. OF TS |
|---|---|
| CAPACK acquisition 32 | 1/Resolution |
| Counter update | 2 |
| Counter update + 16-bit acquisition | 3 |
| Control | 1 |

The list of the signals for the time management of the sequencer is given hereinbelow.

TIME MANAGEMENT SIGNALS

The "strobes" control signals are applied to a stable condition of the condition signals.

Terminology

| | |
|---|---|
| H1 | Clock complementary to H3 |
| H2 | Clock in quadrature advance in relation to H3 |
| H3 | Clock of the system |
| H4 | Clock complementary to H2 |
| Q1 | First quarter phase of a processor cycle H3=0 and H2=0 |
| Q2 | Second quarter phase of a processor cycle H3=0 and H2=1 |
| Q3 | Third quarter phase of a processor cycle H3=1 and H2=1 |
| Q4 | Fourth quarter phase of a processor cycle H3=1 and H2=0 |
| Q13 | Valid on Q1 or Q3 Q13 = Q1 + Q3 |
| Q24 | Valid on Q2 or Q4 Q24 = Q2 + Q4 |
| TS | Time interval which can be used for an access to the switched register zone 1 Interval of fixed length equal to one half period of the system clock and synchroniozed on Q24. TS = Q24 + Q13 |

Description of the input signals

| | |
|---|---|
| H3 | Clock of the system |
| H2 | Clock in quadrature advance in relation to H3 |
| CPUREQ | Processor for access request validating a half period TS |
| STANDBY | Condition signal indicating a low-consumption mode |
| XCHG | Request for updating of a virtual counter of the time base 3 Activated by the action unit 3 on Q13, the sequencer 9 is to transmit a deactivation command to this unit. |
| LACQBUF | 16-bit format capture request emanating from a command stored in the control register zone. Is to permit the insertion of a special acquisition time interval TS. This request is always associated with a request for updating of a virtual counter of the time base 3. |

Description of the output signals RESOL:

Resolution top active on Q2+Q3 and periodic of period equal to the precision accepted at the level of the control and acquisition functions.

Frequency programmable by the user, equal to the value of the predivisor.

Signal not active in low consumption mode.

FRBIT0:

Signal of cycle ratio 50% and the period of which is equal to twice the selected resolution.

It changes condition at the start of Q2 from the resolution top.

Remains active in low consumption mode.

FRBIT1:

Signal of cycle ratio 50% resulting from the division by 2 of FRBIT0.

STARTSCAN:

Synchronization top of the scanning of the control zone situated in the switched register zone 1.

Active during the resolution top (Q2+Q3) if FRBIT0=0.

This signal has a period equal to twice the resolution..

Remains active in low consumption mode.

CAPACK:

Validation of a normal capture access of length TS taking place at each resolution.

Normally equal to the resolution top, it may be delayed by a time interval TS in the case of a request from the processor (CPUREQ) taking place at the same instant.

Remains active in low consumption mode.

COUNT UPDATE:

Validation of an access for updating of the time base 3 used for the acquisition.

It is active in one resolution in two, when FRBIT0=0 and in this case it is equal to CAPACK.

Remains active in low consumption mode.

CPUACK:

Validation of a processor access equal to CPUREQ (the CPU having the maximum priority).

CONTROL ACK:

Validation of the control accesses at the level of the register zone.

Active when CAPACK and CPUACK are not active.

Remains active in low consumption mode.

CONTROL STROBE:

Validation of the data resulting from a control access.

Active during Q24 if CONTROL ACK was true and CAPCYC and

ACK-1 were false over the preceding interval TS.

Not active in low consumption mode.

CLEAR EXCHG:

Command for deactivation of EXCHG.

Active over the interval TS following the appearance of EXCHG.

Not active in low consumption mode.

VIRTUAL UPDATE:

Command for updating of the virtual counter of the time base.

Active over the interval TS following CLEAR EXCHG.

Not active in low consumption mode.

ACK-1:

Command issued to the address generator unit 2 which, if this command is active, is to generate the address which was present during CLEAR EXCHG.

Active over the interval TS following VIRTUAL UPDATE.

Not active in low consumption mode.

CAPCYC:

Validation of a special acquisition time interval TS.

Active over the interval TS following ACK-1 if a request LACQBUF has been issued by the action unit 4.

Not active in low consumption mode.

FRSELECT:

Selection of the acquisition reference in the time base 3.

Validated on any normal acquisition access: CAPACQ=1

Validated by STARTSCAN at the start of the scanning of the control zone.

Invalidated by VIRTUAL UPDATE which corresponds to a change of reference at the level of the time base 3.

As can be seen according to the chronograms of FIGS. 28 and 29, the sequencer ensures:

a) the predivisor function

Division by N or 8×N (N=1 to 16)

b) the generation of the scanning synchronizers

STARTSCAN

FRBIT0

FRBIT1 c) the generation of the condition signals

CAPACK+COUNT UPDATE (capture 1)

CPU ACK

CONTROL ACK

CAPACK

CAPCYC

ACK-1 d) the validation signals

CONTROL STROBE

RESOL e) the sequence management signals

STEP

CLEAR EXCHG

VIRTUAL UPDATE

All these signals have been defined previously.

The time base circuit represented in FIG. 17 exhibits the following features, it being understood that the resolution has been programmed at the level of the sequencer 9 via its predivisor.

The 20-bit acquisition counter is a time counter. It consists of the circuits 125, 126, 128, 132 of FIG. 17.

The 20-bit acquisition counter FRUN20 is systematically updated at the start of scanning. However, this updating does not consume any time interval TS, the TS used being that of the first capture access.

In fact, the capture value being none other than the acquisition counter during this TS, the old value may be reinjected into the adder 125.

The value of this 20-bit counter is systematically captured in the first dedicated location (DEDIC 0) during this TS.

It is thus made accessible in memory by the processor. However, the updating structure:

Write in memory

Incrementation

Storage shows that no modification in memory of this counter by the processor is possible.

This feature permits the use thereof in a reliable manner in the "guard dog" functions where the content is to be guaranteed, even in the event of error of the processor.

The 8-bit event counter consists of the circuits 138 and 139 of FIG. 17.

The event counter EVENT 8 is associated with the signal E6 of the input module 5.

EVENT 8 is systematically updated at the same time as FRUN 20 at the start of scanning during the time interval TS allocated to the first acquisition.

The chronograms, as well as the updating structure, are identical.

It is accessible at the memory location DEDIC0 and is non-modifiable by the processor.

The signal EVENT is generated by the INPUT unit 5, it remains active over 2 resolutions, synchronized on the start of the scanning; this ensures a single count of the event.

The control 16-bit virtual counters are more specifically allocated to the control function.

They form an integral part of the commands.

Their number has no structural limit.

They are time counters.

The counters VIRT 16, which, by definition, are commands, are broken down into two groups.

A - Reset to zero by definition of a maximum value

B - Reset to zero by a condition of the event type

A - The structure of the command is, in this case:

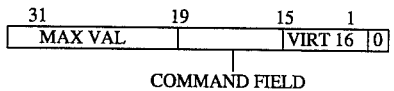

COMMAND FIELD

VIRT 16 is the value in memory of the virtual counter incremented by 2 at each scanning (for this reason, only the 15 most significant bits are visualized).

The maximum value must be specified on 15 bits. It is defined as follows:

|        | 019 = 0 | 019 = 1 |
|--------|---------|---------|
| MAX 15 | 0       | D22     |
| MAX 14 | 0       | D21     |
| MAX 13 | 0       | D20     |
| MAX 12 | D31     | D31     |
| MAX 11 | D30     | D30     |
| MAX 10 | D29     | D29     |
| MAX 9  | D28     | D28     |
| MAX 8  | D27     | D27     |
| MAX 7  | D26     | D26     |
| MAX 6  | D25     | D25     |
| MAX 5  | D24     | D24     |
| MAX 4  | D23     | D23     |
| MAX 3  | D22     | 0       |
| MAX 2  | D21     | 0       |
| MAX 1  | D20     | 0       |

DO=0 indicates a virtual counter command (EXCHG) of type A.

The updating of the virtual counters to 16 bits is ensured by the circuits 125, 127, 129, 131, 147, 148 and 153 of FIG. 17.

The updating procedure is more precisely defined from the point of view of a chronogram in the section devoted to the sequencer 9.

The sequencing is the following:

| Read of the command: | READ OF VAL MAX<br>READ OF VIRT 15 |
|---|---|
| Updating: | DECODING OF MAX VAL OF 13 TO 15 BITS<br>VIR 16 = VIR 16 + 2<br>if VIR 15 MAX VAL<br>then SET TO 0 OF VIRT 15 |
| Write in the command: | WRITE OF VIRT 15 IN COMMAND |

The procedure shows that, in contrast to the counters FRUN 20 and EVENT 8, the updating commences by a read in memory, followed by a write.

Consequently, the VIRT 16 values are accessible in switched register memory they are modifiable by the CPU they can accept all arithmetic operations.

These commands, having no fixed place in the control zone, may be read at any instant of the scanning.

A second interval TS will therefore have to be allocated to them to permit the rewrite in memory.

Visualization of the sequencing

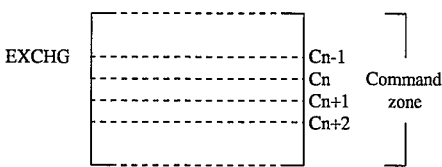

As is set forth in the principle #2, there is a shift of 1 TS between valid address and valid data items.

The address/data sequencing is therefore, in this case, the following:

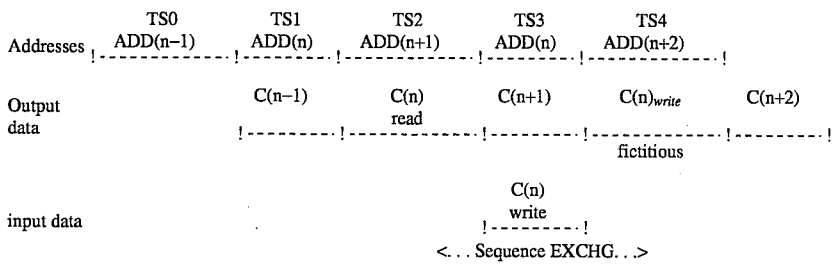

Two TS intervals are therefore used for the sequence EXCHG. The address generator 2 (FIGS. 1, 12, 13, 14) must, however, be in a position to restore the address ADD(n) in TS3.

This address must be saved during the time interval TS1; the command C (n−1) carries the warning "next command= command EXCHG".

The sequencer 9 supplies all the necessary control signals.

| XCHG | warning of the command Cn-1 |
| CLEAR XCHG | taking into acount of the command during ADD(n) and saving of AD(n) |
| VIRTUAL UPDATE | updating of the counter during ADD(n+1) |
| ACK-1 | request to the address generator for delivery on the address bus of ADD(n) |
| B - Reset to 0 by a condition of the event type. | |

The counters are then differential virtual counters.

In this case, the command does not supply any maximum value and its structure is:

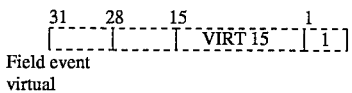
Field event virtual

The sole difference with respect to the case A is the set to 0 signal of VIRT 15.

This signal may be:

1) EVENT (the case of the 8-bit event counter)
2) RAZ4 set to 0 of a 4-bit event counter EVENT 4 described subsequently. RAZ4 has the same chronogram as EVENT.

The choice is made via a programming bit DEDB.

DEDB = 0 ⟶ RAZ4

DEDB = 1 ⟶ EVENT

[ VIRT CLEAR = DEDB . EVENT + DEDB . RAZ4 ]

The maximum number of 4-bit virtual event counters is four, and they are defined individually in a command EXCHG of type DEDB=0.

This same command defines by programming: if DEDB= 0:

- the input of the input unit 5 with which the event counter (data item by D19–D20) must be associated.
- the maximum value permitted to this counter, defined on 4 bits; when this value is reached by EVENT 4, the signal RAZ4 is generated.

The virtual counter EVENT 4 is updated at the same time as the differential virtual counter which is associated with it.

They follow precisely the same chronograms, since they are both in the same command.

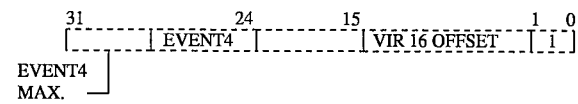

The signals EVENT1,2,3,4 are generated by the input unit 5; they are valid on two resolutions and synchronized on start scan.

The multiplexer 140 of 1 to 4 (FIG. 17) permits the selection of the event to be considered in the command (D19–D20).

The chronograms are grafted onto those of the updating of VIRT16.

The event counter function is ensured by the circuits 138, 139, 140, 143, 144, 145 and 146 of FIG. 17.

The permitted comparison functions are:

A) - 16-bit time comparison

B) - double 8-bit event comparison

C) 8-bit event comparison+16-bit time comparison

D) - 4-bit event comparison

E) - 8-bit event comparison

A) 16-bit time comparison

On account of the sequentialization of the outputs and of the synchronization of the scanning two 16-bit comparisons are always executed simultaneously (instant n and n+1).

The value to be compared is situated in the command word from D0 to D15.

This comparison ensured by the circuits 147 to 151 of FIG. 17.

B) For the double 8-bit event comparison, the values of events to be compared are situated from D0 to D7 and from D8 to D15.

The double comparisons are ensured by the comparators 147 and 148 of the circuit of FIG. 17.

C) The dual 16-bit time/8-bit event comparison is ensured in the following manner:

The time value to be compared is situated from D0 to D15; the structure A is therefore maintained.

The 8-bit event value is situated from D24 to D31; thus, the structure A is associated with:

data out (24–31)

This dual comparison thus necessitates, in addition, the circuits 144, 145, 146 of FIG. 17, COMP8 appearing at the output of the AND gate 146.

D) The 4-bit event comparison is undertaken by the circuit 144, COMP4 appearing at the output of the comparator 144.

E) For the simple 8-bit event comparison, the 8-bit event to be compared is situated from D24 to D31. The event comparison part of the structure may be used.

The utilization of the time base circuit of FIG. 17 for the comparison function is ensured in the following manner.

The functions EVENT4 and EVENT8 of the circuit 138 cannot, by definition, be used simultaneously.

DEDB=0→EVENT 4

DEDB=1→EVENT 8

Thus, the EVENT blocking register and the 8-bit comparator constitute a common resource.

Likewise, a double 8-bit comparison will never be undertaken at the same time as a 16-bit time comparison. The 16-bit comparator is, in this case also, a common resource.

For the time reference function, only three storage zones and an adder (+0, +1, +2) ensure the entire function.

There is set out hereinbelow the description of the input signals of the time base and their origin.

| | |
|---|---|
| COUNT UPDATE: | SEQUENCER 9, CYCLE OF UPDATING OF FRUN20 AND EVENT8 |
| VIRTUAL UPDATE: | SEQUENCER 9, CYCLE OF UPDATING OF VIRT16 AND EVENT4 |
| FR SELECT: | SEQUENCER 9, SELECTION OF FRUN20 FOR THE COMPARISON |
| DEDB: | PROGRAMMABLE, DEFINED THE TYPE OF THE APPLICATION |
| TYEP A: | ACTION UNIT 4, IDENTIFICATION OF THE COMMAND |
| DOUBLE: | ACTION UNIT 4, IDENTIFICATION OF A DOUBLE COMPARISON COMMAND |
| CLEAR FRUN20: | ACTION UNIT 4, COMMAND FOR SETTING TO 0 OF FRUN 20 |
| CLEAR EVENT: | ACTION UNIT 4, COMMAND FOR SETTING TO 0 OF EVENT |
| CLEAR VIRT: | ACTION UNIT 4, COMMAND FOR SETTING TO 0 OF VIRT16 |
| EVENT (1–4): | INPUT UNIT 5, DETECTION OF EVENT |
| X1: | INCREMENTATION VALUE |
| X0: | INCREMENTATION VALUE |

X1/X0 takes the value 2 in the case of an updating of counter and 0 when the D0–D16 is the value to be compared. This pair of data also permits the adjustment of the differential counters.

Corrections must be made to the differential counters by reason of the fact that an event is taken into account only at the start of scanning SCAN.

Thus, at this level, no difference is made between an event which has appeared in the first resolution and an event which has appeared in the second resolution.

Any differential virtual counter must therefore possibly undergo a correction to be able to guarantee a resolution of precision.

The solution consists in:

a) effecting a set to 2 of the shift counter in place of a set to 0, this operation being capable of being undertaken by the circuitry.

b) incrementing by 1 the time values which are compared with it, this operation likewise being capable of being undertaken by the circuitry.

VAL compared with VIRT+1 is equivalent to VAL+1 compared with VIRT+2.

The logic used to carry out this function is very simple.

Figure 17A:
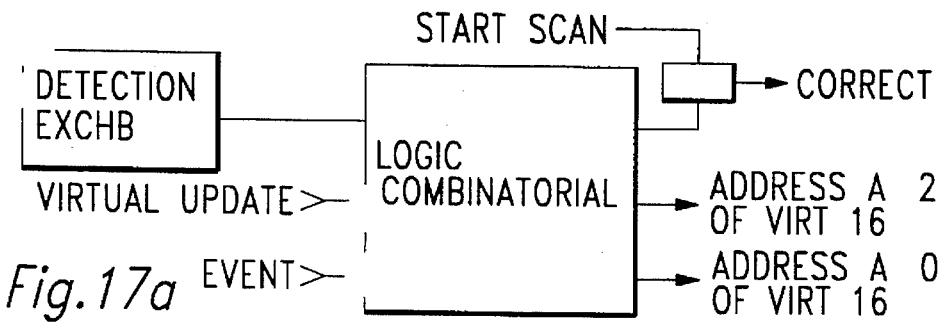

It is represented in FIG. 17a and comprises a circuit for detection of EXCHB connected to a combinatory logic which receives the signals VIRTUAL UPDATE for the updating of the virtual counters and EVENT for the event.

The signal START SCAN initializes the correction flip-flop+1 and the logic delivers a signal SET TO 2 OF VIRT 16 or a signal SET TO 0 OF VIRT 16.

INCOFF is updated at each event.

It is dedicated to one input.

The signal CORRECT remains active while this counter serves as reference.

The table given below indicates the condition of X1, X0 as a function of the command executed.

| UPDATING COUNTER BY DEFAULT | UPDATING VIRTUAL | CORRECT | DOUBLE | X1 | X0 |
|---|---|---|---|---|---|
| 1 | 0 | 0 | X | 1 | 0 |
| 0 | 1 | X | X | 1 | 0 |
| 0 | 0 | 1 | | 0 | 1 |
| 0 | 0 | 0 | | 0 | 0 |
| 0 | 0 | X | 1 | 0 | 0 |

The action unit which has been described with reference to FIGS. 18 to 21 carries out different types of action.

As described previously, the commands likely to generate actions are of two types.

1) Commands of exchange of counter EXCHG

2) Normal commands.

1) EXCHG commands

Type A:

| MAXIMUM VALUE OF THE VIRTUAL COUNTER | D18 | D17 | D16 | VIRTUAL COUNTER | 0 |
|---|---|---|---|---|---|
| | | | | | |

D16 = 0
D17 = ENABLE
D18 = Interrupt on overflow of the virtual counter.

This command permits the definition of variable frequency counters.

Type A (UART):

| MAXIMUM VALUE OF THE VIRTUAL COUNTER | D18 | D17 | D16 | VIRTUAL COUNTER | 0 |
|---|---|---|---|---|---|
| | | | | | |

D16 = 1
D17 = Validation of the counter for the reception
D18 = Validation of the counter for the transmission This type of command permits the definition of the data rate in baud of the UART.

in reception in transmission in transmission/reception

The frequency defined in this manner is equal to 4 times the value of the data rate in baud.

Type B (1):

Command exclusively available when DEDB=1.
It permits the definition of:

a) - a maximum value for the event counter b) - a shift counter c) - actions.

a) - The event counter being of 8 bits and unique, it is reset to 0 as soon as it reaches the maximum value defined in this command.

b) - The differential (or offset) counter is a virtual counter set to 0 on each event. It is validated as soon as the command is executed and may thus he used as Time reference.

c) - The actions:

It defines:

a) - a 4-bit event virtual counter - a maximum value of this event counter b) - a cumulative differential counter c) - actions a) - the event virtual counter is associated with the input defined in the action zone.

It is reset to 0 when it reaches the maximum value defined in the command.

It can serve as reference for the commands of the EVENT type.

b) - Cumulative differential counter. 16-bit virtual counter set to 0 when the event counter reaches the maximum value.

It can serve as time reference.

c) - The actions:

| 8 | D23 | D22 | D21 | D20 | D19 | D18 | D17 | D16 | 16 | | |
|---|---|---|---|---|---|---|---|---|---|---|---|
| EVENT MAX VALUE | | | | | | | | | OFFSET VIRTUAL COUNTER | 1 |

D16 = MODE STEP = Scanning of one command in 2
D17 = ENABLE
D18 = INTERRUPT WHEN EVENT = EVENT MAX
D19 = UNUSED
D20 = RESET TO 0 OF THE FRUN20 WHEN EVENT = EVENT MAX
D21 = 16-BIT ACQUISITION ON EACH EVENT
D22 = 32-BIT ACQUISITION WHEN EVENT = EVENT MAX
D23 = INTERRUPT ON EACH EVENT This dual definition command permits the interpolation commands.

Type B (2):

Command exclusively available when DEDB=0

| 8 | D23 | D22 | D21 | D20 | D19 | D18 | D17 | D16 | 16 | |
|---|---|---|---|---|---|---|---|---|---|---|
| MAX EVENT EVENT VIRTUAL COUNTER | | | | | | | | | SHIFT VIRTUAL COUNTER | 1 |

D16 = MODE STEP
D17 = ENABLE
D18 = INTERRUPT WHEN EVENT = EVENT MAX
D19 = INPUT ASSOCIATED WITH THE EVENT COUNTER
D20

| D20 | D19 | INPUT |
|---|---|---|
| 0 | 0 | E3 |
| 0 | 1 | E4 |
| 1 | 0 | E5 |
| 1 | 1 | E6 |

D21 = BUFFER ACQUISITION 14 + 2
D22 = 32-BIT ACQUISITION WHEN EVENT = EVENT MAX
D23 = INTERRUPT ON EACH EVENT

This command permits not only the definition of counters but also the automatic acquisition of instantaneous speeds.

2) Normal commands a) - Time commands:

These place reliance only upon a time reference.

This reference is either, by default, the counter used for the acquisition FRUN 20 or any virtual counter defined previously.

| D31 | | D16 | D15 | | D0 |
|---|---|---|---|---|---|
| | | | 16-BIT COMPARISON VALUE | | |

D16 = THE NEXT COMMAND EXECUTED IS A COMMAND EXCHG
D17 = ENABLE
D18 = INTERRUPT ON VALID COMPARISON
D19 = OUTPUT WHERE THE ACTION MUST TAKE PLACE
D20
D31

| D31 | D20 | D19 | OUTPUT |
|---|---|---|---|
| 0 | 0 | 0 | 1 |
| 0 | 0 | 1 | 2 |
| 0 | 1 | 0 | 3 |
| 0 | 1 | 1 | 4 |
| 1 | 0 | 0 | 5 |
| 1 | 0 | 1 | 6 |
| 1 | 1 | 0 | 7 |
| 1 | 1 | 1 | 8 |

D21 = SET TO 1 / SET TO 0 ON COMPARISON
D22 = STEP MODE
D23 = 0
D24 = 0
D25 = SET TO 1 / SET TO 0 ON VALUE 0 OF THE REFERENCE
D26 = INTERRUPT ON VALUE 0 OF THE REFERENCE
D27 = NOT USED
D28 = NOT USED
D29
D30 b) - Dual commands:

These rely upon a double comparison for a same event.

The comparisons are:

- a time comparison

- an event comparison

When the two conditions are fulfilled, the action can be executed.

| 8 bits | D23 | D16 | 16 BITS |
|---|---|---|---|
| EVENT COMPARISON VALUE | | | 16-BIT TIME COMPARISON VALUE |

D16 = THE NEXT COMMAND EXECUTED IS A COMMAND EXCHG
D17 = ENABLE
D18 = INTERRUPT WHEN DOUBLE COMPARISON VALID
D19 = OUTPUT WHERE THE ACTION MUST TAKE PLACE
D20

| D20 | D19 | OUTPUT |
|---|---|---|
| 0 | 0 | 1 |
| 0 | 1 | 2 |
| 1 | 0 | 3 |
| 1 | 1 | 4 |

D21 = SET TO 1 / SET TO 0 ON VALID COMPARISON
D22 = STEP MODE
D23 = 1

These commands permit the interpolations.

c) Double commands:

They relate to two comparisons of the event type for two events.

| D23 | D16 | 8-BITS | 8-BITS |
|---|---|---|---|
| | | EVENT 2 COMPARISON VALUE | EVENT 1 COMPARISON VALUE |

D16 = THE NEXT COMMAND EXECUTED IS EXCHG
D17 = ENABLE
D18 = INTERRUPT IF EVENT 1
D19 = OUTPUT WHERE THE ACTION MUST TAKE PLACE
D20
D31

| D31 | D20 | D19 | OUTPUT |
|---|---|---|---|
| 0 | 0 | 0 | 1 |
| 0 | 0 | 1 | 2 |
| 0 | 1 | 0 | 3 |
| 0 | 1 | 1 | 4 |
| 1 | 0 | 0 | 5 |
| 1 | 0 | 1 | 6 |
| 1 | 1 | 0 | 7 |
| 1 | 1 | 1 | 8 |

D21 = SET TO 0 / SET TO 1 ON EVENT 1
D22 = STEP MODE
D23 = 0
D24 = 1

-continued

D25 = SET TO 0 / SET TO 1 ON EVENT 2
D26 = INTERRUPT ON EVENT 2
D27 = SET TO 0 OF FRUN20 ON EVENT 1
D28 = SET TO 0 OF FRUN20 ON EVENT 2
D29 = 32-BIT ACQUISITION ON EVENT 1
D30 = 32-BIT ACQUISITION ON EVENT 2

The device for detecting the mode described with reference to FIG. 18 permits the setting up of the double resolution mode STEPSET=1 and the indication of whether the command executed is a command EXCHG. EXCHG command=1.

The device for interpreting the commands EXCHG described with reference to FIG. 19 permits the validation of the commands EXCHGA or EXCHGB and generates:

| | |
|---|---|
| TRANS | = Active for all the data rates in baud of transmission × 4 |
| RECV | = Active for all the data rates in baud of reception × 4 |
| UPRANGE | = High range for the maximum value |
| SELPIN0 | = Input to which the event counter is allocated |
| SELPIN1 | |
| INTREQ1 | = 32-bit capture request, global request |
| ACQBUFF | = 16-bit capture request |
| BUFF (14 + 2) | = 16-bit capture, including 2 bits for source definition |
| RESET FRUN 20 | = Set to 0 of the 20-bit acquisition counter Global request |

The device for the interpretation of the normal commands which is described with reference to FIGS. 20a and 20b permits differentiation of the time, double or dual commands and generates:

| | |
|---|---|
| INTREQ | = Global interrupt request |
| SET | = Request for set to 1 of the output defined by (pin2, 1, 0) |
| RESET | = Request for set to 0 of the output defined by (pin2, 1, 0) |
| C(N) | = Condition N validation |
| C (N+1) | = Condition N+1 validation |
| PIN2 | = Output to which the command relates |
| PIN1 | = Output to which the command relates |
| PIN0 | = Output to which the command relates |
| CLRFR | = Request for set to 0 of FRUN20 of normal type |
| 32-BIT ACQ | = 32-bit capture request of normal type |

The device for synchronizing the actions which is described with reference to FIG. 21 ensures a taking into account of the actions at the end of cycle TS, i.e. on control strobe, on account of the address/data sequentialization.

The input unit 5 which has been described with reference to FIGS. 22a and 22b ensures:

the detection of a change of condition on an input, the generation of the capture request signals to the address generator unit 2 (FIG. 1)

the generation of the signals EVENT and INCOFF to the time base unit 3.

This management relates to six capture inputs.
DETECTION

This detection is programmable.

| R | F | |
|---|---|---|
| 0 | 0 | INACTIVE |
| 0 | 0 | DESCENDING FRONT |
| 1 | 0 | RISING FRONT |
| 1 | 1 | RISING AND DESCENDING FRONT |

The detection logic of conventional type generates a signal of duration equal to a resolution as soon as an event is detected.

For the inputs, which do not have to be used as event (E1, E2), this logic alone is necessary; the output signals may be directly used for the requests to the address generator.
GENERATION OF THE SIGNALS EVENT (1–4) AND INCOFF (1–4)

These signals intended for the time base are to be generated only for the inputs 3, 4, 5 or 6.

The two cases already studied are:

| Sequencer | | | | | | | | | |
|---|---|---|---|---|---|---|---|---|---|
| FRBITO | 0 | 0 | 1 | 0 | 1 | 0 | 1 | 0 | 1 |
| CAPREQ | 0 | 1 | 0 | 0 | 1 | 0 | 0 | 0 | 0 |
| EVENT | 0 | 1 | 1 | 0 | 0 | 1 | 1 | 0 | 0 |
| INCOFF | 0 | 0 | 0 | 0 | 0 | 1 | 1 | 1 | 1 |
| | | CASE 1 | | CASE 2 | | | | | |

With reference to FIG. 22a:

the signal CAPREQ used for the capture function has a duration of one resolution to permit the maintenance of a unitary precision.

the signal EVENT interpreted by the control functions must be validated over the totality of a scanning. The correction procedure described previously ensuring the precision, to within a resolution.

the signal INCOFF must store the "CASE 2" information to validate the correction.

A visualization of the signals is represented in FIG. 22c.

The commands concerning the taking into account of the events (EXCHG) select the EVENT parameters by generating at the level of the action module 4 the signals:

SELPIN0
SELPIN1

These signals are valid during the entire command.

In the case where DEDB=1, the event counter is unique and is associated with E6. In this case, the selection is obligatory.

The output unit 6 has been described with reference to FIG. 23.

The device for control and for acquisition at high speed according to the invention possesses up to eight outputs.

The modification to be made at the level of the outputs of the device is transmitted by the action unit (FIGS. 18 to 21) in the form:

| | |
|---|---|
| PIN (0–2): | 3 lines indicating which output is to be affected. |
| SET: | SET TO 1 |
| RESET: | SET TO 0 |
| C (N): | Modification taking place at the instant N |
| C (N + 1): | Modification taking place at the instant N + 1 |

The shift register consisting of the circuits 200, 201, 202, 203, 204, 207 serves to sequentialize N and N+1.

The two N–2, N–1 stages 204, 207 are the anticipation stages.

The two N and N+1 stages 201, 203, 200, 202 are the computation stages.

The demultiplexer 199 ensures the selection of the channel on the basis of the information items emanating from the action module.

The shift procedure is the following:
RESOLUTION N
COMPUTATION OF N, N+1
VISUALIZATION of N−2

RESOLUTION N+1

COMPUTATION OF N, N+1
VISULIZATION OF N−1

RESOLUTION N+2

UPDATING OF N−2 BY N
UPDATING OF N−1 BY N+1

The two computation stages are initialized at the start of scanning.

The surveillance or "guard dog" unit 8 described with reference to FIG. 24 ensures the generation of an initialization signal RESET if an erroneous data item is written at the key address considered.

The conditions which cause an action of initialization if a discharge of the guard dog has not been effected previously are:

1) Time delay of the time base FRUN20
2) Set to 0 of FRUN20
3) Detection of a faulty scanning.

The time delay and the validation of the guard dog are undertaken by the programming bits WDA and WDB.

WDA and WDB can be set to 0 only in privileged mode.

After energization, the guard dog is validated with the shortest time delay period.

| WDB | WDA | TIME DELAY PERIOD |
|-----|-----|-------------------|
| 0   | 0   | INVALIDATION      |
| 0   | 1   | 2**09 RESOL       |
| 1   | 0   | 2**15 RESOL       |
| 1   | 1   | 2**19 RESOL       |

The conditions of action of the guard dog unit are the following:

1) Programmable time delay=Standard
2) Set to 0 of the counter FRUN20

As FRUN20 serves as reference for the time delay, the set to 0, which is not prohibited for the commands, had to be made secure.

3) Verification of the scanning SCAN

This guarantees the correct updating of FRUN20.

The serial interface unit 7 described with reference to FIGS. 25a and 25b fulfils the function of serial interface in asynchronous mode and, as a result of this, ensures:
a reception with the following features:
  maximum 8-bit format
  1 stop bit or more
  1 start bit
  reception flag
  format error flag
  flag indicating the parity,
a transmission with the following features:
  maximum 8-bit format
  1 stop bit or more
  1 start bit
  end-of-transmission flag.

The reception part of this unit represented in FIG. 25a comprises three functions:

a) A function of storage on reception.

The latter is ensured by the shift register 225 and the 8-bit blocking circuit 226.

The transfer from the shift register 225 to the memory 226 is undertaken after reception of the first stop bit (bit count= 10).

The shift register is also used as storage zone during the synchronization phase.

b) Time management and word synchronization.

In the synchronization phase, bit count=0

In this case, the shift register 225 is filled at the rhythm of 4 times the data rate in baud.

When two consecutive bits (B7 and B6) are detected at zero, the start bit is validated.

This validation is reflected by:

the set to 0 of the synchronization counter the set to 1 of the bit counter a clock of shift equal to the data rate in baud.

The bit clock is then synchronized in the bit centre.

The two extreme cases are:

```
!--------!--------!--------!--------! start bit
         case 1   case 2
```

In the non-synchronization phase, bit count #0, the action effected is dependent upon the condition of the bit counter.

| BIT COUNT | PHASE | ACTION |
|-----------|-------|--------|
| 0 | Synchronization | See above |
| 1 | Start bit received | Clock synchronization |
| 2 | 1st bit received | Shift/parity update |
| 3 | 1st bit received | Shift/parity update |
| 4 | 1st bit received | Shift/parity update |
| 5 | 1st bit received | Shift/parity update |
| 6 | 1st bit received | Shift/parity update |
| 7 | 1st bit received | Shift/parity update |
| 8 | 1st bit received | Shift/parity update |
| 9 | 8th bit received | Blocking of reception clock |
| 10 | Stop bit received | Transfer to memory circuit RDA = 1 Format error updated Bit count = 0 | c) A function of visibility for the processor.

RDA: set to 1 when a data item is transferred into the memory 226, set to 0 by reading of the latter.

FRAMING ERROR: set to 1 if no stop bit is detected, may only be set to zero by the processor.

EVEN/ODD: indicates if the word received is of even or odd parity.

The transmission part represented in FIG. 25b fulfils the following functions:

a) A storage function.

The 8-bit shift register 245 ensures the storage of the date item to be transmitted.

No buffer memory is available.

b) A time management.

This is entirely dependent upon the condition of the bit counter 252a which is incremented every four pulses LTRANS and initialized at each write to the transmission register 245.

| BIT COUNT | TXD | ACTION |
|---|---|---|
| 0 | 0 | Transmission of the start bit |
| 1 | D0 | Bit transmission |
| 2 | D1 | Bit + shift transmission |
| 3 | D2 | Bit + shift transmission |
| 4 | D3 | Bit + shift transmission |
| 5 | D4 | Bit + shift transmission |
| 6 | D5 | Bit + shift transmission |
| 7 | D6 | Bit + shift transmission |
| 8 | D7 | Bit + shift transmission |
| 9 | 1 | Stop bit transmission |
| 10 | 1 | Blocking of shift TBE + 1 | c) Advisability given by TBE which permits the processor to define when it is capable of transmitting.

This serial interface permits the availability of reception and transmission channels which are totally independent and, if necessary, having differing transmission and reception data rates in baud.

The interrupt unit 10 described with reference to FIGS. 26a to 26c is intended to manage the interrupt requests which may originate:

from the Control function from the Acquisition function from the Serial interface function Each one of these functions supplies a global interrupt request INT; the INTs must be placed in hierarchy in order to be compatible with the structure of the controller.

Each one of these interrupts is vectorized.

The relative priorities of the functions are managed by the device of FIG. 26e.

The requests CINT, IINT, RXINT, TXINT from the control, from the acquisition and from the UART may be programmed in order to be actuated either on the level 1 or on the level 2 of priority.

On a same level, the order of the priorities is the following:

Acquisition (greater priority)

Serial interface

Control

When the interrupt ISYNC=1 is taken into account, the function concerned places on the bus the vector of its request of highest priority.

The management of the interrupts of the control function is ensured by the device of FIG. 26a.

In this case, the interrupts are validated globally by programming (BIT INTE(CONT)=1) and 8 different vectors may be generated by this function.

Mechanism of a control interrupt:

Each control command possesses a certain number of bits permitting the validation of an interrupt request.

Thus, when the command is executed, if:

the time conditions or the event conditions are present and the request validation bit is positioned in the command, then the action module 4 (FIG. 1) generates a request IREQ (CONT) which remains active over the totality of an interval TS.

The positioned flag (CFLGi) is a function only of the 3 least significant bits of the address (on 5 bits) of the command.

Thus, all the commands having the same address modulo 8 position the same interrupt flag.

In order to take into account the address of the request, it is necessary to take into account the shift of 1 TS between valid address and valid data item.

The interrupt requests are placed in hierarchy:

CFLG0>CFLG1 ... >CFLG7

The available vector is that of the request of highest priority.

Each CFLG1 may be reset to 0 individually; in this case, a request, the priority of which is lower, may impose its vector.

| ADDRESS (MODULO 8) | CFLG0 | PRIORITY | VECTOR (HEX) |
|---|---|---|---|
| 0 | 0 | D | A1 |
| 1 | 1 | E | A2 |
| 2 | 2 | C | A5 |
| 3 | 3 | R | A7 |
| 4 | 4 | E | A9 |
| 5 | 5 | A | AB |
| 6 | 6 | S | AD |
| 7 | 7 | I | AF |
|   |   | N |   |
|   |   | G |   |

This command address - priority - vector structure gives a greater flexibility of management.

The acquisition function is ensured by the device of FIG. 26b.

a) 6 interrupts linked to the inputs b) 1 buffer interrupt c) 1 time base interrupt a) The requests for the interrupts linked to the inputs emanate from the input module 5 and have a duration of one resolution.

They are stored (IFLAGi) and may be validated individually EINT.

b) The buffer interrupt can be validated by INTBUFFEN, it is activated when the latter is half-full or full.

| DEBB | SIZE BUFFER + T | LAST CAPTURE ADDRESS BEFORE INTERRUPT |
|---|---|---|
| 0 | T = 2k | 3 + k + buffer start |
| 1 | T = 2k | 5 + k + buffer start |
| 0 | T = 2k + 1 | 3 + k + buffer start |
| 1 | T = 2k + 1 | 5 + k + buffer start | c) The acquisition time base interrupt validated by INTOVFEN takes place at each overflow of the 20-bit counter FRUN20.

The request FRUN200VF has a duration of only 1 TS.

As for the control function, these interrupts are placed in hierarchy.

8 different vectors are associated with the function.

| INPUT | REQUEST | PRIORITY | VECTOR |
|---|---|---|---|
| — | INTOVF | C | BF |
| E1 | IINT1 | R | BD |
| E2 | IINT2 | O | BB |
| E3 | IINT3 | I | B9 |
| E4 | IINT4 | E | B7 |
| E5 | IINT5 | N | B5 |
| E6 | IIT6 | T | B3 |
| — | INTBUF |   | B1 |

The serial interface function is ensured by the device of FIG. 26c.

Only two interrupts are associated with this function.

RXINT, the associated flag of which is RDA (data item received valid) directly generated by the module UART and validated by RXINT EN.

TXINT active when the shift register is again ready for a transmission (TBE=11); it is validated by TXINT EN.

The priority of the reception RXINT is greater than that of the transmission.

|  | PRIORITY | VECTOR |
|---|---|---|
| TXINT | 1 | 9D |
| RXINT | 2 | 9F |

Accordingly, the device manages at the interrupt level.

3 global requests 18 interrupt vectors 18 request flags 11 validation flags n request bits in command zone The acquisition function of the device for control and for acquisition at high speed which has just been described exhibits the following features.

Detection logic:

Detection on rising front

Detection on descending front

Detection on rising front and descending front

Event counters accessible by the control functions.

mode 1: 1 8-bit event counter on E6 mode 2: 4 4-bit event counters on E3, E4, E5 and E6.

Time base

Reference counter on 20 bits+overflow bit

Set to 0 of the counter by software

Automatic synchronization of the time base with respect to the event counter in mode 1.

Storage zone

General-purpose memory zone

Situated in computation zone, therefore directly accessible to all the logic and arithmetic operations 16- or 32-bit storage format Duality of storage in dedicated zone and in circular buffer "Event" information available in the captured data.

IMPROVEMENTS EFFECTED BY THE DEVICE ACCORDING TO THE INVENTION TO THE ACQUISITION FUNCTION

1) Event counters associated with the inputs and directly accessible by the control functions.

2) Increase of the range of measurement (from 16 to 20 bits) with possible synchronization of the capture time counter with respect to an event counter.

3) Storage zone constructed in the form of a general-purpose RAM, physically included in the zone of computation registers.

4) Duality of dedicated capture, circular buffer.

The control function of the device of the invention exhibits the following features.

The function may be broken down into two distinct units:

A - Storage

Of the comparison values

Of the description of the action to be implemented

Of the reference of the output to be handled

Of the instantaneous value of the counters

B - Active logic

For comparison

For action

For sequentialization

The storage zone is, in its entirety, situated in general-purpose memory; furthermore, it forms part of the computation zone.

The active logic of any control function is established on one and only one occasion.

The solution adopted in the device of the invention consists in a reallocation by time tranches of the totality of the circuitry of the function (or of the functions) to be implemented.

The time base is no longer a counter, but a loadable dedicated storage zone, the content of which is a function of the time and of the selected counter which, in the present case, is virtual, since it has no real existence.

The improvements effected by the device of the invention to the control function are the following:

1) Control action represented by a single 32-bit command, stored in general-purpose memory.

2) Command directly generated in computation zone.

3) CONTROL/ACQUISITION interaction

4) EVENT/TIME interaction

5) Time reference implemented in the form of virtual counters in general-purpose memory, appearing in the form of commands.

6) Number of commands only limited by the parameters of the RESOLUTION/SYSTEM PERIOD application.

7) Time dimension at the level of the entire logic permitting a minimum cost of implementation of circuitry.

8) Generation of signals programmable by command, for auxiliary functions (example UART).

What is claimed is:

1. A microcomputer system for providing time management enabling control and acquisition of data indicative of condition changes occurring at high speed, said system comprising:

memory means providing a dedicated data storage zone temporally shiftable between memory control logic and a processor respectively to define a switched register zone serving as a computation register zone of the processor;

an address generator connected to said switched register zone for providing respective addresses thereto in response to an access by the memory control logic;

sequencer means connected to said switched register zone;

a time base circuit connected to said switched register zone and to said sequencer means, said time base circuit receiving outputs from said switched register zone as commands indicative of external events and synchronizable in response thereto;

said sequencer means enabling respective time intervals to be used in the operation of said memory means defining said switched register zone;

an action unit connected to said switched register zone and to said time base circuit for receiving an output as a control command from said switched register zone and decoding the control command under the control of said time base circuit;

an input unit responsive to the receipt of data from a device being monitored to detect a change in condition occurring during the operation thereof for generating capture request signals to said address generator and event signals to said time base circuit;

an output unit connected to the output of said action unit and to said time base circuit for producing output signals in a desequenced succession;

said switched register zone and said time base circuit interacting with said input unit to provide an acquisition function and with said output unit to provide a control function;

a serial interface circuit connected to said time base circuit and driven thereby for providing data reception and transmission functions; and an interrupt unit for receiving interrupt requests from the programmable control function, the programmable acquisition function, or from said serial interface circuit and placing the interrupt requests in a dynamic hierarchy in determining the priorities of the interrupt requests 2. A microcomputer system as set forth in claim 1, further including a sequence-security unit connected to said time base circuit for maintaining sequence control.

3. A microcomputer system as set forth in claim 1, wherein the acquisition function as provided by said switched register zone, said time base circuit, and said input unit concerns the acquisition of data relating to changes of condition as indicated by input signals to said input unit; and the control function as provided by said switched register zone, said time base circuit, and said output unit involves acting on output signals as a function of the data originating from the acquisition function.

4. A microcomputer system as set forth in claim 3, wherein said switched register zone comprises:

a memory plane;

a first interface circuit connecting said memory plane to the processor;

a second interface circuit connecting said memory plane to the memory control logic;

a first decoder connected between said memory plane and the processor for decoding addresses provided from the processor;

a second decoder connected between said memory plane and the memory control logic for decoding addresses from the memory control logic; and a time allocation unit operably connected between said memory plane and the processor for allocating processor time intervals.

5. A microcomputer system as set forth in claim 4, wherein said first interface circuit comprises:

an address bus;

a data bus;

a multiplexer connected to said memory plane of said switched register zone;

a demultiplexer connected to said memory plane of said switched register zone;

a first blocking register connected to said first decoder;

said multiplexer and said demultiplexer being responsive to address signals provided on said address bus and transmitted to said multiplexer and said demultiplexer by said first blocking register;

a second blocking register connecting said multiplexer to said data bus; and a third blocking register connecting said demultiplexer to said data bus.

6. A microcomputer system as set forth in claim 5, wherein said second interface circuit comprises:

a second data bus connected to said memory plane of said switched register zone;

a fourth blocking register connected to said second data bus for connection with said memory plane of said switched register zone, the output of said fourth blocking register forming the data output of said second interface circuit;

a first three-state interface circuit for receiving input data indicative of a first plurality of bits;

a second three-state interface circuit for receiving input data indicative of a second plurality of bits different from the first plurality of bits of the input data received by said first three-state interface circuit; and said first and second three-state interface circuits being responsive to control signals and being connected to said second data bus for connection with said memory plane of said switched register zone.

7. A microcomputer system as set forth in claim 6, wherein said time allocation unit for allocation of processor time intervals comprises:

a first flip-flop member for receiving a validation of access signal as an input;

logic gate means for providing an action signal CK from read/write and selection signals CPU R/W and SELECT as a second input to said first flip-flop member; and a second flip-flop member for receiving the same action signal CK as an input, said second flip-flop member being connected to the output of said first flip-flop member;

said second flip-flop member providing an output signal as a signal of validation of access CPU ACK to the processor.

8. A microcomputer system as set forth in claim 4, wherein said memory plane of said switched register zone is a RAM memory having a plurality of memory cells including field-effect transistors, said plurality of memory cells being arranged in a plurality of columns at least equal in number to the number of bits defining the format of a control command;

said RAM memory being accessible to a first source including the processor and to a second source including the memory control logic for utilizing the dead times of the switched register zone by time division as between the processor and the memory control logic.

9. A microcomputer system as set forth in claim 8, wherein said switched register zone further provides for a plurality of virtual counters definable therein and operable in accordance with either time or event information items as respectively declared in a control command, said plurality of virtual counters being directly incremented in said switched register zone and being readable and modifiable by the processor in said switched register zone.

10. A microcomputer system as set forth in claim 1, wherein said action unit comprises:

a first device for interpreting control commands from said switched register zone to set up virtual counters in said switched register zone;

a second device for interpreting normal commands from said switched register zone;

a third device for synchronization of the actions established by the commands from said swtiched register zone; and a fourth device for establishing an interlaced mode of scanning of the control zone of said switched register zone.

11. A microcomputer system as set forth in claim 1, wherein said input unit comprises:

a detector device for detecting a change of condition on one of its inputs and for generating a capture request signal to said address generator in response thereto;

said detector device of said input unit generating signals enabling simultaneous captures in a buffer zone and in a dedicated register of said switched register zone as data acquisitions indicative of a time or event information item; and an event signal generator device for generating event signals EVENT, INCOFF to said time base circuit, the event signal EVENT designating that an event is in progress and the event signal INCOFF enabling the assurance, up to one resolution, of the synchronization of the external events.

12. A microcomputer system as set forth in claim 1, wherein said serial interface circuit comprises:

a reception device enabling the functions of data storage on reception, of data storage during a synchronization phase, of time management and of word synchronization; and a transmission device enabling functions of data storage on reception, of time management and of word synchronization;

said serial interface circuit performing as a peripheral unit having a time-management function controlled by said time base circuit.

13. A microcomputer system as set forth in claim 1, wherein said interrupt unit comprises:

means for ensuring the relative priorities of interrupt requests from the control function, the acquisition function and the serial interface circuit;

means for validating interrupt and control requests, the priorities of which are reallocatable in a dynamic manner;

means for enabling the acquisition interrupt functions;

means for enabling the serial interface circuit interrupt requests; and means for determining the priorities of the capture interrupt requests.

14. A microcomputer system as set forth in claim 1, wherein said address generator comprises:

means for generating addresses relating to a write zone of said switched register zone;

means for generating addresses relating to a read or control zone of said switched register zone;

the access of data by the memory control logic being accomplished in response to commands in the control zone and to instructions;

means enabling a memory selection of P addresses out of a total of N addresses where P and N are integers and P is less than N; and means for selectively generating write signals in the write zone of said switched register zone.

15. A microcomputer system as set forth in claim 14, wherein said sequencer means comprises:

programmable means for division by n where n=1 to 16;

means for generating scanning synchronization signals STARTSCAN, FRBIT0, FRBIT1;

means for generating condition signals CAPACK+ COUNT UPDATE, CPUACK, CONTROL ACK, CAPACK, CAPCYC, ACK-1;

means for generating validation signals CONTROL STROBE, RESOL; and means for generating sequence management signals STEP 1, CLEAR EXCHG, VIRTUAL UPDATE;

said time base circuit being programmable under the control of said sequencer means for enabling optimum utilization of the available time.

16. A microcomputer system as set forth in claim 15, wherein said time base circuit comprises:

a blocking circuit for the acquisition function;

N virtual counters for the control function;

an event counter;

means for setting said virtual counters to zero;

means for time comparison;

means for comparison of events;

said N virtual counters being accessible in said switched register zone; and an adder;

said N virtual counters being incremented in response to the operation of said adder, the number N of virtual counters being dependent only upon the value of a predevisor of said sequencer means as determined by said programmable means of said sequencer means.

* * * * *